US012065148B2

(12) United States Patent  
Genovese et al.

(10) Patent No.: US 12,065,148 B2  
(45) Date of Patent: Aug. 20, 2024

(54) MOBILE DEVICE AND SYSTEM FOR IDENTIFYING AND/OR CLASSIFYING OCCUPANTS OF A VEHICLE AND CORRESPONDING METHOD THEREOF

(71) Applicant: Swiss Reinsurance Company Ltd., Zurich (CH)

(72) Inventors: Donato Genovese, Zurich (CH); Benedetta Cerruti, Milan (IT); Riccardo Tisseur, Aramengo (IT)

(73) Assignee: Swiss Reinsurance Company Ltd., Zurich (CH)

(*) Notice: Subject to any disclaimer, the term of this patent is extended or adjusted under 35 U.S.C. 154(b) by 511 days.

(21) Appl. No.: 17/328,976

(22) Filed: May 24, 2021

(65) Prior Publication Data

US 2022/0080976 A1    Mar. 17, 2022

Related U.S. Application Data

(63) Continuation of application No. PCT/EP2020/075548, filed on Sep. 11, 2020.

(51) Int. Cl.
*B60W 40/08* (2012.01)
*G01C 21/30* (2006.01)
(Continued)

(52) U.S. Cl.
CPC .............. *B60W 40/08* (2013.01); *G01C 21/30* (2013.01); *G06N 20/20* (2019.01); *G06Q 50/26* (2013.01);
(Continued)

(58) Field of Classification Search
CPC ........... B60W 40/08; B60W 2540/227; B60W 2556/45; G01C 21/30; G06N 20/20;
(Continued)

(56) References Cited

U.S. PATENT DOCUMENTS

| 10,630,723 | B1* | 4/2020 | Prasad | .................. H04L 63/166 |
| 11,151,813 | B2* | 10/2021 | Matus | .................... G06N 20/00 |
| 2021/0407225 | A1* | 12/2021 | Matus | ................ G06Q 30/0201 |

FOREIGN PATENT DOCUMENTS

EP    3091498 A1 * 11/2016 ............ B60W 40/09

OTHER PUBLICATIONS

EP-3091498-A1_translated (Year: 2016).*

* cited by examiner

*Primary Examiner* — Manish S Shah
*Assistant Examiner* — Michael J Singletary
(74) *Attorney, Agent, or Firm* — Oblon, McClelland, Maier & Neustadt, L.L.P.

(57) ABSTRACT

A method and system for identifying and/or classifying a user of a vehicle based on sensory data measured by sensors of a cellular mobile device, the sensors at least comprising an accelerometer and a gyroscope. The mobile device measures gravitational acceleration movement sensory data by the accelerometer based on measuring parameters obtained from the accelerometer, vehicle entering or exiting movement patterns of the user being detected from the acceleration movement sensory data at least comprising pattern for base axis and degree of rotation associated with a vehicle entrance or exit of the user. The detected vehicle entering or exiting movement patterns of the user trigger as input features the recognition of a vehicle entering or exiting movement of the user by performing a decision-tree classification on the input features to rule out whether the user entered or exited from a left or right side of the vehicle.

14 Claims, 73 Drawing Sheets

(51) Int. Cl.
  *G06N 20/20* (2019.01)
  *G06Q 50/26* (2024.01)
  *G06Q 50/40* (2024.01)
  *H04W 4/02* (2018.01)
  *H04W 4/029* (2018.01)
  *H04W 4/38* (2018.01)
  *H04W 4/48* (2018.01)

(52) U.S. Cl.
  CPC ............ *G06Q 50/40* (2024.01); *H04W 4/027* (2013.01); *H04W 4/029* (2018.02); *H04W 4/38* (2018.02); *H04W 4/48* (2018.02); *B60W 2540/227* (2020.02); *B60W 2556/45* (2020.02)

(58) Field of Classification Search
  CPC ....... G06Q 50/26; G06Q 50/30; H04W 4/027; H04W 4/029; H04W 4/38; H04W 4/48; G06F 2218/12; G06F 18/00
  See application file for complete search history.

```
std_par ={
"m_a":1.2, "std_a":2.5, "k_a":1,        #parameters for the A score "m_b":3, "std_b":1.5, "k_b":0.5,        #parameters for the B score "m_c":0, "std_c":1, "k_c":1.0,          #parameters for the C score
"discontinuity_threshold":3.5,
"enterYZ" : 1,                          #parameters for Discontinuity score in reduced signature
"enterYX" : 1,
...
"exitY1Z1" : 0.7,                       #parameters for Discontinuity score in extended signature
"exitY1Z-1" : 0.7,
...

"threshold_rot_int":35,
"min_overlap_time":0,                   #parameter for the DP classification
"min_accettable_score":0.7

"max_S_duration":4,                     #parameter for Walking barrier classification
"min_Rest_gap":10,                      #parameter for Resting barrier classification
"separate_big_M":True,                  #bool to include big movement separation in the pipeline
"detect_mount_holder":True,             #bool to include mount holder detection in the pipeline
}
```

Fig. 5

```
def my_sign (x,ribbon):
    """Returns the sign of the value if the value lies outside the ribbon, otherwise returns 0"""

def get_windows(tag,t,ts,data,out,ribbon):

#INITIALIZE
    current_sign = my_sign(data[0],ribbon)
    current_start_idx = 0 for idx in range(1,len(ts)):
        next_sign = my_sign(data[idx],ribbon)

if (next_sign != current_sign) or (idx== len(ts)-1):
            # close and save the window
            w = Window(tag,ts[current_start_idx],ts[idx] )

if current_sign != 0 :
                out.append(w)
            current_sign = next_sign
            current_start_idx = idx else :
            continue
```

Fig. 6

```
def find_rotation_windows(threshold):
    get_all_rotations_windows = Make_windows(source = "Gyroscope", axis="z_smooth", zero = 0, ribbon=0.3)
    Rotations = get_all_rotations_windows(sec)
    Rotations = join_consecutive_rotations(Rotations)

# Calculate the integral (degree) of each rotation
    Integrate_windows(Rotations)

Find all rotations bigger than 30 degrees
    Rotations_big = [r for r in Rotations if (abs(r.integral)* 180/np.pi >threshold )]

return Rotations
```

Fig. 8

```
def Find_M_G_windows():

current_threshold =4.5  # wisely set by our mighty wisdom
    join_distance=0.2 #in seconds, also wisely set by our mighty wisdom
    while (try a few attempts with varying threshold in order to find at lest 2 movements)

get_all_movements_windows = Make_windows(source = "Accelerometer", axis="z_var",zero =
        current_threshold,ribbon=0)
        All_movements = get_all_movements_windows(sec)

# SEPARATE MOVEMENT FROM GAPS
        M_G_ = M_G_separation (threshold=current_threshold, using=All_movements)

if len (M_) >2 :
            #check if there are movements too close to each other, if so join them
            M_G_ = M_G_join_close(sec,tag,threshold=join_distance, using1=M_using2=G_)

return M_G_
```

Fig. 10

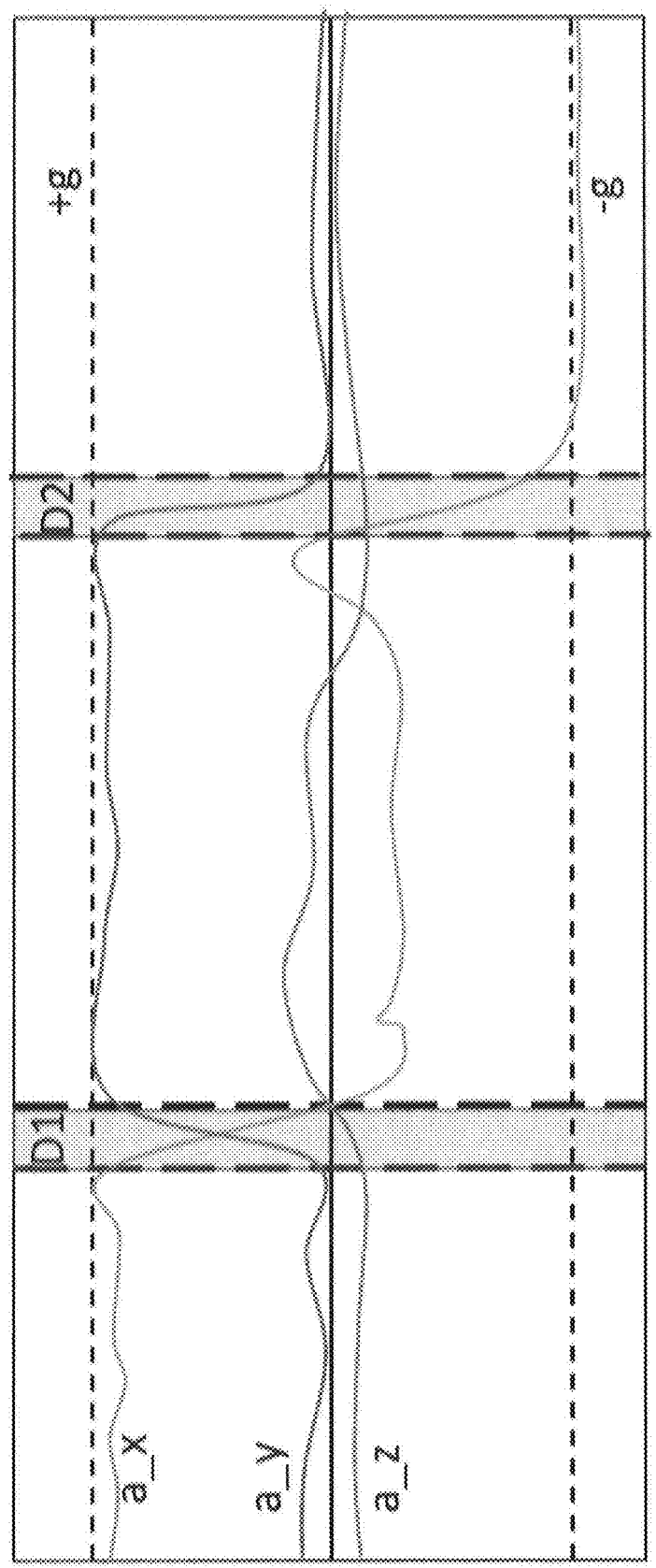

```python
def Find_discontinuity_windows(input_session,tag,target ="Accelerometer",threshold,delta_idx):
    acc = input_session.get_buffer_by_name("Accelerometer",tag)
    #get x,y,z,t and ts values filling_w = False
    for idx in range(delta_idx,len(ts)):

else:
            # CALCULATE SOME INFO ABOUT THE LEFT AND THE RIGHT OF A GIVEN INDEX
            mean_sx_x = np.mean(x[idx-delta_idx:idx])
            mean_dx_x = np.mean(x[idx:idx+delta_idx])
            ...
            dx = mean_dx_x - mean_sx_x
            ...

min_g_value = 6 find out the biggest component left righ:
            if (abs(mean_sx_x) > abs(mean_sx_y)) and (abs(mean_sx_x) > abs(mean_sx_z))and (abs(mean_sx_x) > min_g_value) :
                biggest_left = ["X",mean_sx_x]
            ...
            if (abs(mean_dx_x) > abs(mean_dx_y)) and (abs(mean_dx_x) > abs(mean_dx_z))and (abs(mean_dx_x) > min_g_value) :
                biggest_right = ["X",mean_dx_x]
            ...

# FILL DISCONTINUITY WINDOW IF DISCONTINUTY FOUND
            if ((biggest_left[0] != biggest_right[0])and(np.max(np.abs([dx,dy,dz]))>threshold)) or (np.max(np.abs([dx,dy,dz]))>threshold) :
                if not filling_w:
                    #found a variation, initialize window
                    temp_start_idx = idx
                    temp_biggest_left = biggest_left
                    filling_w = True
                else :
                    continue
            else :
                if filling_w :
                    #found an variation end, initialize window and save
                    temp_end_idx = idx w= Window(tag,ts[temp_start_idx],ts[idx])
                    w.classifications=[temp_biggest_left,biggest_right]
                    out.append(w)
                    filling_w = False
                else :
                    continue return out
```

Fig. 12

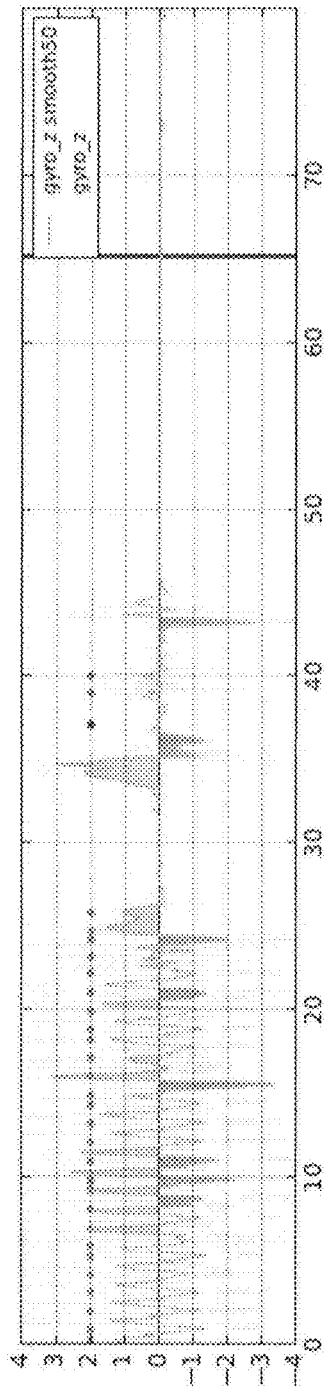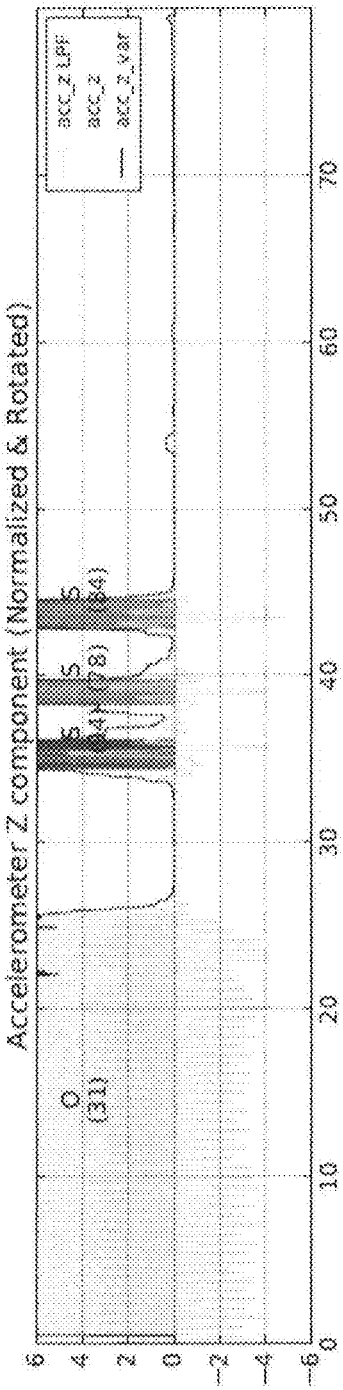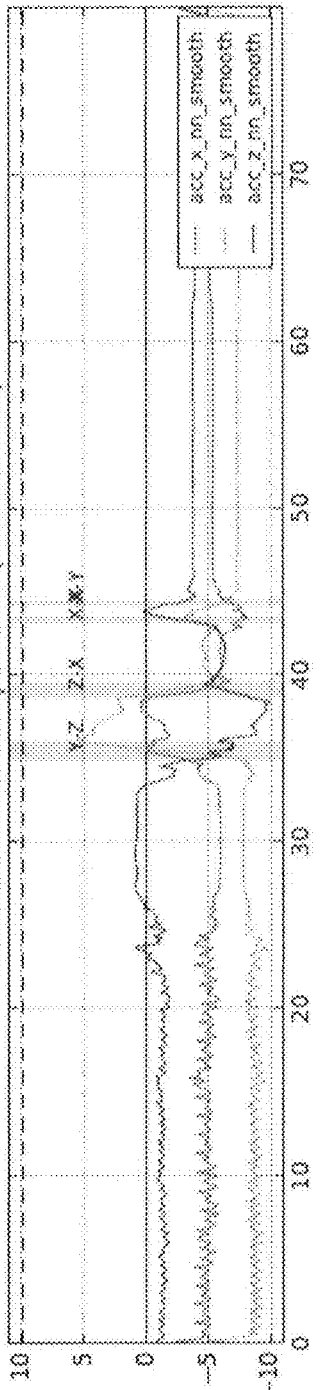
Fig. 13

```
Def Uniform_sampling_rate (sample_rate = 100, targets = ["Gyroscope"] ):
    Dt = 1/ sample_rate
    Find min and max timestamp across all buffers
    uniform_timestamps = np.arange(min_t ,max_t ,dt*1000))
    for each buffer in session:
        for each column (x,y,z,w):
            new_values = np.interp(uniform_timestamps,old_timestamps,old_values)
```

Fig. 14

```
def Rotation ():
   for each buffer in session:
      old_x = buffer.data["x"]
      old_y = buffer.data["y"]
      old_z = buffer.data["z"]
      old_vect = np.column_stack((old_x,old_y,old_z))

#updating buffer old coordiantes into new ones
      for i in range(len(old_vect)):
         old_x[i],old_y[i],old_z[i] = rot_matrix_vec[i].dot(old_vect[i]).T
```

Fig. 15

```
def Readable_timestamps ():
   for each buffer in session:
      buffer.data["t"] = (buffer.data["timestamp"] - input_session.t0)/1000
```

Fig. 16

```
def Normalize_acceleration(tag):
    acc= input_session.get_buffer_by_name("Accelerometer",tag)
    mean = np.mean(np.sqrt(acc.data["x"]**2 + acc.data["y"]**2 + acc.data["z"]**2) )
    is_g_units = (0.7< mean <1.3 )

if is_g_units :
        acc.data["x_nr"] = 9.81*acc.data["x"].copy()
        acc.data["y_nr"] = 9.81*acc.data["y"].copy()
        acc.data["z_nr"] = 9.81*acc.data["z"].copy()
    else:
        acc.data["x_nr"] = acc.data["x"].copy()
        acc.data["y_nr"] = acc.data["y"].copy()
        acc.data["z_nr"] = acc.data["z"].copy()

def Subtract_g_acceleration(tag):
    acc= input_session.get_buffer_by_name("Accelerometer",tag)
    mean_z = np.mean(acc.data["z"])
    is_g_units = (0.7< abs(mean_z) <1.3 )
    if is_g_units :
        acc.data["x"] = 9.81*acc.data["x"]
        acc.data["y"] = 9.81*acc.data["y"]
        acc.data["z"] = -9.81*( acc.data["z"]-mean_z)
    else:
        acc.data["z"] = acc.data["z"] - mean_z
```

Fig. 17

```
def Transformations_pipeline(session):
    uniform = Uniform_sampling_rate(sample_rate = 100, targets =
["RotationVector","Gyroscope","Accelerometer"])
    rotate = Rotation(source="RotationVector",targets=["Gyroscope","Accelerometer"])
    to_second = Readable_timestamps()

#START
    uniform(session)
    to_second(session)

session.initialize_stats()
    # THIS MUST BE DONE BEFORE ROTATION!
    if session.has_start_buffers:
      Normalize_acceleration(session,"enter)
    if session.has_end_buffers:
      Normalize_acceleration(session,"exit")

# ROTATION
    rotate(session)

#ADD NEW COLUMNS
    if session.has_start_buffers:
      Add_new_columns(session,"enter")
    if session.has_end_buffers:
      Add_new_columns(session,"exit")
```

Fig. 18

```
def Analyze(sec,tag,par, debug = True):
  # INITIALIZE ROTATION WINDOWS
  Rotations = Find_rotation_windows(tag)

# INITIALIZE NOT ROTATED DISCONTINUITY ACCELERATION WINDOWS
  Discontinuities = Find_discontinuity_windows(tag,threshold = par["discontinuity_threshold"],delta_idx =
  50)

# INITIALIZE MOVEMENT GAP WINDOWS USING ROTATED ACCELEROMETER ALONG Z AXIS
  M_,G_ = Find_M_G_windows(tag)
  ##########################################

##########################################
  # SCORING OF MOVEMENTS
  ##########################################

DPD_barriers =[]
  DPD_candidates=[]
  for M in M_:
  Score_movement(tag,M,par,Discontinuities,Rotations,DPD_candidates,DPD_barriers)

##########################################
  # SCORING OF GAPS
  ##########################################
  for G in G_:
    if (G.ts[1]-G.ts[0])> par["min_Rest_gap"]:
     G.final_classification= "R"
     DPD_barriers.append(G)

##########################################
  # APPLY BARRIER FILTER ON FOUND DPD CANDIDATES
  ##########################################
  DPD_candidates = DPD_barriers_filter(tag,DPD_candidates,DPD_barriers,min_acceptable_score =
  par["min_acceptable_score"])

##########################################
  # SELECT BEST REMAINING CANDIDATE
  ##########################################
  best_DPD_candidate= get_best_DPD_candidate(DPD_candidates)

##########################################
  # SAVING BEST DPD CANDIDATE IN SESSION:
  ##########################################
  sec.DPD_candidates[tag]=best_DPD_candidate
```

Fig. 19

```
def Score_movement(sec,tag,M,par,Discontinuities,Rotations,DPD_candidates,DPD_barriers):
    #RESET all M.classifications
    M.classifications =[]

##########################################
    # C SCORE  (based on Discontinuities)
    ##########################################
    C_res,C_best  = f_C_score (tag,mean_distance=par["m_c"],std=par["std_c"], M=M,
using=Discontinuities, weight=par["k_c"],max_S_duration=par["max_S_duration"],par=par,debug=False)

best_overlapping_discontinuities = sorted(C_best, key = lambda d : d[3], reverse = True )

##########################################
    # FIRST CHECK FOR DPD BARRIER
    ##########################################
    dt = M.t[1] - M.t[0]
    if dt >= par["max_S_duration"]:
        if len(best_overlapping_discontinuities)>0 & (par["separate_big_M"]):
            Split_big_movement(tag,M,best_overlapping_discontinuities,DPD_barriers)
        else:
            DPD_barriers.append(M)

##########################################
    # A SCORE  (based on Movement duration)
    ##########################################
    A_res = f_A_score (M,mean_duration=par["m_a"],std=par["std_a"] ,weight=par["k_a"])

##########################################
    # B SCORE  (based on proximity with big rotations)
    ##########################################
    Rotations_big = [r for r in Rotations if (abs(r.integral)* 180/np.pi>par["threshold_rot_int"]) ]
    B_res = f_B_score (M,tag=tag,mean_distance=par["m_b"],std=par["std_b"],
using=Rotations_big,weight=par["k_b"])

##########################################
    # S-CLASSIFICATION (based on all movement scores so far)
    ##########################################
    S_O_classify(M)

##########################################
    # CHECK FOR ANY MOUNT HOLDER MOVEMENT
    ##########################################
    if len(best_overlapping_discontinuities)>0 & par["detect_mount_holder"]:
        Detect_mount_holder(tag,M,best_overlapping_discontinuities)

##########################################
    # ADD SOME TIME TO THE LEFT AND RIGHT OF M IF IT IS TOO SHORT  (optional)
    if dt <par["min_overlap_time"] :
        time_extension = (par["min_overlap_time"]-dt)
    else:
        time_extension = 0

# FIND ALL ROTATIONS OVERLAPPING WITH M
    nearby_rotations_overlapping = find_windows_close_to(using1=M,using2=Rotations
,threshold=time_extension)
    # RUN DECISION TREE
    res.confidence = DPD_SCORE(M, par , nearby_rotations_overlapping)

##########################################
    # ADD (MOVEMENT + INFO) TO DPD CANDIDATES LIST
    ##########################################
    DPD_candidates.append([res , confidence , M])
```

Fig. 20

```
def f_A_score (M,mean_duration,std ,weight ):
  dt = np.abs(M.t[0]-M.t[1])
  sitting_score = np.exp(-(dt-mean_duration)**2 /(2*std**2))
  M.classifications.append({"Rule":"A","Classification":"S","Confidence":sitting_score,"Weight":weight})
  return sitting_score
```

Fig. 21

```
def f_B_score (M ,mean_distance,std,weight ,using=Rotations):

if len(using) >0:
   closest_time_distance,  closest_w2 = find_closer_window( M.t[0], M.t[1], Rotations)
   sitting_score = 1 - sigmoid(closest_time_distance,mean_distance,std)
 else:
   sitting_score =0

M.classifications.append({"Rule":"B","Classification":"S","Confidence":sitting_score,"Weight":weight})
 return sitting_score
```

Fig. 22

```
def f_C_score(M,par,using = Discontinuities, mean_distance,std,weight,max_S_duration):

if len(Discontinuities) >0:
    #valuate each discontinuity, then order by score, then select best collect each discontinuity
   closest_time_distance_closest_w_zip = find_closer_window(t_left,t_right, using, n="All")
   # loop and evaluate
   for closest_time_distance,  closest_w in closest_time_distance_closest_w_zip:
     current_discontinuity_score = score_valid_discontinuities(tag,closest_w,par)
     current_sitting_score = current_discontinuity_score*np.exp(-(closest_time_distance)**2 /(2*std**2))
     best_.append([current_discontinuity_score,closest_time_distance,closest_w,current_sitting_score])

#sort by sitting_score:
   best_ = sorted (best_, key = lambda x : x[3], reverse =True)
   #save only the best:
   best = best_[0]

M.classifications.append({"Rule":"C","Classification":"S","Confidence":sitting_score,"Discontinuity_score":discontinuity_score , "Discontinuity":discontinuity,"Weight":weight})

return sitting_score , best_
```

Fig. 23

```
def score_valid_discontinuities(tag,D,par):
  discontinuity_type =tag
  discontinuity_red_type = tag
  for c in D.classifications:
    discontinuity_type+=c[0] + str(int(np.sign(c[1])))
    discontinuity_red_type+=c[0]

# check if full pattern occurs in parameters keys
  if discontinuity_type in par.keys():
    return par[discontinuity_type]
# check if reduced pattern occurs in parameters keys
  elif discontinuity_red_type in par.keys():
    return par[discontinuity_red_type]
# else give a standard score
  else:
    return 0.7
```

Fig. 24

```
def S_O_classify (M):
  tot_S_score=0
  tot_weights= 0 for res in M.classifications:
    tot_weights+=res["Weight"]
    tot_S_score+=res["Confidence"]*res["Weight"]

tot_S_score = tot_S_score/tot_weights
  if tot_S_score>=0.5:
    M.final_classification="S"
  else:
    M.final_classification="O"
  M.final_confidence = tot_S_score
```

Fig. 25

```
def Detect_mount_holder(M,best_overlapping_discontinuities):
  discontinuities_ordered = sorted(best_overlapping_discontinuities)

if tag =="enter":
    discontinuity = the last discontinuity if more than one
    if (discontinuity.classifications[1][0]=="Y")&(discontinuity.classifications[1][1]>8): (ends in positiveY)
      M.final_classification="H"
  else :
    discontinuity = the first discontinuity if more than one
    if (discontinuity.classifications[0][0]=="Y")&(discontinuity.classifications[0][1]>8): (starts in positiveY)
      M.final_classification="H"
```

Fig. 26

```
def DPO_SCORE(tag,par,dpd_candidate,rotations):

threshold = par["threshold_rot_int"]
  if (dpd_candidate is not None) and (rotations is not None)and (len(rotations)>0) :
    nearby_rotations_overlapping= sorted(rotations, key=lambda w: w.integral )
      res_enter,confidence_enter = Benedetta_rule (nearby_rotations_overlapping, threshold)
      return res_enter,dpd_candidate.final_confidence def Benedetta_rule(nearby_rotations_overlapping, threshold):
  nearby_rotations_big = [w for w in nearby_rotations_overlapping if abs(w.integral* 180/np.pi)> threshold]
  nearby_rotations_big = sorted (nearby_rotations_big,key = lambda w : w.ts[0])
    if (nearby_rotations_big[0].integral > 0):
      return ["D",int(confidence)]
    else:
      return ["P",int(confidence)]
  else:
    return ["X",int(confidence)]
```

Fig. 27

```
def DPD_barriers_filter(tag,DPD_candidates,DPD_barriers,min_acceptable_score = 0.7):

rest_barriers = [DPD_barriers with w.final_classification=="R"]
walk_barriers = [DPD_barriers with w.final_classification=="W"]
DPD_candidates = [DPD_candidates with final_confidence >min_acceptable_score]

for c in DPD_candidates:
if ( there are resting barriers and candidates):
    if tag=="enter":
        last_R_ts = the first timestamp of the last rest barrier
        if (there are walking barriers):
            last_W_ts = the last timestamp of the last walking barrier
            return [DPD_candidates if (last_W_ts<=candidate<= last_R_ts)]
        else:
            return [DPD_candidates if (candidate <= last_R_ts)]
    else :
        ... the opposite for exit
```

Fig. 31

```
def score_from_label (detected="X",confidence=0):
  D_score, P_score,X_score = 0,0,0 if detected =="X":
    X_score = 1
  elif detected =="D":
    D_score = confidence
  elif detected =="P":
    P_score = confidence
  return  D_score,P_score,X_score def Final_DPD_Decision(par,
detected_enter="X",confidence_enter=0,detected_exit="X",confidence_exit=0,BT=False):
  D_score = 0
  P_score = 0
  X_score = 1
  if at least one thing was detected :
    enter_scores = score_from_label(detected_enter,confidence_enter)
    exit_scores = score_from_label(detected_exit,confidence_exit)

if BT:
      BT_scores = par["BT_D_score"],par["BT_P_score"],0
      BT_weight = par["BT_weight"]
    else :
      BT_scores = 0,0,1
      BT_weight =0

W = (enter_weight) + ( exit_weight) + (BT_weight)  #sum of weights

D_score = ((enter_scores[0]*enter_weight) + ( exit_scores[0]*exit_weight) +
(BT_scores[0]*BT_weight))/W P_score = ((enter_scores[1]*enter_weight) + ( exit_scores[1]*exit_weight) +
(BT_scores[1]*BT_weight))/W X_score = 1 - D_score - P_score return D_score,P_score,X_score
```

```
def Fill_DPD_Familiarity_Clusters (save_to="", use_truth=False, env = ["np0"] , min_DPD_results=2,
from_date ={"day":1 ,"month":3 , "year":2019} , to_date ={"day":1 ,"month":5 , "year":2019}):

# load DPD_Results from path
 DPD_Results = sqlContext.read.load(filename)

# create all familiarity cluster in selected dates
familiarity_user, familiarity_session, clusters = familiarity(user_clustering)

add DPD score to clusters

DPD_columns = ["D_score","P_score","X_score","Truth"]
 DPD_clusters_joined_results = cluster_with_size.alias("C").join(DPD_Results_usefull.alias("DPD"),
                    ((F.col("C.UserID")==F.col("DPD.UserID"))
                    ),"left")

DPD_clusters_joined_results =
DPD_clusters_joined_results.where(join_time_condition_udf("C.Sessions","DPD.StartTimeUTC") )

cnt_cond = lambda cond: F.sum(F.when(cond, 1).otherwise(0))

if use_truth: # USE TRUE LABEL COMING FROM USER ANNOTATIONS TO ASSIGN CLUSTER SCORES
   DPD_clusters_joined_results = DPD_clusters_joined_results.groupby(cluster_columns).agg(
        F.count(F.col("X_score")).alias("N_DPD_results"),
        (cnt_cond(F.col("Truth")=="D")/F.count(F.col("X_score"))).alias("D_score"),
        (cnt_cond(F.col("Truth")=="P")/F.count(F.col("X_score"))).alias("P_score"),
        (cnt_cond(F.col("Truth")=="X")/F.count(F.col("X_score"))).alias("X_score"))

else: #USE DPD RESULTS TO ASSIGN CLUSTER SCORES
   DPD_clusters_joined_results = DPD_clusters_joined_results.groupby(cluster_columns).agg(\
        F.count(F.col("X_score")).alias("N_DPD_results"),\
        F.mean(F.col("D_score")).alias("D_score"),\
        F.mean(F.col("P_score")).alias("P_score"),\
        F.mean(F.col("X_score")).alias("X_score"))

# ONLY KEEP CLUSTER WITH min_DPD_reuslts
 DPD_clusters_with_more_results = DPD_clusters_joined_results.filter((F.col("N_DPD_results").isNotNull())
& (F.col("N_DPD_results") >= min_DPD_results ))

return DPD_clusters_with_more_results
```

Fig. 42

```
def add_lambda_feature (df,p,d):

df["lambda"] = ((
(df["P_score"]+p*df["cluster_DPD_Results"]*df["P_score_cluster"])/(1+p* df["cluster_DPD_Results"])-
(df["D_score"]+d*df["cluster_DPD_Results"]*df["D_score_cluster"])/(1+d* df["cluster_DPD_Results"])))

return df
```

```
def remove_inner_lambda(df,td,tp):
    out = df.where((df["lambda"] < td) | (df["lambda"] > tp)).dropna()
    return out
```

```
def Fill_DPD_Familiarity_Train_Table (save_to="", env = ["np0"] , sessions_from_date ={"day":1 ,"month":1
, "year":2019} , sessions_to_date ={"day":1 ,"month":1 , "year":2019},clusters_from_date ={"day":1
,"month":1 , "year":2019} , min_DPD_results = 2, clusters_to_date ={"day":1 ,"month":1 ,
"year":2019},use_truth=False,):

# load DPD_Results from path
DPD_Results = sqlContext.read.load(filename)
# select only sessions belonging to dataset
DPD_Results = DPD_Results.filter((F.col("StartTimeUTC") > min_ts) & (F.col("StartTimeUTC") < max_ts) )

# Adding Here Links to Sessions
  DPD_Results_enriched = DPD_Results.alias("DPD").join(total_enrichment.alias("HERE"), \
                    (F.col("DPD.DeviceID")==F.col("HERE.DeviceID")) \
                    &(F.col("DPD.UserID")==F.col("HERE.UserID")) \
                    &(F.abs(F.col("DPD.StartTimeUTC") -
F.col("HERE.StartTimeUTC"))<5000),"left")
  DPD_Results_enriched = DPD_Results_enriched.select("DPD.*","LinkIDs","Dbb")

# Creating clusters from the other group of sessions
DPD_Familiarity_Clusters = Fill_DPD_Familiarity_Clusters (...)

Connect sessions in the dataset with the created clusters

Current_Familiarities = get_familiarity(DPD_Familiarity_Clusters, DPD_Results_enriched_with_links)
Collect DPD scores Current_Familiarities_with_scores =
Current_Familiarities.alias("A").join(DPD_Familiarity_Clusters.alias("B"),F.col("A.cluster")==F.col("B.Cluster"
),"left")

# Add cluster score to each session in dataset
  DPD_Familiarity_Results =
DPD_Results_enriched.join(Current_Familiarities_with_scores,(DPD_Results_enriched.UserID
==Current_Familiarities_with_scores.UserID_cluster)&(DPD_Results_enriched.StartTimeUTC
==Current_Familiarities_with_scores.StartTimeUTC_cluster),"left")

return DPD_Familiarity_Results
```

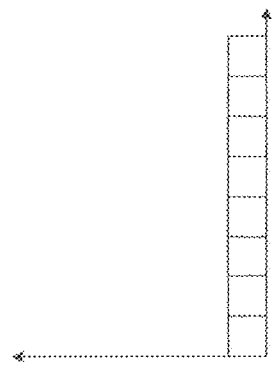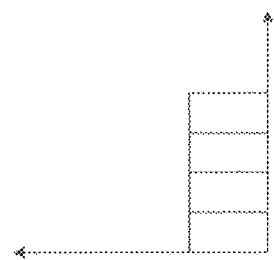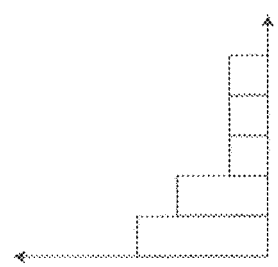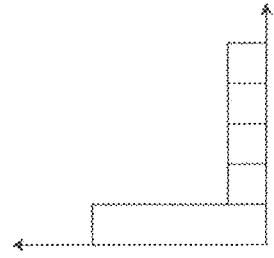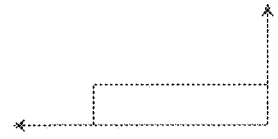
Fig. 68

MOBILE DEVICE AND SYSTEM FOR IDENTIFYING AND/OR CLASSIFYING OCCUPANTS OF A VEHICLE AND CORRESPONDING METHOD THEREOF

CROSS REFERENCE TO RELATED APPLICATION

The present application is a continuation application of International Patent Application No. PCT/EP2020/075548, filed on Sep. 11, 2020, the content of which is hereby incorporated by reference in its entirety.

FIELD OF THE INVENTION

The present invention relates generally to occupant detection systems particularly to systems and methods for classifying occupants of vehicles. More generally, the invention relates to mobile real-time systems reacting dynamically to captured environmental or operational parameters, in particular to automotive use monitoring, capturing and reacting to automotive or user-related parameters in the context of motor vehicle operation. More particularly, the present invention relates to telematics based devices and systems to identifying occupants in a vehicle. Finally, the invention also relates to telematics-based real-time expert systems. The term telematics, in particular traffic telematics, refers to systems that are used for communications, instrumentation and control, and information technology in the field of transportation. Thus, the present invention relates to the use of telematics together with real-time measuring, monitoring, dynamically and automatedly adapting systems based on captured and measured usage-based and/or user-based telematics data.

BACKGROUND OF THE INVENTION

Up-to-date engineered car driving (including completely manually controlled driving, partially autonomous car driving, driverless cars, self-driving cars, robotic cars) is associated with vehicles that are capable of sensing their environment and operational status or use. At the same time, the use of sensors in cellular mobile phones, in particular in so called "smart phones", has strongly increased in recent years, making it possible to monitor or time-dependent track the operation mode of the smart phone as well as surroundings, use or even behavior of the user. Modern, mobile smart phones comprise a variety of sensors, as touchscreens, accelerometers, gyroscopes, GPS, cameras, microphones etc., allowing to capture a vast mixture of contextual parameters during the use of the mobile device. On the other side, digital systems of the vehicle can include transceivers and/or interfaces that are configured to communicate with a driver's mobile phone. Typically, the driver can utilize the vehicle computer system to handle hands-free communication utilizing vehicle features. For example, the conversation can be output on vehicle speakers and a vehicle mic may be utilized to pick up. Other occupants and/or passengers can be in the vehicle when a driver has initiated a voice session.

The communication between the mobile device and the computer system of the vehicle can related to other data than voice transmission, since modern automotive engineered vehicles are capable of detecting a wide variety of operational or surrounding parameters using for example radar, LIDAR (measuring device to measure distances by means of laser light), GPS (Global Positioning System), odometry (measuring device for measuring changings in position over time by means of using motion sensor data), and computer vision. In modern cars, advanced control systems often interpret sensory information to identify appropriate navigation paths, as well as obstacles and relevant signage. The sensors may comprise active and passive sensing devices, wherein sensors are physical converter devices measuring a physical quantity and converting the measured physical quantity into a signal that can be read by an observer or by another instrument, circuit or system. Commonly used sensors for automotive motor vehicle or mobile cell phones are for example infrared sensors containing an infrared emitter, and an infrared detector, for example used with touchless switches, passive infrared (PIR) sensors reacting and detecting only on ambient IR such as motion sensors, speed detectors e.g. radar guns such as microwave radars using the Doppler effect (the return echo from a moving object will be frequency shifted) or IR/Laser radars sending pulses of light for determining the difference in reflection time between consecutive pulses to determine speed, ultrasonic sensors emitting a sound and detecting the echo to determine range, accelerometers measuring the rate of change of the capacitance and translating it into an acceleration by means of a proof mass, gyroscopes measuring a mass oscillating back and forth along the first axis, and plates on either side of the mass in the third direction where the capacitance changes when a rotation is detected around the second direction, IMU-sensors (Inertial Measurement Unit) providing a sensor with a full 6-degrees of freedom by using a combination of accelerometer and gyroscope, force sensing resistor e.g. for contact sensing, touchscreens based on resistive, capacitive or surface acoustic wave sensing, location sensors such as GPS (Global Positioning System), triangulation or cell identification systems, visual sensors such as cameras and computer visions, SIM-based or RFID-based (Radio-Frequency Identification) sensors, or environment sensors as moisture sensors, humidity sensors, temperature sensors, magnetometer etc. Due to the improved assistance by such digital systems and sensory data, vehicle driving are steadily becoming safer by incorporating automated systems to monitor operations of the vehicle while the vehicle is in motion and to provide coordinated alerts and assistance as needed. However, difficulties remain in reliably detecting the presence of vehicle occupants and accurately identify them as driver or passenger, and/or even classify them as children, small adults, and/or according to other classifications, and particularly in differentiating between classifications. Accurate classification can be critical when the vehicle is attempting to assist or enact safety measures to protect the occupant or in measuring occupant-specific risk-exposure parameters.

However, often it is desirable, not to rely on the automotive sensory of the vehicle, for example since the mobile phones of the passengers are not connected to the automotive digital systems of the vehicle and thus a biunique identification of all the occupants of a vehicle cannot be performed. The correct identification of driver versus passenger are not only important for applications related to the driver and his phone, as e.g. for technical assistance, real-time monitoring, accident identification or risk measurements etc. but also in relation to possible assistance by a passenger. For example, there are technical applications for enhancing the driving safety of senior passengers. Though it is known for teenage drivers, that mutual distractions may create an elevated risk for major crashes, studies show that the presence of passengers can be protective for seniors. These studies show that crash rates are lower when seniors drive with a passenger that when they drive alone. It turns out that passengers can be helpful copilots by keeping drivers alert, assisting with navigation, waring of impending hazards, and operating the radio, heat and air-conditioning controls, or using the cell phone.

There is a considerable interest and need in leveraging the recent advances in the sensing, data storage-processing and wireless communications technologies in vehicles to introduce smart functionalities more fundamentally. One of the aims is to offer drivers and passengers, not only safer, but also a personalized and more pleasant driving experience and technical support. This goes beyond the classical Advanced Driver Assistance Systems (ADAS) and route guidance services to customizing the vehicle interior and adapting its systems to the driver "and" passenger(s) profiles and preferences, for example seat positions, setting reminders, temperature control, HMI, infotainment system, etc. Nevertheless, such functionalities rely fundamentally on identifying the vehicle occupants, particularly when a vehicle has multiple occupants. They also may require labeled pertinent data, i.e. for a known occupants, from various sources such as in-vehicle sensing systems or smartphones or even infrastructure, to learn preferences, profiles and behaviors. Biunique driver and passenger identification is also relevant to insurance telematics, for instance the driving style can allow automated setting the driver's or a passenger's risk-transfer premium by appropriate electronic risk-transfer systems. Apart from using the smart phone sensory data, establishing the style can be based on recorded data from the vehicle On-Board Diagnostics (OBD) system or present smartphone(s), assuming a known driver identity. Other automotive applications that require data tagging, thereby driver and/or passenger recognition, encompass those aimed at reducing the carbon footprint of driving as per the driver's or passenger's travel history, traffic status and others.

The remarkably fast growth of smartphone ownership has motivated the move towards exploiting smartphones versatile set of sensors, such as the Global Navigation Satellite System (GNSS) receiver and Inertial Measurement Units (IMUs), in automotive applications. Examples include: traffic state estimation, navigation, driver assistance and many others. Interestingly, the problem of determining the smartphone to vehicle position is closely related (or corresponds) to the driver and passenger(s) identification task. This capitalizes on the premise that the smartphone is: (i) usually in the vicinity of its owner, and (ii) a personal item, which is not shared with other users, unlike a (smart) key-fob, which can be used/shared by multiple vehicle drivers. Smartphone-to-vehicle localization, which covers inside and/or outside the vehicle, hence enables identifying the present vehicle user(s), i.e. if the smartphone owner is the driver or, front or rear passenger. Recognition can be performed before or after entering the car. Locating the phone within the vehicle can, amongst others, be employed to minimize distractions induced by using a smartphone whilst driving. For example, the driver's smartphone services and functionalities can be accordingly restricted. Additionally, realizing a connected cooperative vehicle environment is currently attracting another interest from researchers and OEMs around the world, mainly due to its importance to autonomous driving. This includes vehicle to vehicle, vehicle to infrastructure and vehicle to cloud communications, typically with stringent latency and performance requirements. Thus, a smartphone user identification solution can exchange data with the vehicle in a connected set-up. It can also have access to the vehicle data (e.g. doors signal, which indicates whether a given vehicle door is opened or closed), user's calendar, journeys history, etc.

Thus, a smartphone-based driver/passenger(s) identification or phone-to-vehicle localization, foremost self-sustaining base on the smart phone sensory but for certain applications also imaginable in a connected vehicle environment, has various applications in intelligent vehicles. This comprises, but not limited to, delivering personalized driving experience via adapting in-vehicle systems, insurance telematics and minimizing distractions. Vehicle keyless entry systems, authentication and security in general, are other areas that can benefit from an additional modality for confirming the identity of the present occupants, i.e. from his/her smartphone data. Not showing the disadvantages of the prior art smartphone-based driver and passenger(s) recognition and methods, the present invention proposes a novel identification technique for a secure and biunique smartphone-based driver and passenger(s) recognition. The present invention allows fusing the smartphone sensory data and may be further improved by using vehicle signals (namely, doors signal) in a connected environment. The proposed approach relies on analyzing the user motion during entry to vehicle, capturing well defined salient features that vary depending on the entry side (driver or passenger). It considers the gradient of the turning angle during the entry micro-movements. Extracted features are utilized by a classifier to determine the probability of the user being a driver or passenger. Unlike prior art systems, the present smartphone-based invention introduced here is: (i) independent of the phone position and orientation (thereby does not impose restrictions on where the user has to carry the phone during-after entry), (ii) unsusceptible to errors induced by, potentially, low quality smartphone sensory data, and (iii) less sensitive to variations in the entry behavior. Overall, the present invention discloses an effective and generic, novel smartphone driver/passenger(s) recognition technique. It is enabled by a principled treatment of the considered classification problem, careful processing of the sensory data and clearly identifying representative features.

SUMMARY OF THE INVENTION

It is one object of the present invention to provide techniques for a system and method to detect and/or classify a vehicle occupant, such as a driver or a passenger seated within the cockpit or other seats of a vehicle without having the disadvantages of prior art systems. Independent in dedicated in-vehicle hardware possibly providing an alternative solution to the problem (e.g. retina or face scanners presented in CES2018), the invention shall provide an appropriate system and method for identification and/or classify a vehicle occupant solely based on the available sensors of a smartphone of a smartphone user, e.g. applicable to the realization of usage-based risk-transfer as PAYD (Pay As You Drive) or PHYD (Pay How You Drive) risk-transfer and/or for in-cabin personalization. Though the invention shall provide a smartphone-based driver/passenger(s) identification or phone-to-vehicle localization, foremost on a basis of the smart phone sensory, however for certain applications, the invention should also be combinable with a connected vehicle environment, providing various applications in intelligent vehicles.

According to the present invention, these objects are in particular achieved with the features of the independent claims. In addition, further advantageous embodiments can be derived from the dependent claims and the related descriptions.

According to the present invention, the above-mentioned objects for identifying and/or classifying an occupant of a vehicle based on sensory data measured by a plurality of sensors of a cellular mobile device of the occupant, are in particular achieved in that, the plurality of sensors of the cellular mobile device at least comprise an accelerometer and a gyroscope, the mobile device further comprising one or more wireless connections, wherein by at least one of the wireless connection, the cellular mobile device acts as a wireless node within a cellular data transmission network by means of antenna connections of the cellular mobile device to the cellular data transmission network, and the plurality of sensors being connected to a monitoring mobile node application of the mobile device, wherein the monitoring mobile node application captures usage-based and/or user-based telematics data of the cellular mobile device and/or the user of the cellular mobile device, in that the mobile device measures gravitational acceleration movement sensory data by means of the accelerometer based on measuring parameters obtained from the accelerometer, wherein vehicle entering or exiting movement patterns of the user are detected from the acceleration movement sensory data at least comprising pattern for base axis and degree of rotation associated with a vehicle entrance or exit of the user, and in that the detected vehicle entering or exiting movement patterns of the user trigger as input features the recognition of a vehicle entering or exiting movement of the user by performing a decision-tree classification on the input features to rule out whether the user entered or exited from a left or right side of the vehicle. The inventive system and method detects the user rotation direction while entering (and exiting) the car, using the information obtained from the gyroscope sensor (yaw) through a machine learning algorithm. The mobile telecommunication apparatus can e.g. comprise at least a GPS module (Global Positioning System) and/or geological compass module based on a 3-axis teslameter and a 3-axis accelerometer, and/or gyrosensor or gyrometer, and/or a MEMS accelerometer sensor comprising or consisting of a cantilever beam with the seismic mass as a proof mass measuring the proper or g-force acceleration, and/or a MEMS magnetometer or a magnetoresistive permalloy sensor or another three-axis magnetometer. To provide the wireless connection, the mobile telecommunications apparatus can, for example, act as wireless node within a corresponding data transmission network by means of antenna connections of the mobile telecommunication apparatus, in particular mobile telecommunication networks such as 3G, 4G, 5G LTE (Long-Term Evolution) networks or mobile WiMAX or other GSM/EDGE and UMTS/HSPA based network technologies etc., and more particular with appropriate identification means as SIM (Subscriber Identity Module) etc. The mobile telecommunication apparatus and the monitoring cellular mobile node application can (but does not have to) for example be connected to an on-board diagnostic system and/or an in-car interactive device, wherein the mobile telecommunications apparatus capture usage-based and/or user-based automotive data of the motor vehicle and/or user. The mobile telecommunications apparatus can for example provide the one or more wireless connections by means radio data systems (RDS) modules and/or positioning system including a satellite receiving module and/or a mobile cellular phone module including a digital radio service module and/or a language unit in communication the radio data system or the positioning system or the cellular telephone module. The satellite receiving module can for example comprise a Global Positioning System (GPS) circuit and/or the digital radio service module comprises at least a Global System for Mobile Communications (GSM) unit. The plurality of interfaces of the mobile telecommunication apparatus for connection with at least one of a motor vehicle's data transmission bus can for example comprise at least on interface for connection with a motor vehicle's Controller Area Network (CAN) bus, for example in connection with on-board diagnostics (OBD) port, or other connection for example for battery installed devices, or also OEM (Original Equipment Manufacturer) installed systems getting information access to on-board sensors or entertainment systems (as e.g. Apple Carplay etc.) providing the necessary vehicle sensor information. One of the advantages of the present system is to provide a technical and comprehensive solution that is able to identify and classify a user of a cellular mobile device by detecting the user rotation direction while entering (and exiting) the car, using the information obtained from the accelerometer and gyroscope sensor of the mobile device through a machine learning algorithm. Related to risk-transfer, the invention allows to enable features as TBYB (Try Before You Buy) features in a way, which is not possible for competing risk-transfers by prior art systems. Furthermore, the inventive system and platform is able to provide end customer the basis to select risk-transfer products e.g. PHYD (Pay how you Drive) or PAYD (Pay as you Drive)) based on the proper identification and classification of a user of a mobile device (driver/passenger) in regard to the use of a vehicle.

BRIEF DESCRIPTION OF THE DRAWINGS

The present invention will be explained in more detail, by way of example, with reference to the drawings in which.

use 80 seconds, but longer buffer size are possible) is stored until the trip is validated (6400 byte/sec at 100 Hz). If the trip-validation trigger confirms that a trip has started, all the current buffer can e.g. be saved as StartBuffer. The same logic will apply to an according End Buffer, which can be the last available buffer before the end-trip trigger. The DPD parameter processing can e.g. take as argument the Start Buffer, the EndBuffer or (preferably) both. This algorithm will load the necessary sensors, apply some standard transformations on the input and finally search and classify each possible movement (DPD candidate) inside the current buffer. Finally, in FIG. 4, the best DPD entrance candidate, together with the best exit candidate and the best overall is sent and stored to the database as "DPD events".

FIG. 5 shows an exemplary processing code of the parameters needed by the DPD data processing, which can be given in a dictionary form as given in FIG. 5. The DPD input sensors are here (1) Gyroscope (timestamp,x,y,z), (2) Accelerometer(timestamp,x,y,z), (3) RotationVector(timestamp,x,y,z,w), and (4) (optional)StepDetector(timestamp). While the inputs of the DPD data processing are here (aside from time): (1) Gyroscope z component in the Earth Reference, (2) Accelerometer x,y,z in the device reference system, (3) Accelerometer z component in the Earth Reference, (4) (optional) the StepDetector, and (5) All the parameters of the model. The accuracy of the DPD measuring parameter processing depends on these parameters and their values can be set and updated by any future training procedure. Current values are obtained after a small grid exploration, and correspond to a F1 score for Driver detection of 0.84 (with Precision=0.88 and Recall=0.81). Results typically improve after an extensive training stage.

FIG. 6 shows an exemplary processing code, with a Window being a simple multi-use class containing minimum info about a certain time slice, plus some additional info. Three scenarios are anticipated, in which windows are used, postponing for this moment specific details about the nature of the signals (see below), namely "Rotation Window", "Acceleration Window", and "Discontinuity Window".

Figure 7:
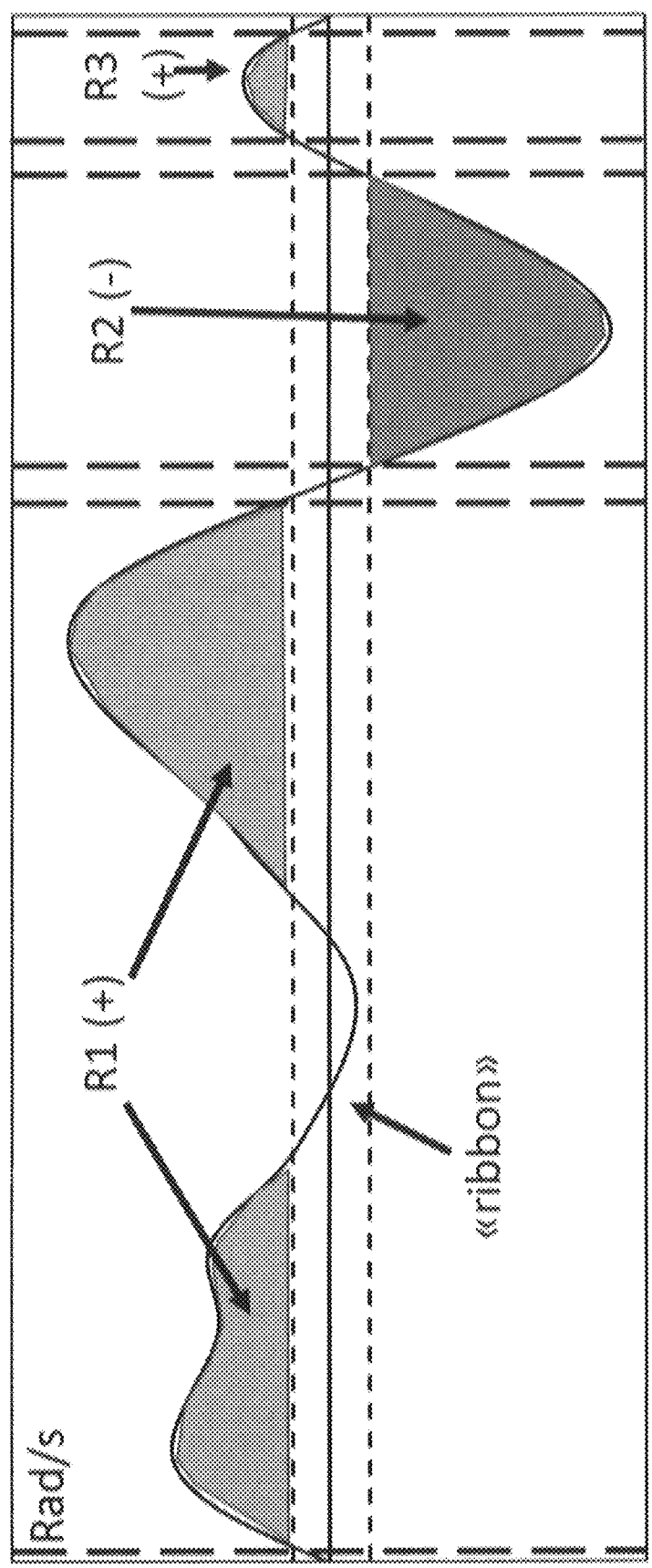

FIG. 7 shows diagram schematically illustrating an exemplary picture with regions where the three rotations related to a gyroscope signal are expected to be found. A "Rotation Window" is a window related to the gyroscope signal. In the context of DPD, a "rotation" is a coherent movement in the xy-plane (Earth coordinates system) around the z axis (up/down direction). A rotation is not the window delimited by two intersections of the gyroscope signal with the zero axis. Instead, it is a window inside which the gyroscope signal does not change much its sign. Here, the first two red (light grey) areas are joined together since they have the same sign and are not separated by a big-enough blue area (dark grey). Here the size of the "ribbon" has been exaggerated for clarity.

FIG. 8 shows an exemplary processing code illustrating the find-rotation-process of a window given at a certain threshold.

Figure 9:
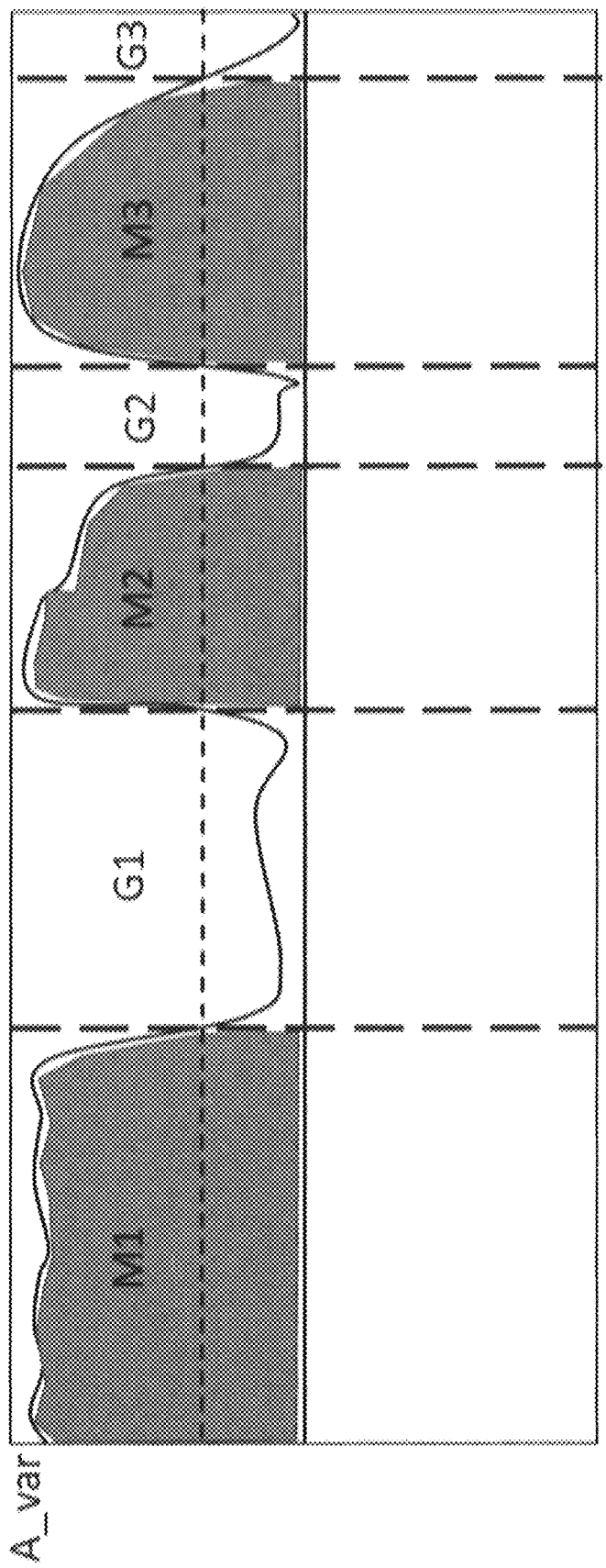

FIG. 9 shows a diagram schematically illustrating an exemplary picture how an Acceleration Window is a window related to the accelerometer signal. It has been built using a threshold on the variance of the acceleration in the z direction (Earth Coordinate System).

FIG. 10 shows an exemplary processing code illustrating how a window can e.g. be built every time the acceleration variance crosses the threshold lines. These windows can be either movements "M" or gaps "G", and every movement can be a DPD candidate "S" (Sitting) or not.

FIG. 11 shows a diagram schematically illustrating an exemplary picture how a Discontinuity Window is a window related to the (not rotated) accelerometer signal. It is built around a discontinuity in one (or more) of the accelerations signals in the smartphone reference system. For example, when the component of the gravity force switches from an axis to another (from X to Y in the D1 windows in picture below). It is built using a sliding window and its size depends on thresholds. Its pattern is also saved for later classification. (i.e. D1 has a pattern X(positive)→Y(positive), while D2 has a pattern Y(positive)→X(negative))

FIG. 12 shows an exemplary processing code illustrating how a window can e.g. be built using a sliding window and its size depends on thresholds.

FIG. 13 shows a diagram schematically illustrating an exemplary plot how these windows look like with real data.

FIG. 14 shows an exemplary processing code illustrating a "uniform sampling" transformation used for a resampling of buffers data.

FIG. 15 shows an exemplary processing code illustrating a rotation transformation which is a rotation of the Gyroscope and Accelerometer signals to the Earth reference system. This can be achieved by using the quaternion rotation vector to build a rotation matrix and then applying this rotation matrix to the input vectors.

FIG. 16 shows an exemplary processing code illustrating the time-in-seconds transformation which allows adding a time-in-second column to all of the buffers. Seconds can be measured since the most left timestamp present in the session. This may be computationally demanding but may avoid numerous technical problems. It may be also advantageous to collect data using elapsed seconds only, including the starting timestamps in the metadata of a session FIG. 17 shows an exemplary processing code illustrating the Acceleration Normalization and Gravity subtraction transformations allowing to standardize signals coming from different operating systems of the mobile phones, as e.g. the iOS (measured in g units) to that of Android devices (measured in $m/s^2$). This procedure does not need to rely on the internal information of the smartphone model, but it may simply check if the mean absolute value of the acceleration (which contain the gravity acceleration) is compatible with $m/s^2$. The Acceleration Normalization is technically necessary if the same thresholds is to be used for both the signals. Gravity subtraction acts on the ROTATED signal and subtract g=9.81 ($m/s^2$) from the acceleration z component.

FIG. 18 shows an exemplary processing code illustrating a Transformation Pipeline automatically performing all standard transformations in the correct order: 1. Uniform sampling; 2. Time in seconds; 3. Initialize Stats, 4. Acceleration Normalization (must be done before rotation), 5. Rotation, 6. Subtract g from the acceleration z component (must be done after rotation), 7. Add Utility Columns.

FIG. 19 shows an exemplary processing code illustrating a windows detection and scoring transformation. This pipeline can be mainly a wrapper of the 'Score_movement' function, whose goal is to find the best DPD candidate found in the current session. Its task are: 1) Find all Rotations present in the gyroscope buffer; 2) Find all Discontinuities in the not-rotated accelerometer buffer; 3) Find and separate Movements from Gaps using the rotated accelerometer variance along the z component; 4) Score every Movement found; 5) Score every gap found; 6) Save some results for plotting (optional); 7) Apply DPD_barriers filter on found DPD_candidates; 8) Select the best among the remaining DPD_candidates; 9) Save the best candidate in Session.DPD_candidates.

FIG. 20 shows an exemplary processing code illustrating the Score Movement transformation which is a wrap function for the following pipeline: 1. find the $C_{score}$ of w, and collect all discontinuities overlapping with w; 2. (optional) split the movement in 2, if the movement is long but it has a "good" discontinuity; 3. Save the movement to DPD_barrier as "W" if it is too long; 4. find the $A_{score}$ of w; 5. find the $B_{scpre}$ of w; 6. calculate the final $S_{score}$ (weighted mean of all scores); 7. (optional) check if w is a mount holder action; 8. Find all nearby rotations; 9. Get the DPD classification and confidence; 10. Save the movement in DPD_candidates.

FIG. 21 bis 27 shows an exemplary processing code illustrating the transformations $A_{score}$ (FIG. 21), $B_{score}$ (FIG. 22), $C_{score}$ (FIG. 23), Discontinuity Type Score (FIG. 24), Final $S_{score}$ (FIG. 25), Check if M is a mount holder action (FIG. 26), and DP Classification (FIG. 27).

Figure 28:
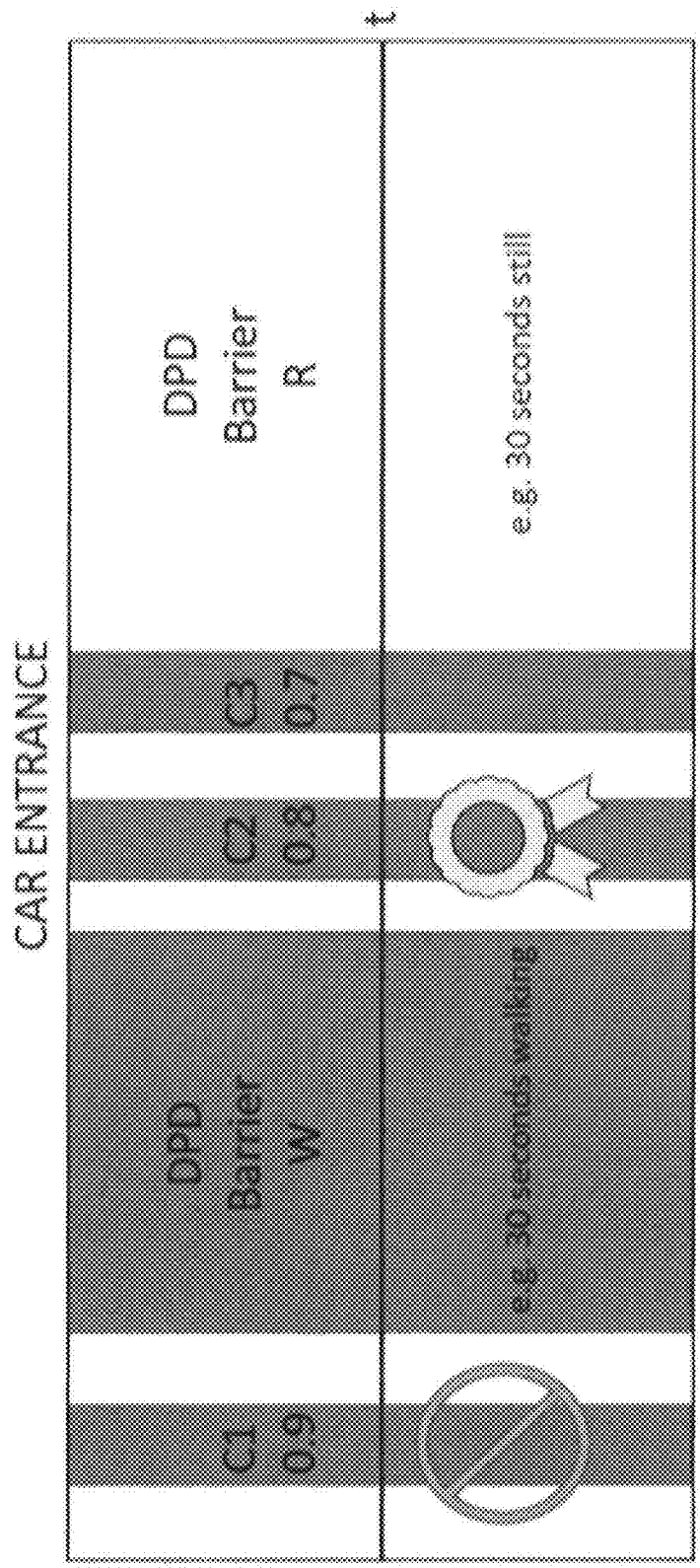

FIG. 28 shows an example picture illustrating of an entrance buffer of the DPD_barriers filter decision transformation which checks if some DPD_candidates are wrong using the DPD_barriers and not their score. Supposed is that 3 possible DPD_candidates (C1, C2 and C3) and 2 barriers, a walking "W" and a rest "R" are found.

Figure 29:
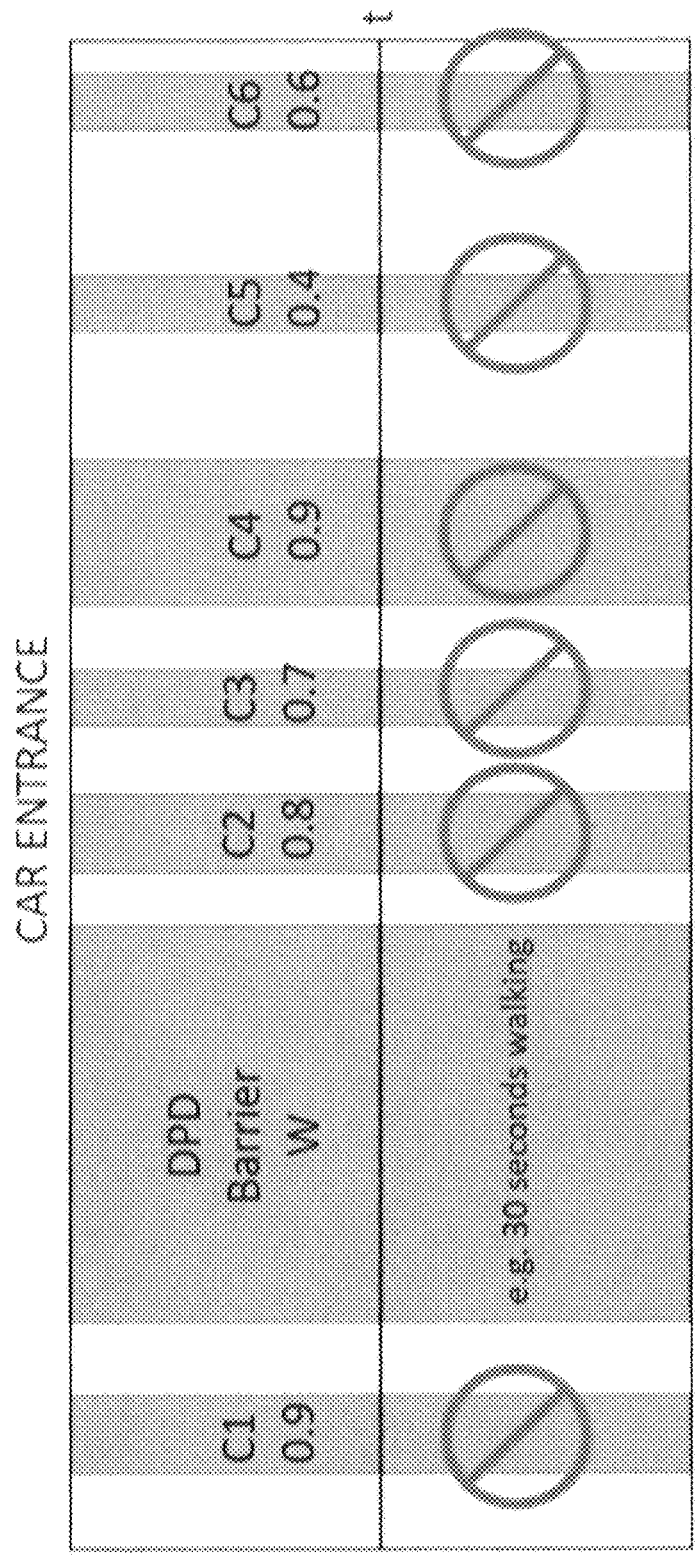
Figure 30:
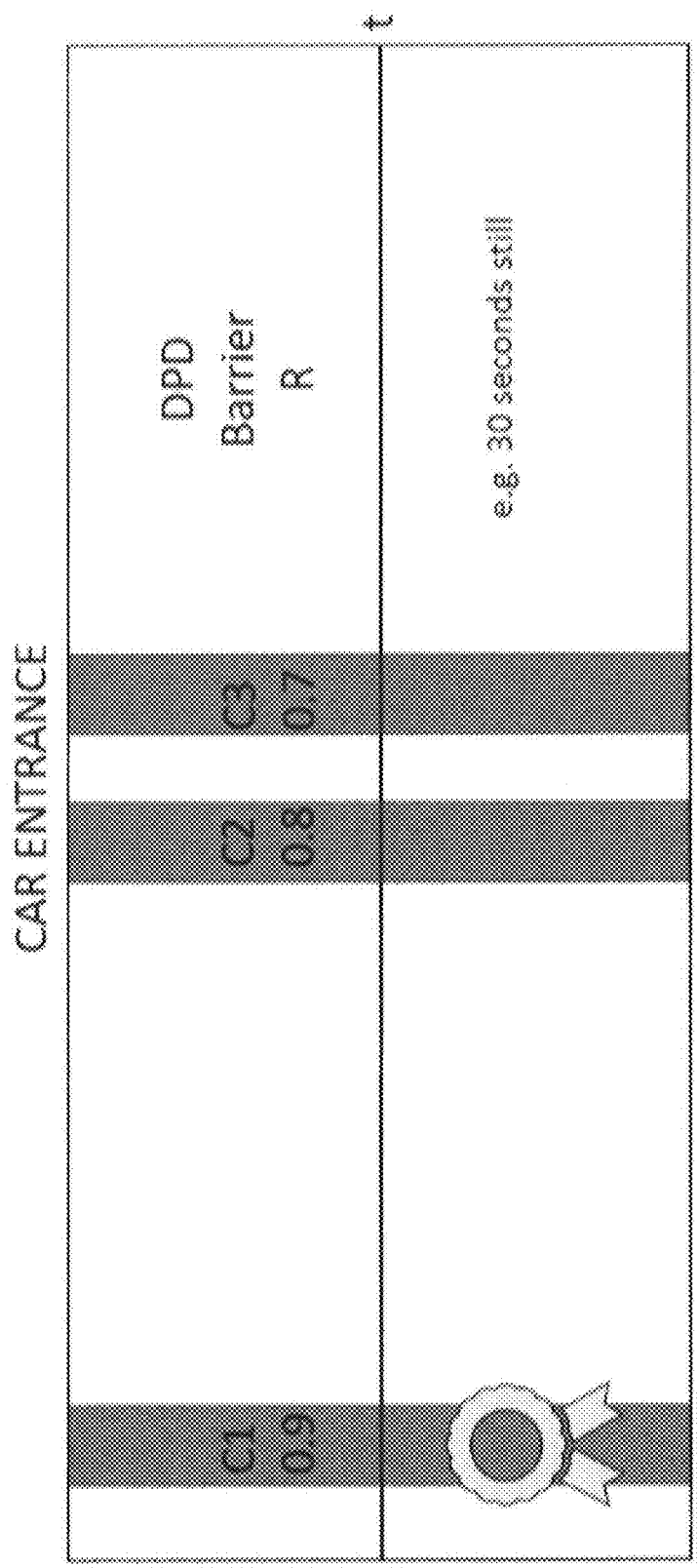

FIG. 29 shows an example picture illustrating that after the filter has been applied, the transformations return the candidate that has the best score among the leftovers. If no rest barriers are present, the output will be "X" since probably the system is not looking at a car entrance/exiting FIG. 30 shows an example picture illustrating that after the filter has been applied, the transformations return the candidate that has the best score among the leftovers. If no walking are present, the output will still be the best candidates among.

FIG. 31 shows an exemplary processing code illustrating the transformation DPD_barriers filter decision which checks if some DPD_candidates are wrong using the DPD_barriers and not their score.

Figure 32:
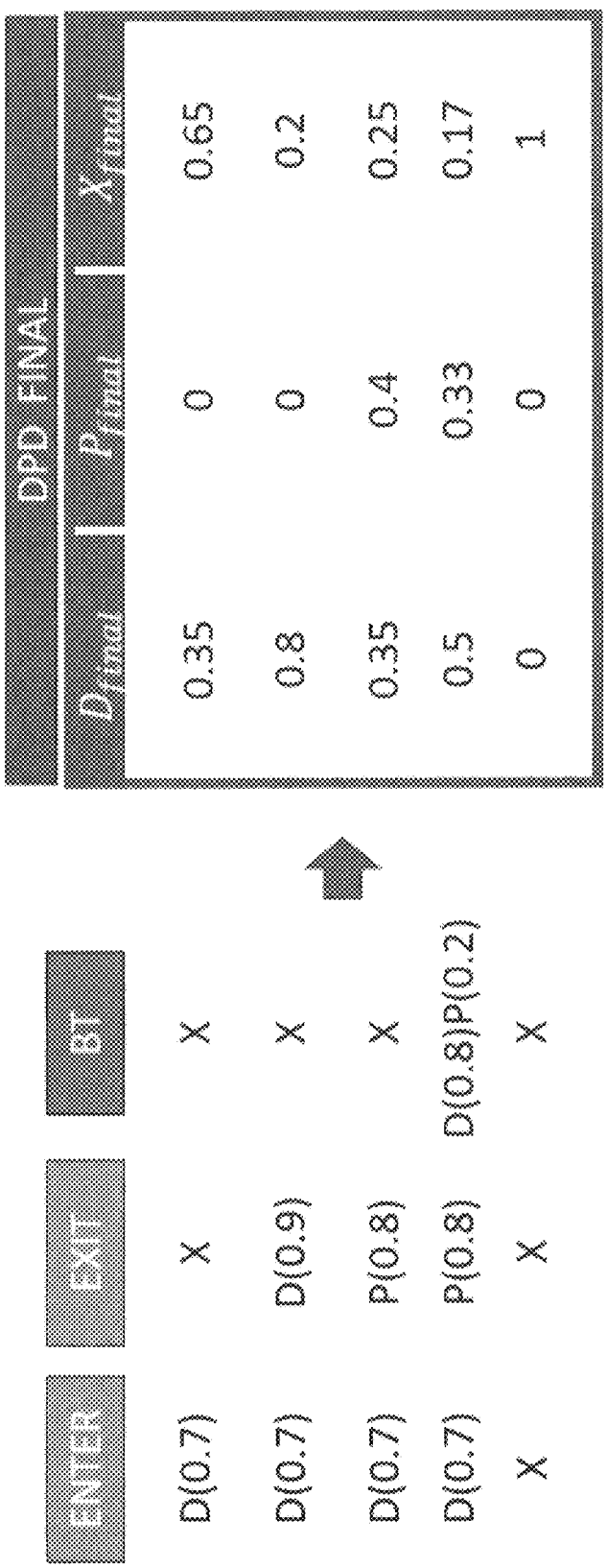

FIG. 32 shows an example diagram illustrating example of score assignment with w=1 and D_BT=0.8, P_BT=0.2.

Figure 33:
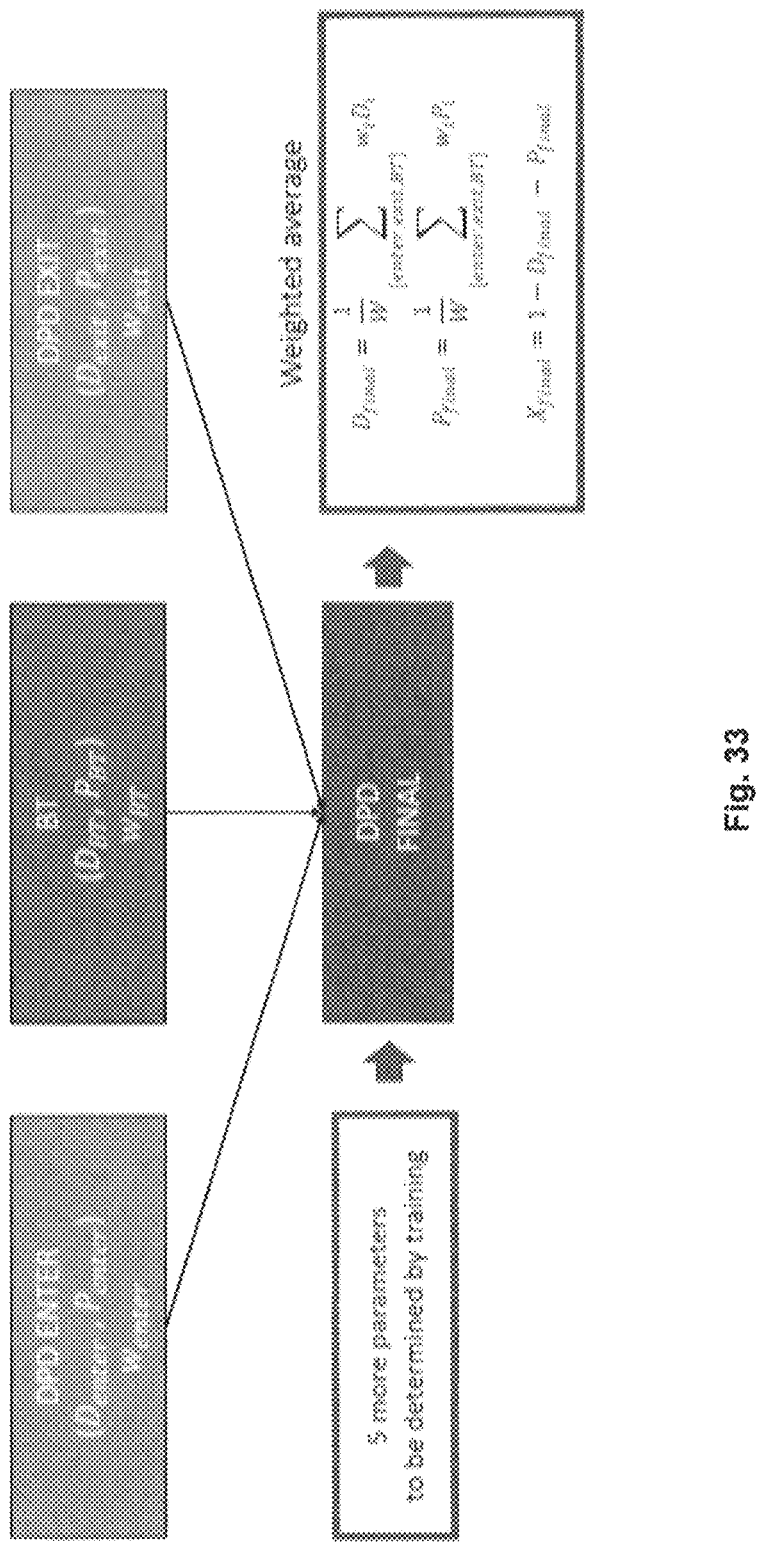

FIG. 33 shows an example diagram illustrating the final DPD decision schema.

FIG. 34 shows an exemplary processing code illustrating how from the detected labels I and their confidence levels c, a DP score can be assigned to the entrance/exit.

Figure 35:
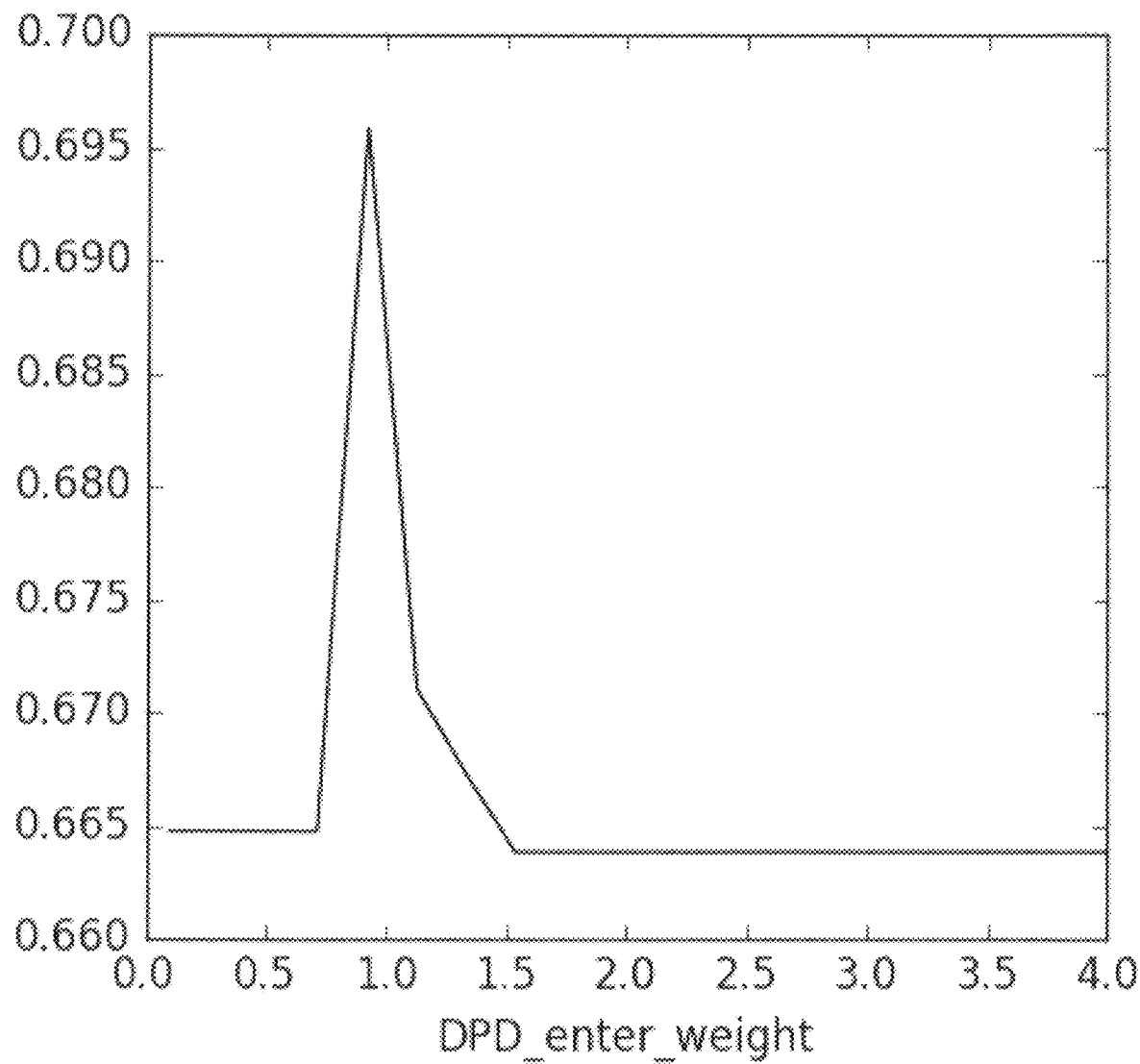

FIG. 35 shows an example diagram illustrating the relative weight of enter with respect to exit.

Figure 36:
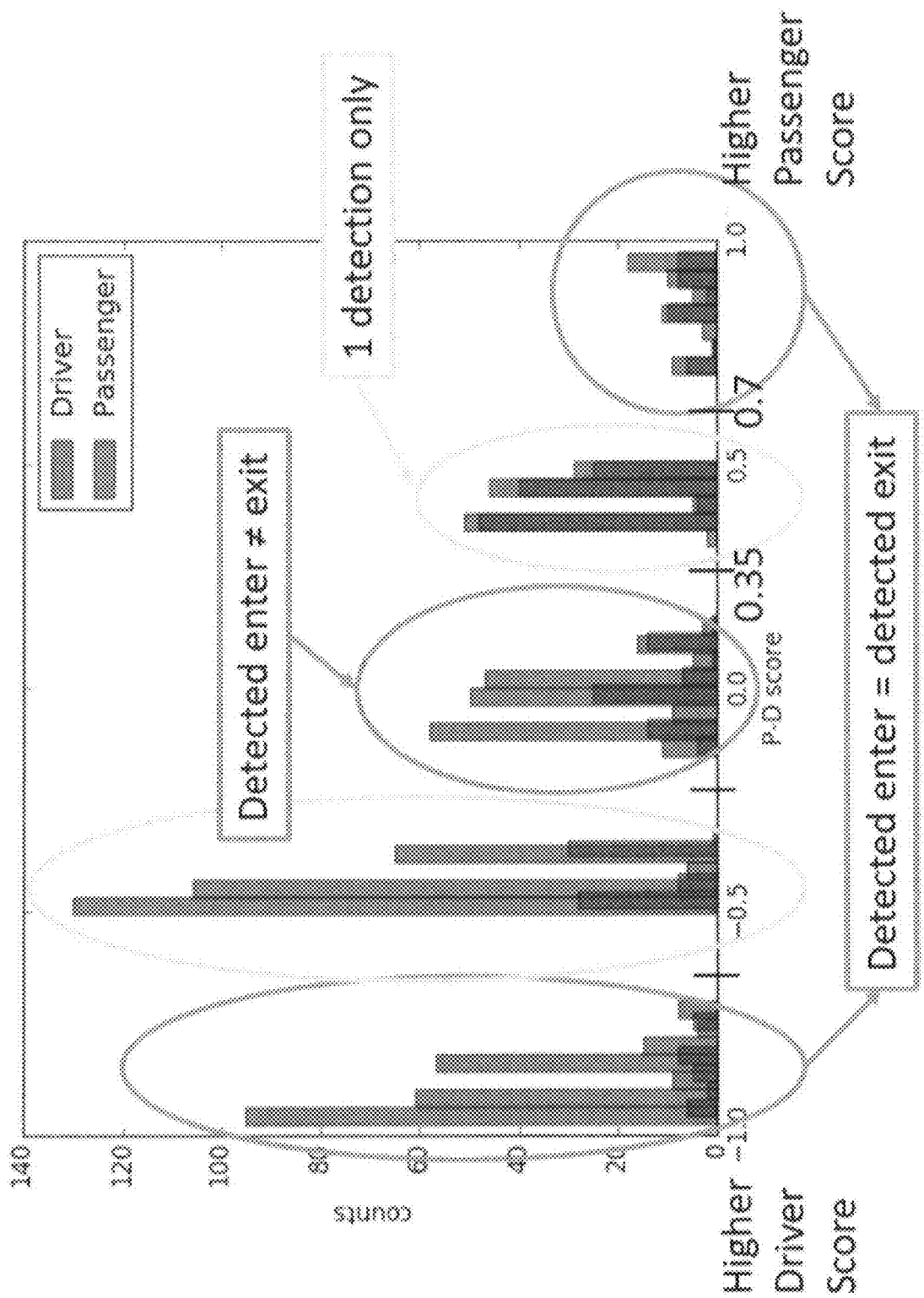

FIG. 36 shows an example diagram illustrating the distribution of DPD scores among all exemplary 2019 sessions. It shows, how the difference P-D of final scores is distributed among all the sessions collected from an example time period as e.g. January 2019 to June 2019. On the x axis, there is the difference between the final passenger score P and the final driver score D.

Figure 37:
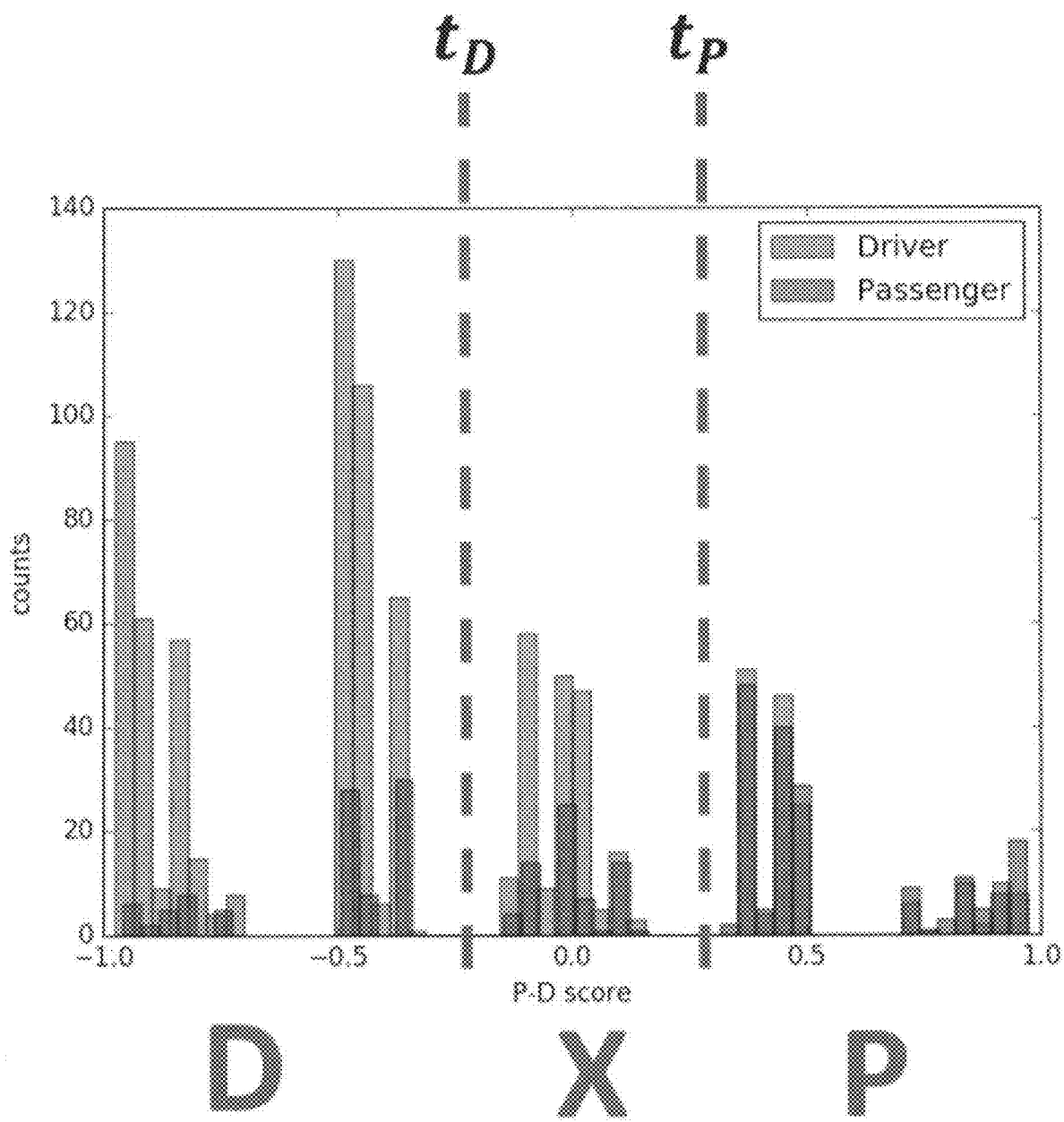

FIG. 37 shows an example diagram illustrating how to use thresholds to filter results.

Figure 38:
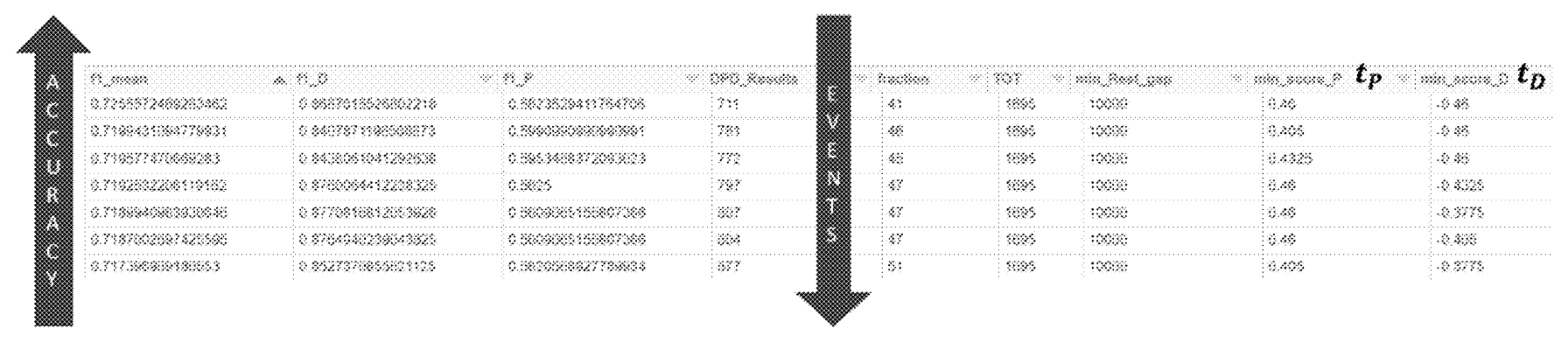

FIG. 38 shows an example diagram illustrating the training results using grid exploration with $t_P=-t_D=0.46$ resulting in a driver F1 score of 0.86, a passenger F1 score of 0.58, a mean F1 score of 0.72 and 43% of events detected.

Figure 39:
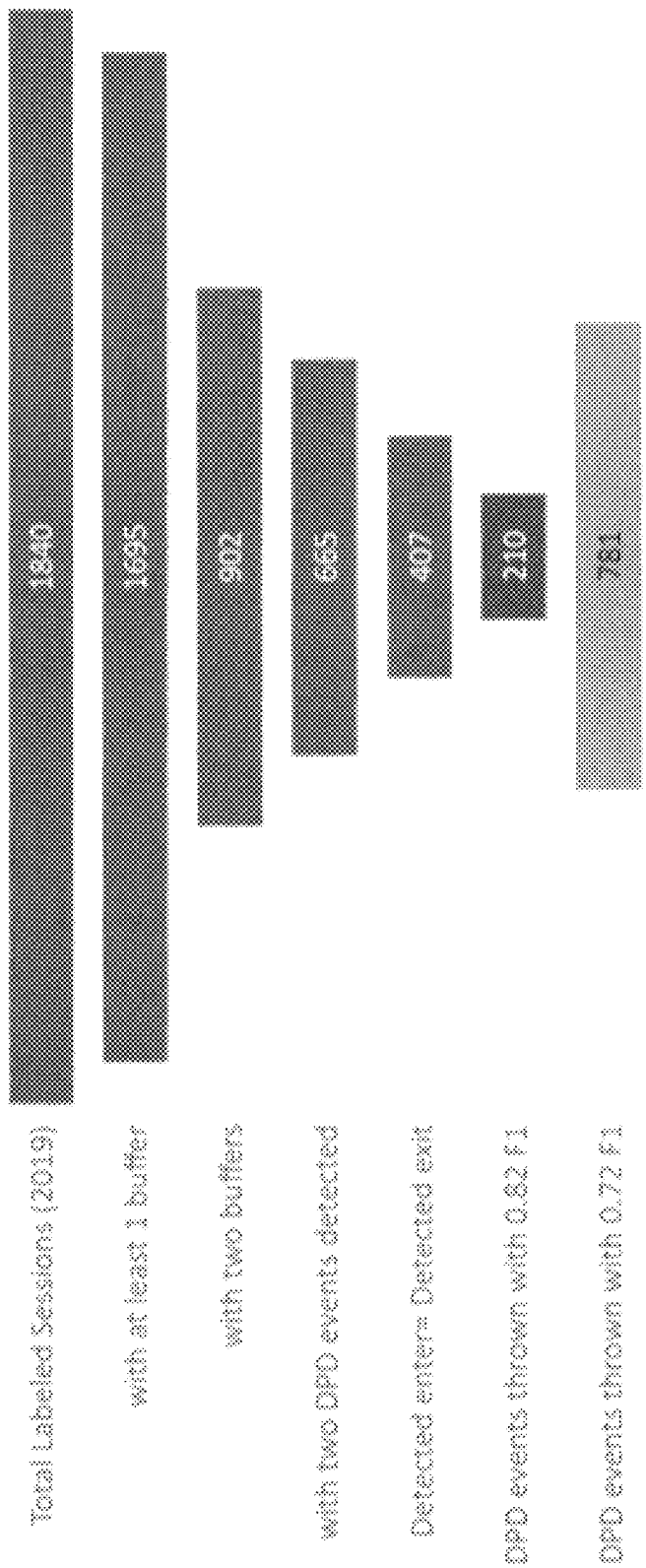

FIG. 39 shows an example diagram illustrating how it is possible to reach a mean F1 score of 0.82 by increasing thresholds and reducing the number of events detected.

Figure 40:
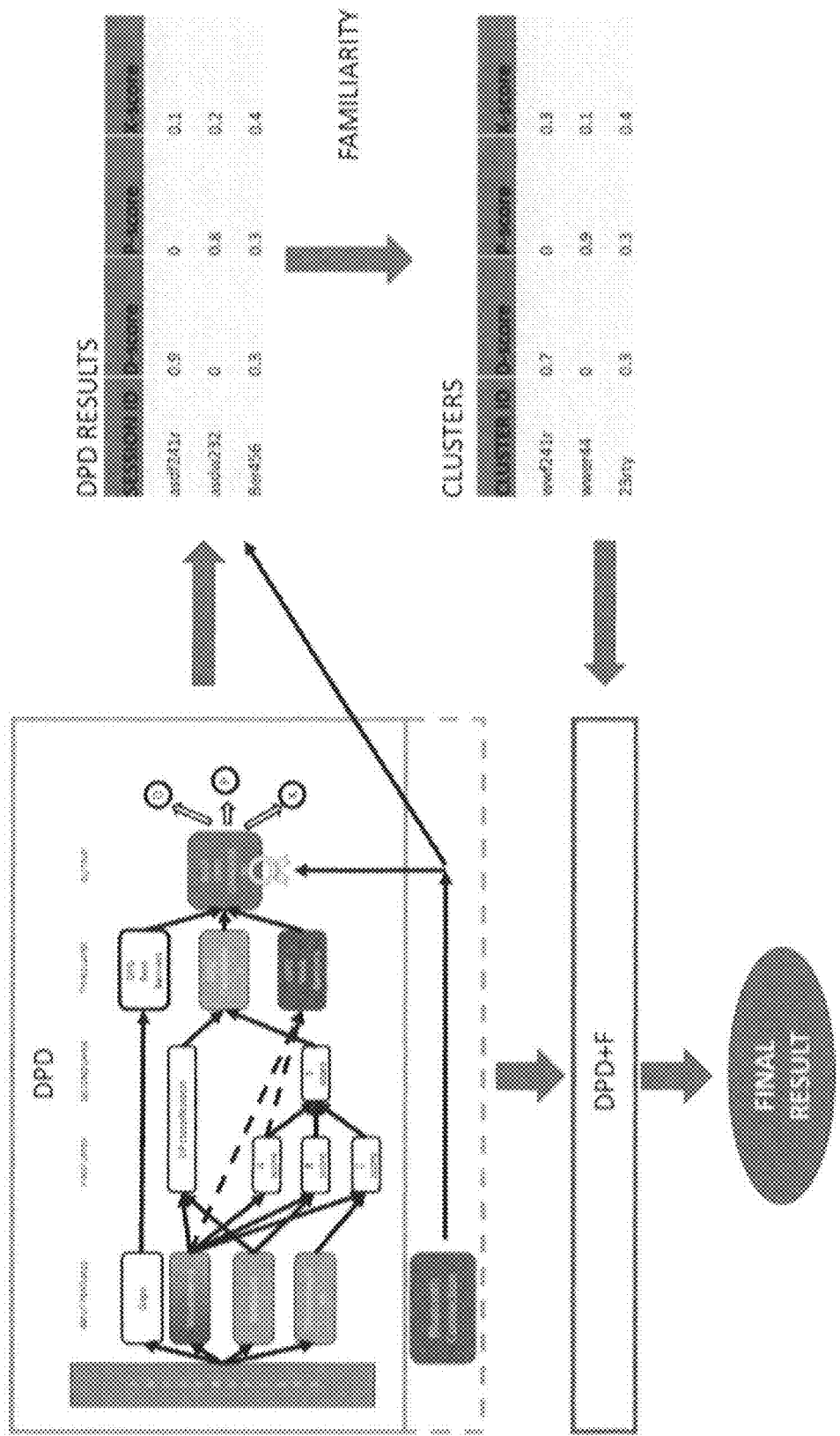

FIG. 40 shows an example diagram illustrating a schematic example of the DPD+Familiarity integration.

Figure 41:
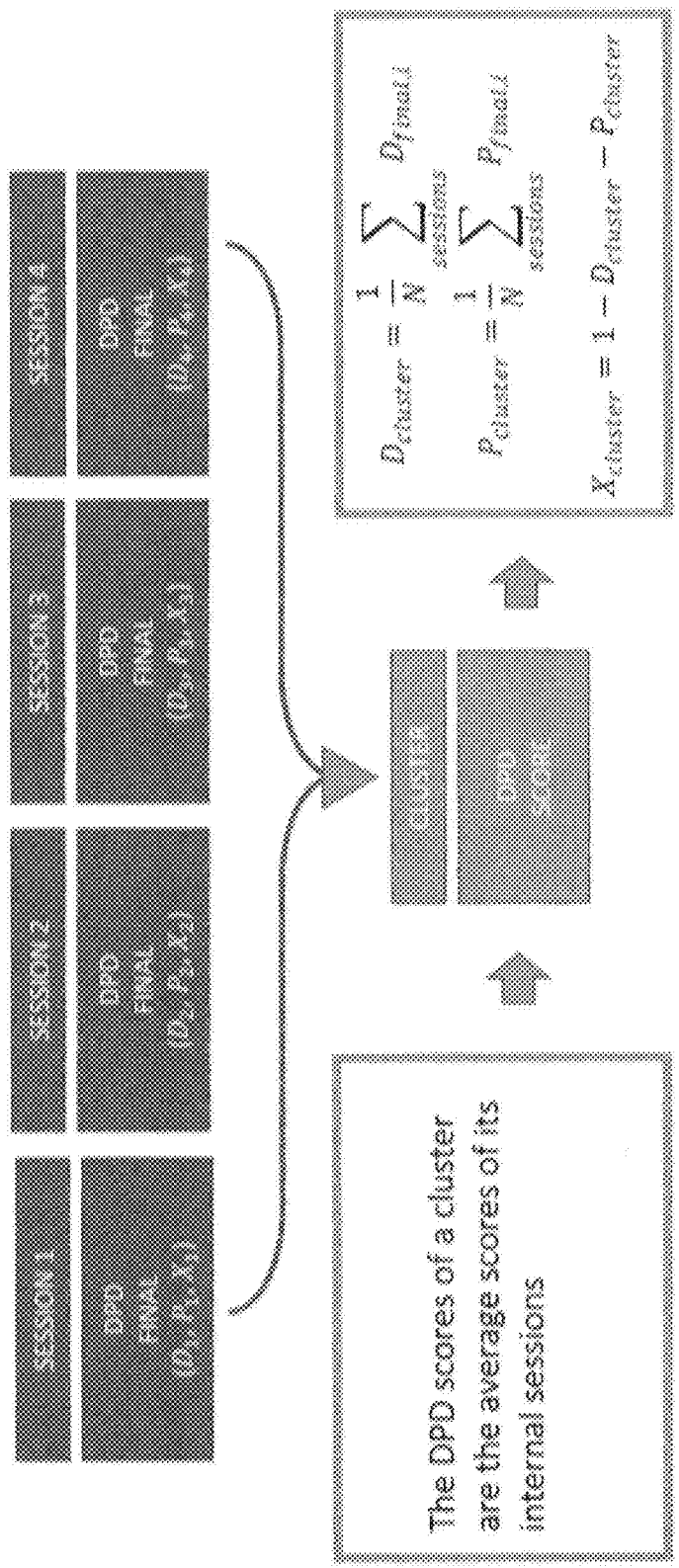

FIG. 41 shows an example diagram illustrating the DPD score of the cluster given e.g. by the average of all DPD scores of its belonging internal sessions, where (i) N is the total number of sessions with DPD score in the cluster, (ii) $D_i \in [0,1]$, $D_i \in [0,1]$, and $D_i \in [0,1]$, are the final confidence scores returned by DPD for each sessions (including enter/exit and BT connection), and (iii) cluster scores can be generated from user annotations (Truth) or eventually from a combination of both sources.

FIG. 42 shows an exemplary processing code illustrating the technical strategy used to create DPD clusters which is enclosed in the DPD+F library notebook.

Figures 43, 44:
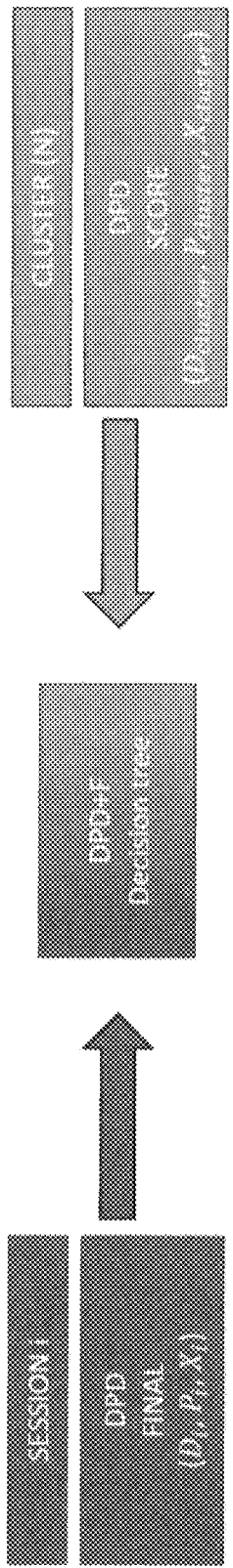

FIG. 43 shows an example diagram illustrating the final DPD+F classifier which can e.g. use a total of 5 input features coming from the session and from its belonging cluster, with (i) the final class will be decided by a DPD+F Decision Tree. Given the low number of data, the algorithm rules must be simple to technically avoid overfitting; (ii) 5 independent input features (if a matching cluster is found, otherwise DPD+F=DPD): $D_{cluster}$, $P_{cluster}$, $D_i$, $P_i$, and N; (iii) N is the total number of sessions with DPD score in the cluster; and (iv) other features such as BT presence are not used in this example.

FIG. 44 shows an exemplary processing code illustrating the final DPD decision where $D_i \in [0,1]$, $P_i \in [0,1]$ are final confidence scores returned by DPD for each sessions.

Figure 45:
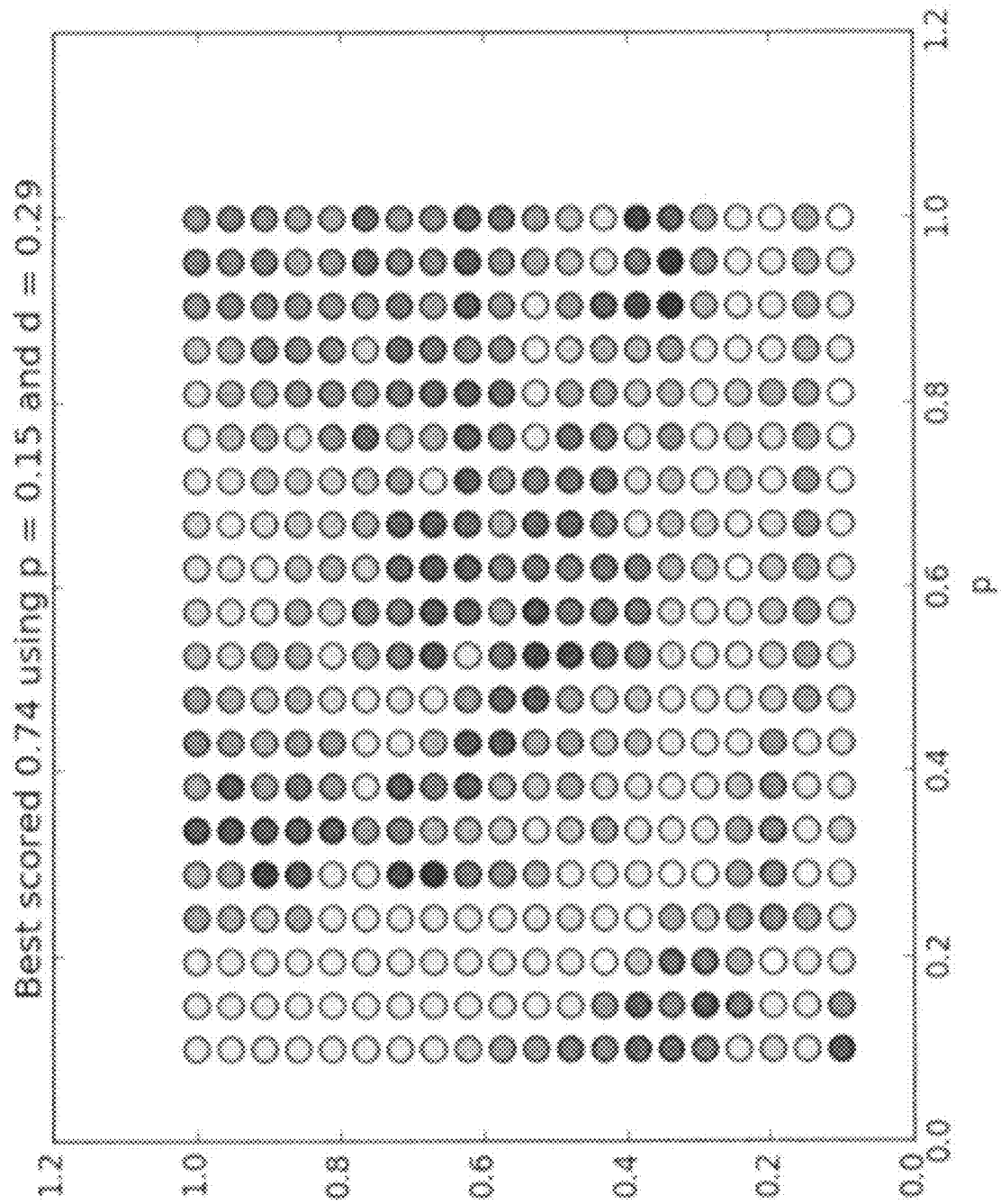

FIG. 45 shows an example diagram illustrating the grid exploration for the familiarity weights p and d.

Figures 46, 47:
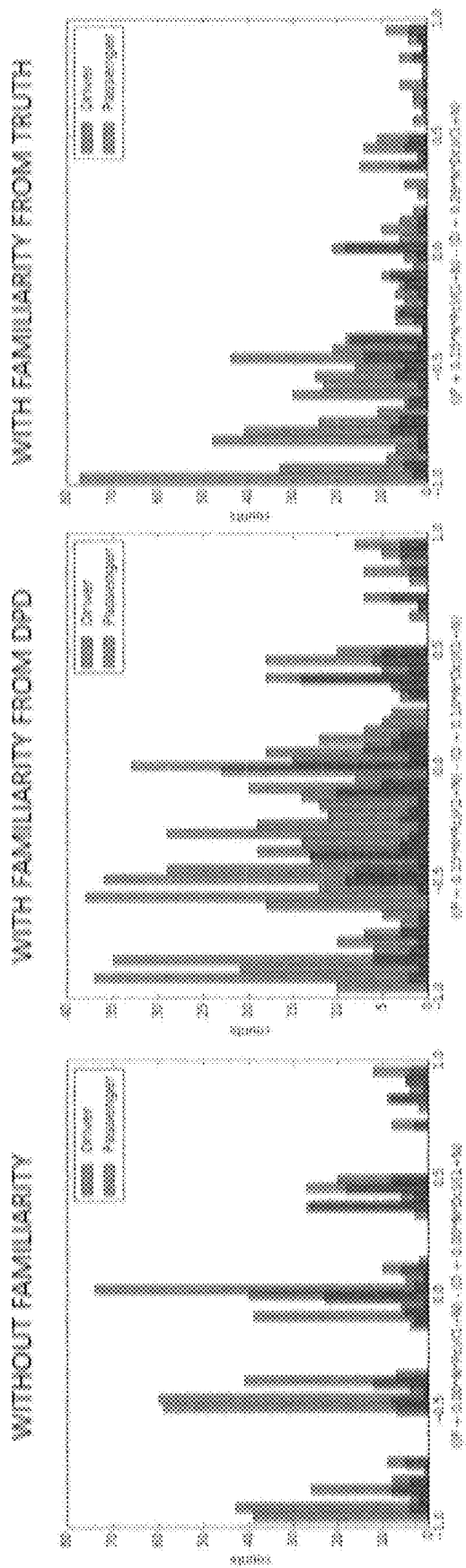

FIG. 46 shows an example diagram illustrating how $\lambda_{p,d}$=P-D distribution is affected by the inclusion of the Familiarity. Whereas the effect on Driver distribution is evident, Familiarity has a minor effect over passenger distributions. In general, information from clusters increase only the Driver accuracy because just 2 Passenger clusters were found on a total of 19 clusters used.

FIG. 47 shows an exemplary processing code illustrating the introduction of thresholds to ignore bad quality DPD results thus improving the accuracy of remaining ones. If $\lambda_{p,d}<t'_D$, the session can be classified by the system 1 as Driver, if $\lambda_{p,d}<t'_P$, the session can be classified by the system 1 as Passenger and Else no class is assigned and DPD event is not thrown.

Figure 48:
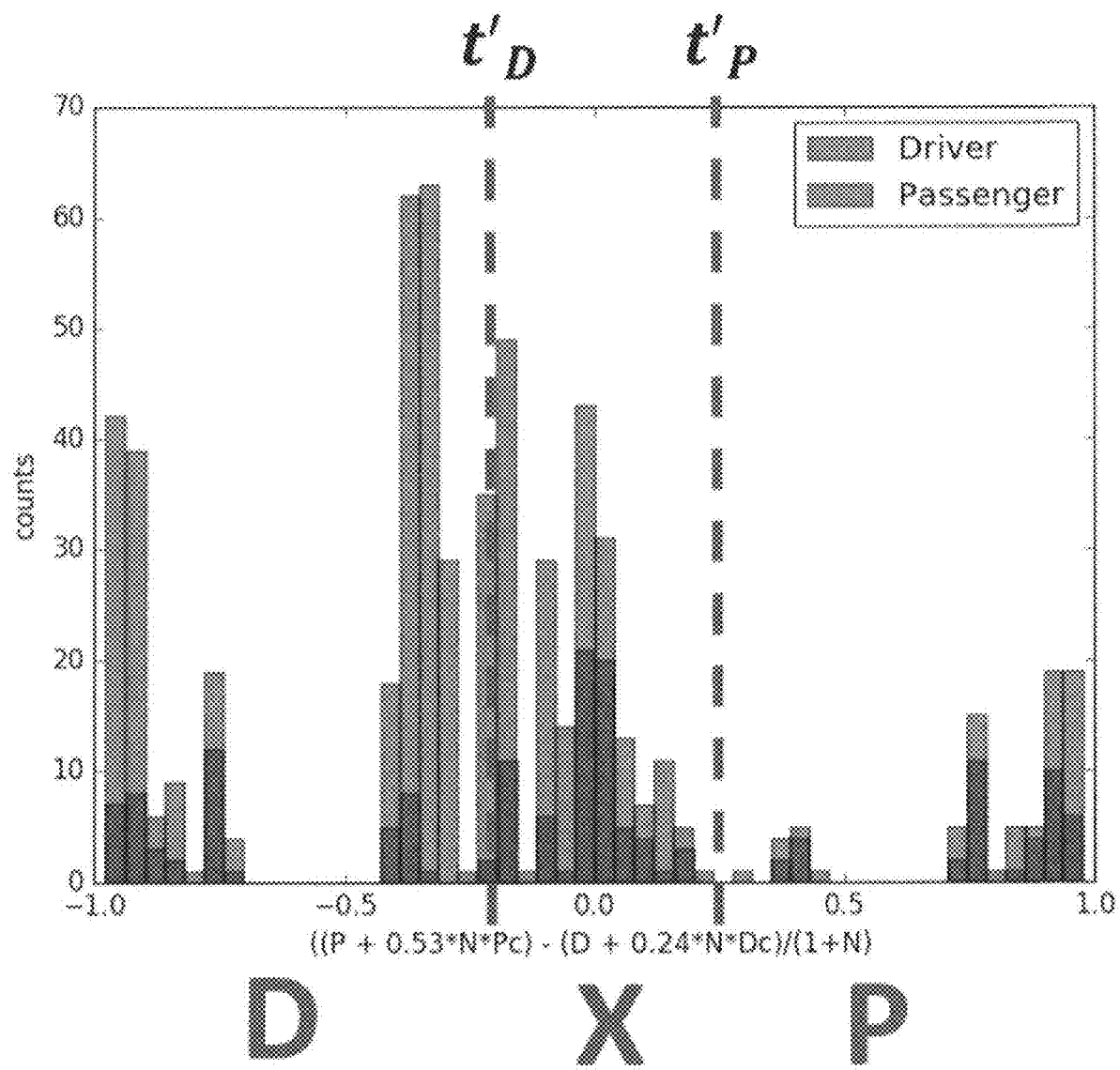

FIG. 48 shows an example diagram showing a possible introduction of thresholds in the same way as they are introduced in the final DPD classification to ignore bad quality DPD results thus improving the accuracy of remaining ones. If $\lambda_{p,d}<t'_D$, the session can be classified by the system 1 as Driver, if $\lambda_{p,d}<t'_P$, the session can be classified by the system 1 as Passenger and Else no class is assigned and DPD event is not thrown.

Figure 49:
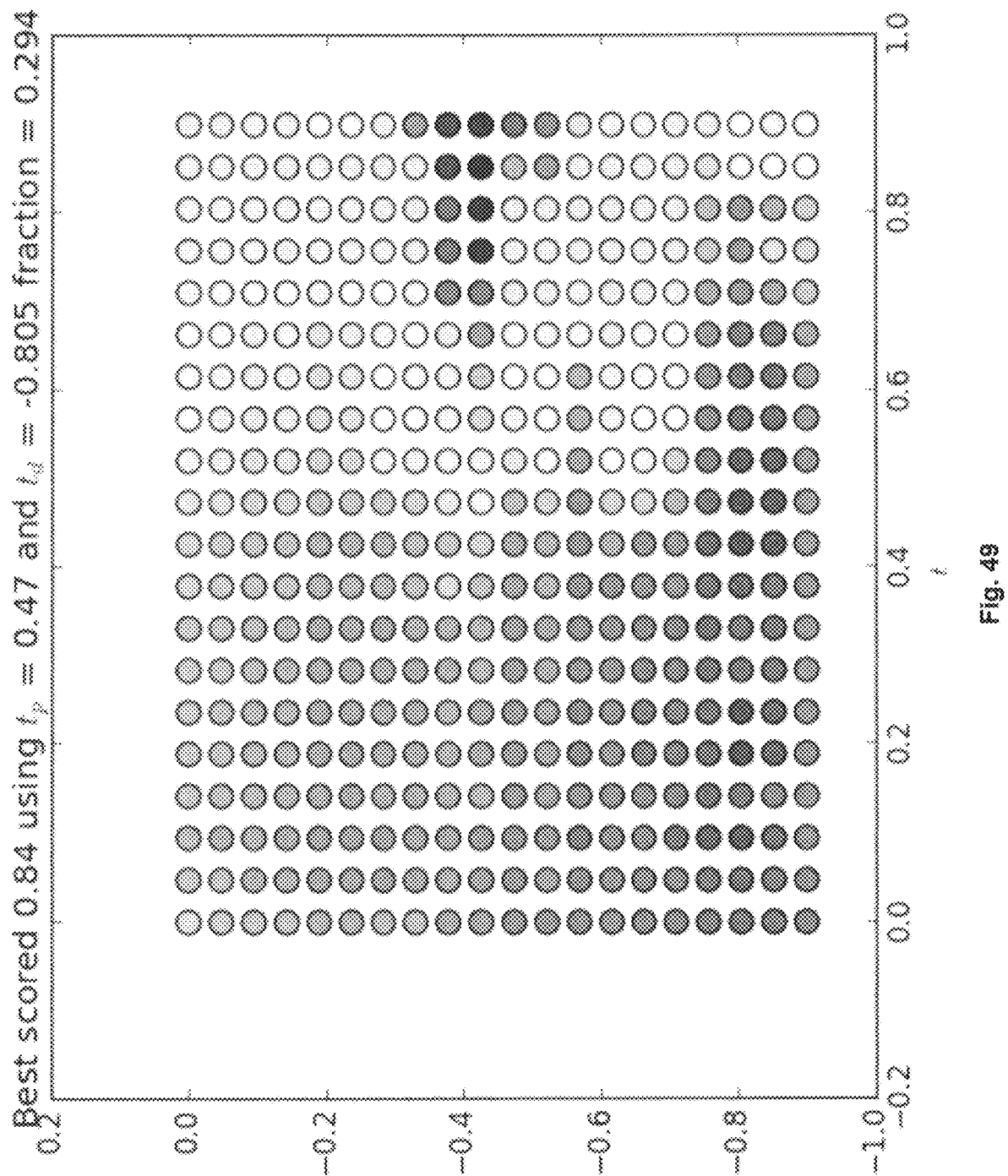

FIG. 49 shows an example diagram representing a grid exploration over $t'_D$ and $t'_P$. The best average F1 score was obtained in this example with $t'_P$=0.47 and $t'_D$=−0.805 and the number of events detected was 30% of the total.

Figure 50:
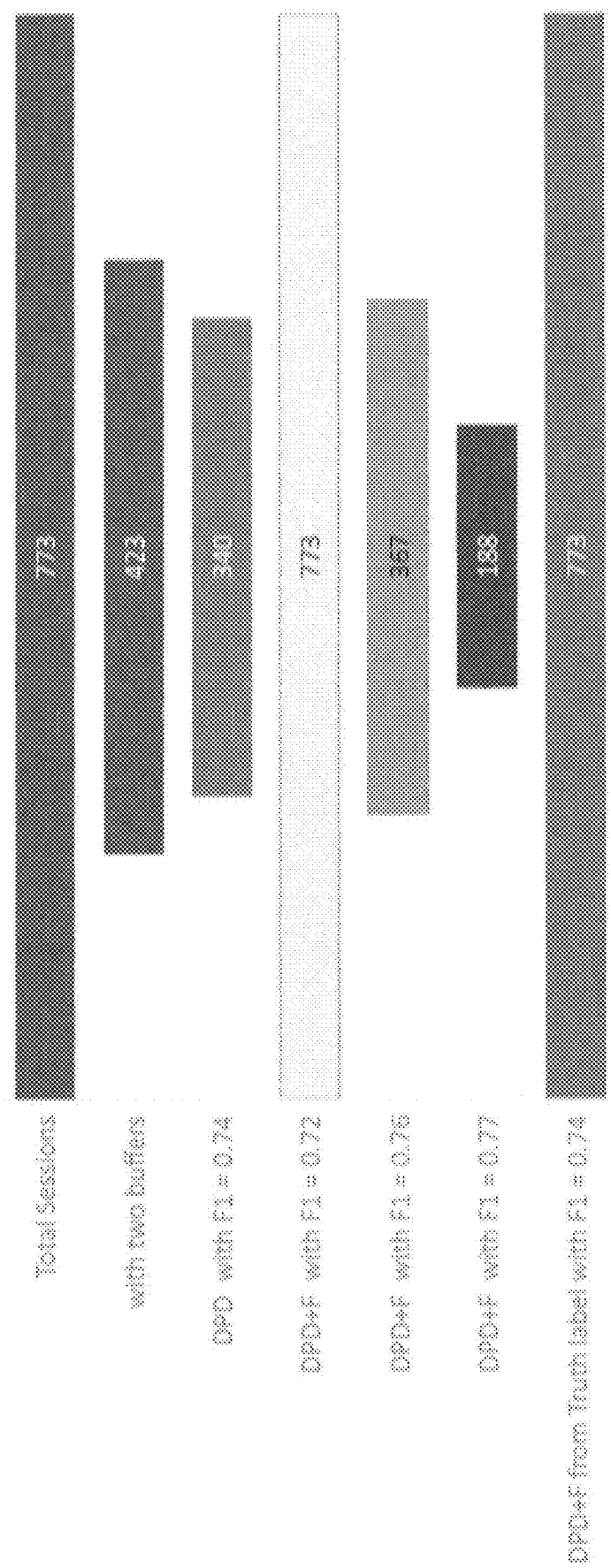

FIG. 50 shows an example diagram illustrating that with familiarity it is possible to reach the same accuracy of the single DPD algorithm but with a much greater number of detected events.

Figure 51:
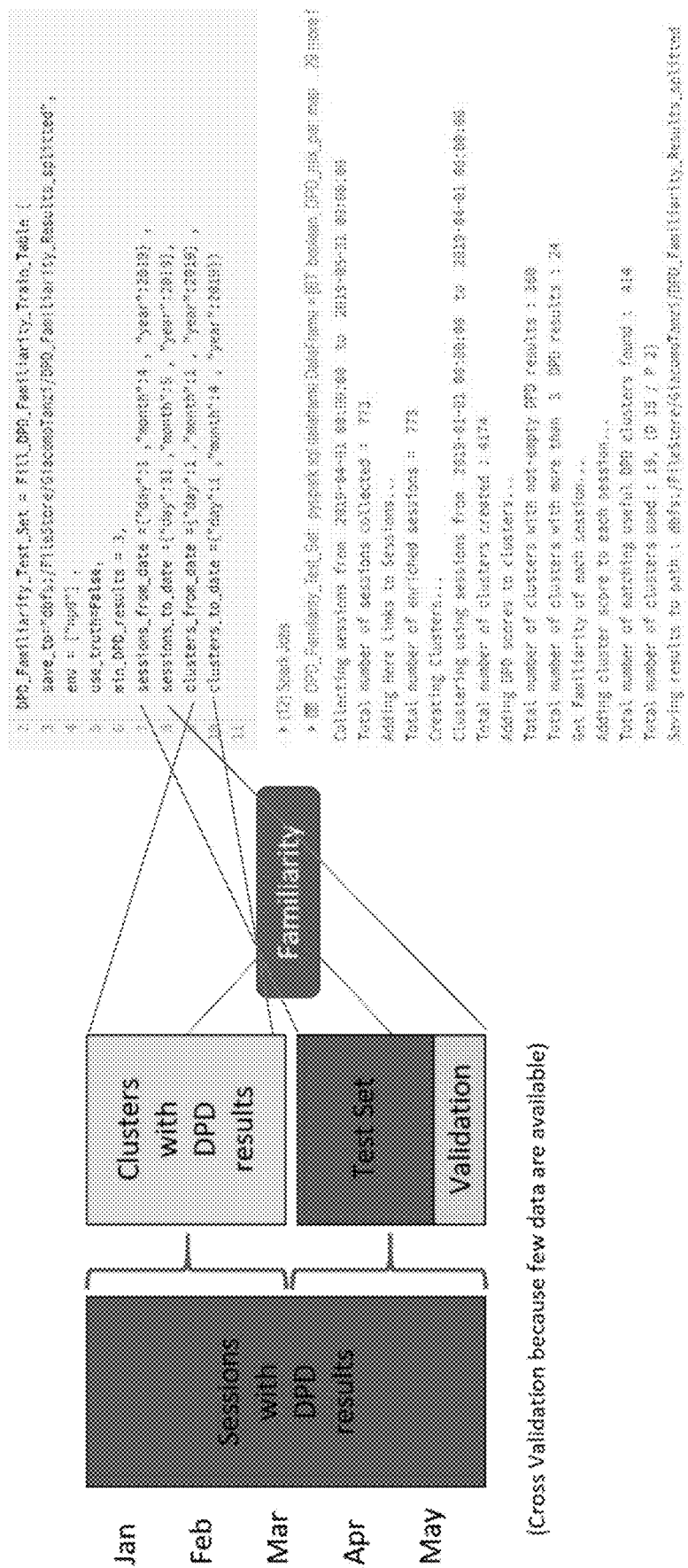

FIG. 51 shows an example diagram illustrating a DPD+F training schema and example thereof.

FIG. 52 shows an exemplary processing code illustrating the all-in-one method structure "Fill_DPD_Familiarity_Train_Table" contained in DPD+F notebook, creates and fills in the dataset. The argument "use_truth" specifies if cluster scores must be generated using true labels coming from user annotations instead of DPD results given by the algorithm structure.

Figure 53:
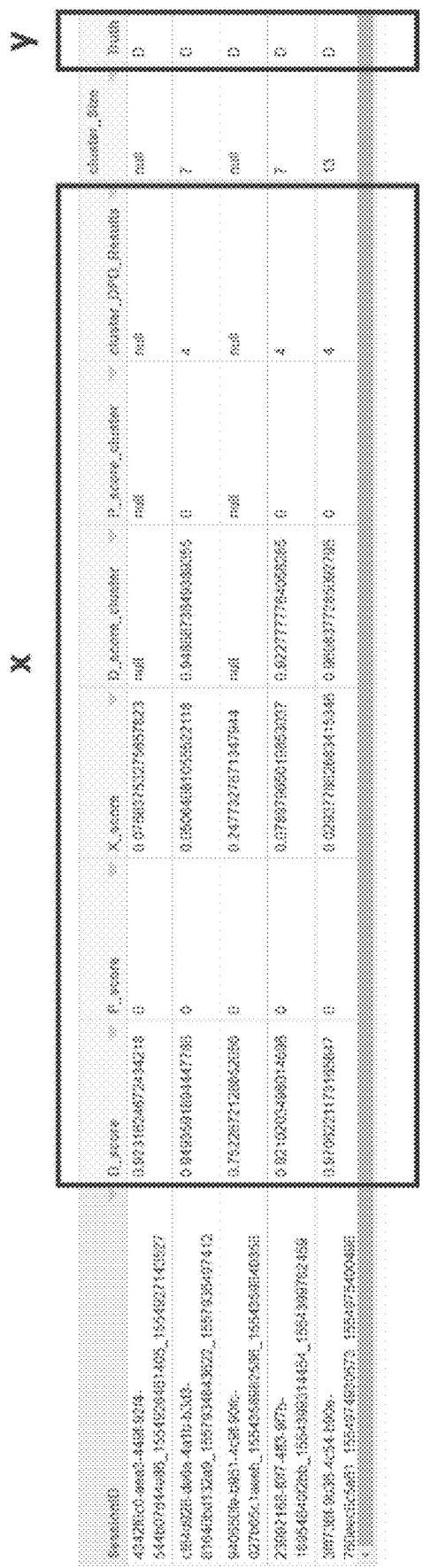

FIG. 53 shows an example diagram illustrating an example of how the dataset table can look like.

Figure 54:
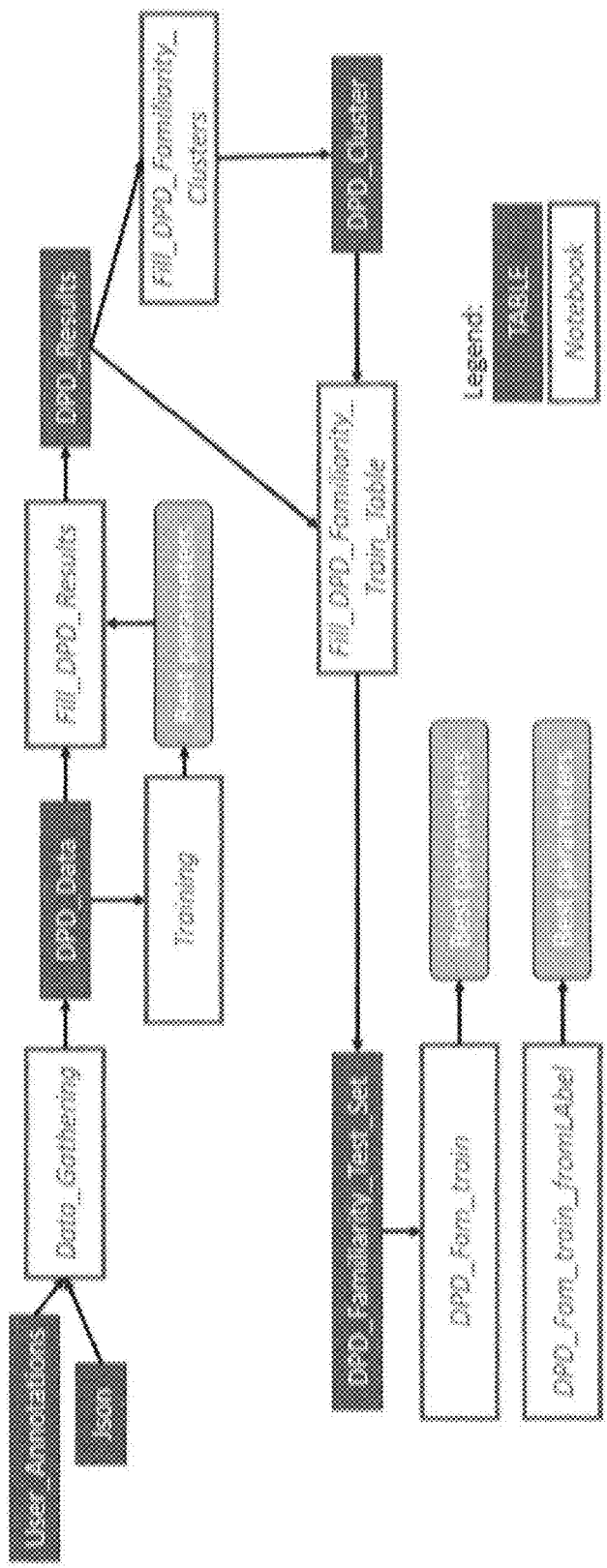

FIG. 54 shows an example diagram illustrating schematic an overview about exemplary notebooks and tables which can be used.

Figure 55:
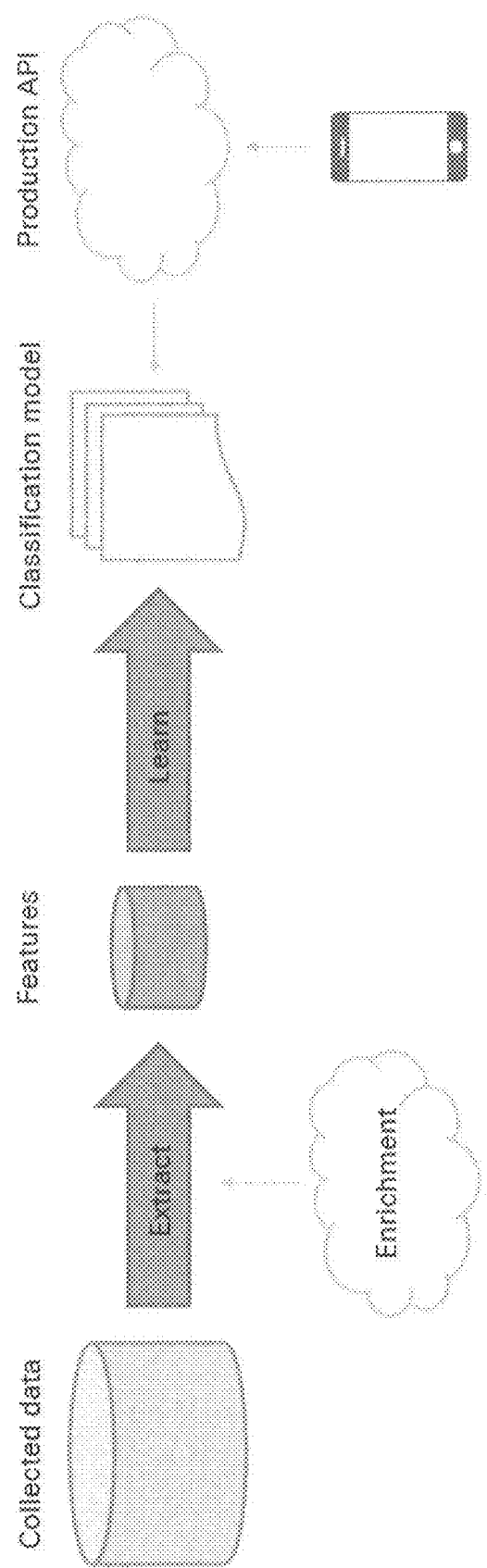

FIG. 55 shows a block diagram illustrating schematic an exemplary overview of the architecture of the Transport Mode Recognition system part of system 1.

Figure 56:
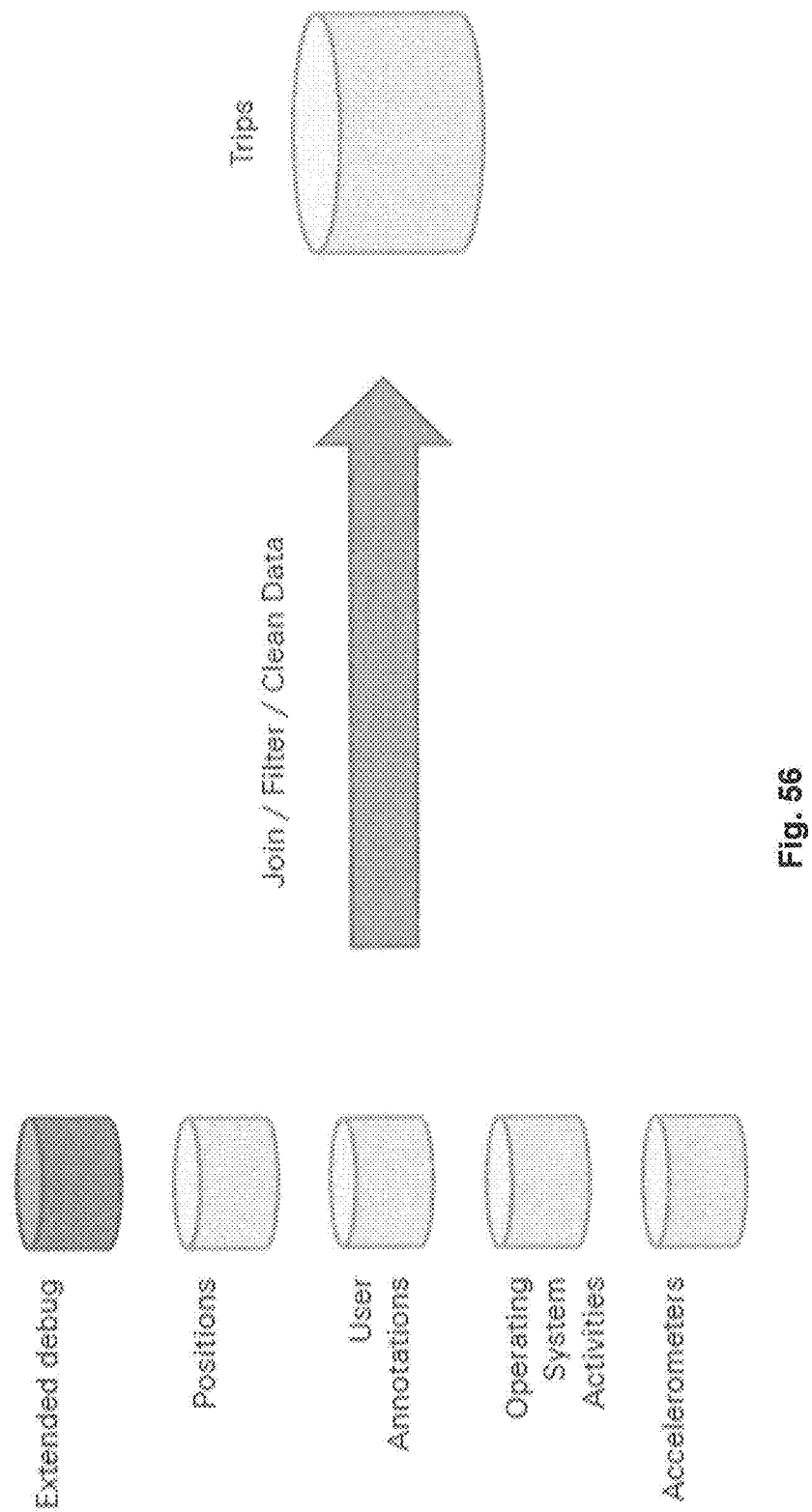

FIG. 56 shows a block diagram illustrating schematic an exemplary overview of the trip extraction process.

Figure 57:
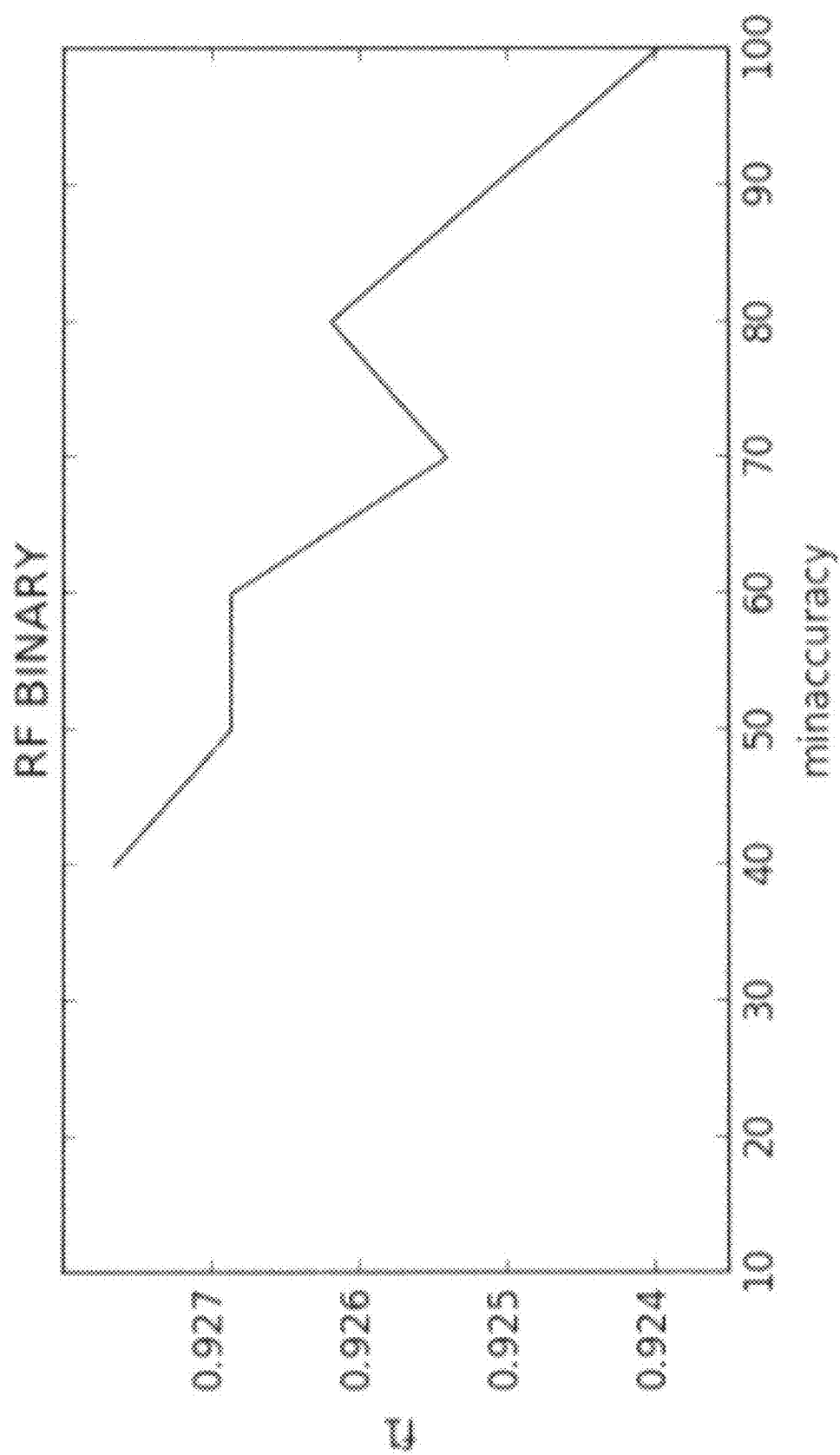

FIG. 57 shows a diagram illustrating schematic an exemplary Car/NoCar performance (F1 score) with minimum accuracy as a free parameter.

Figure 58A:
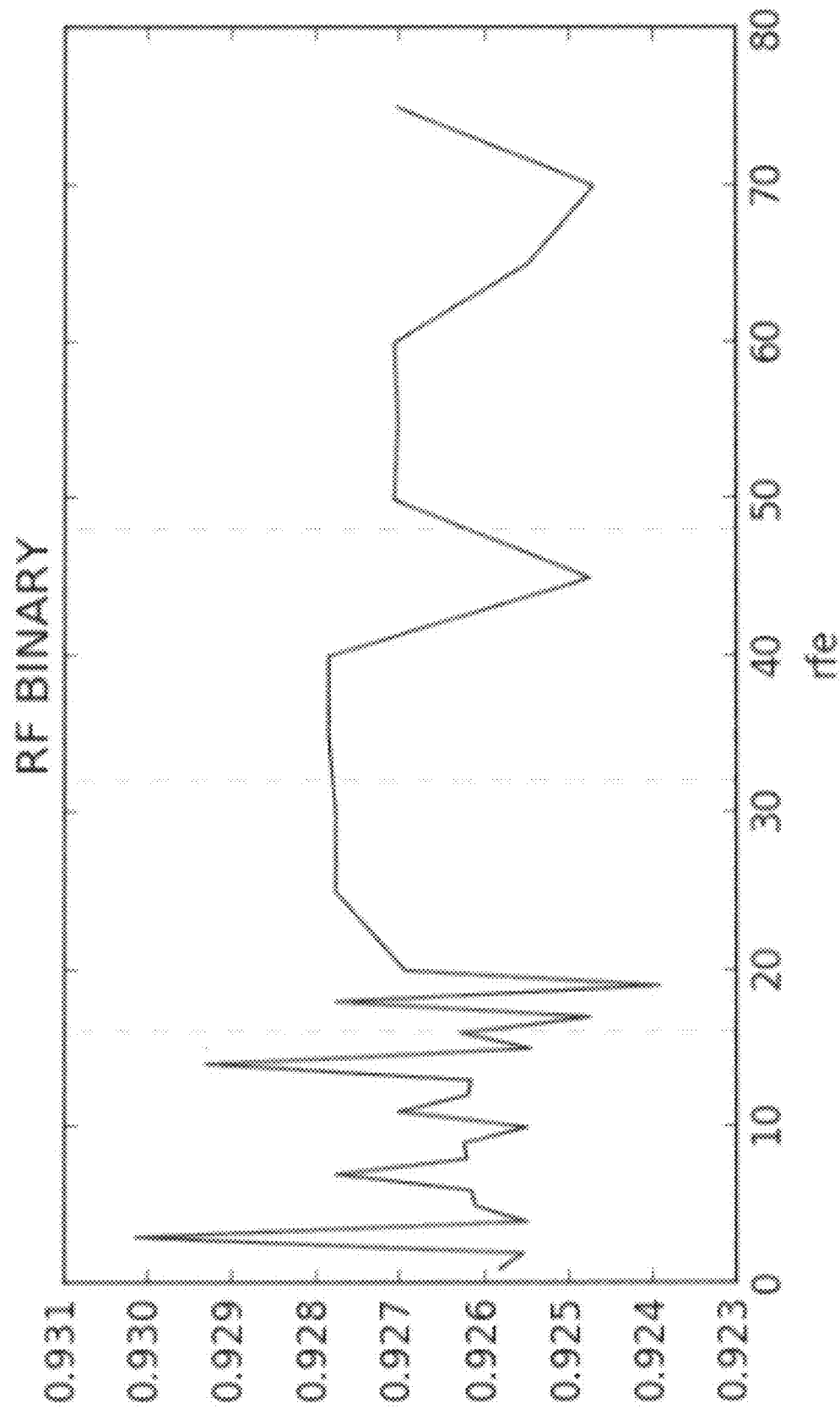
Figure 58B:
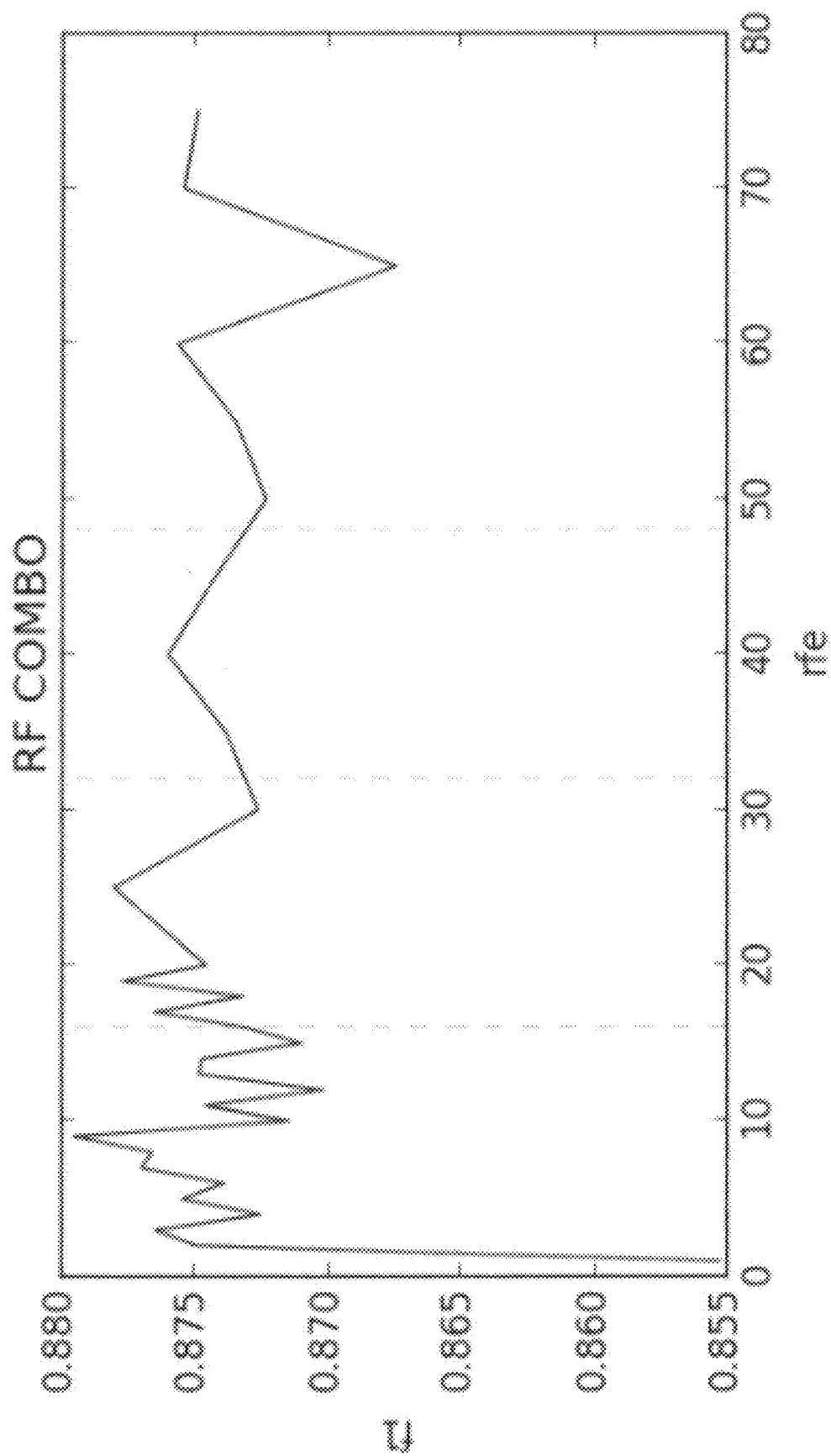

FIGS. 58a and 58b show diagrams illustrating schematic an exemplary TMR performance (F1 score) with number of sampled points as a free parameter.

Figure 59:
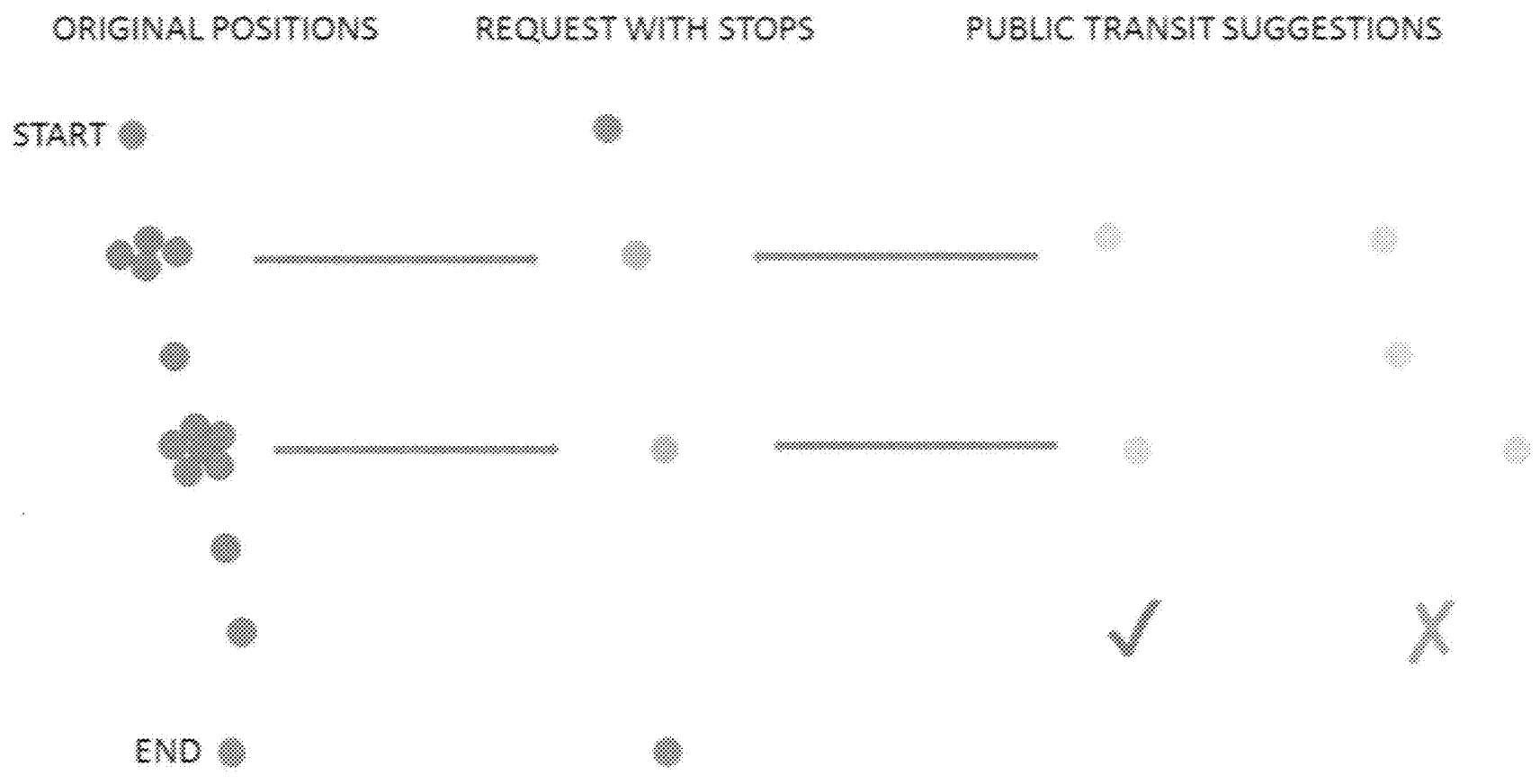

FIG. 59 show a diagram illustrating schematic an exemplary candidate stops extraction.

Figure 60:
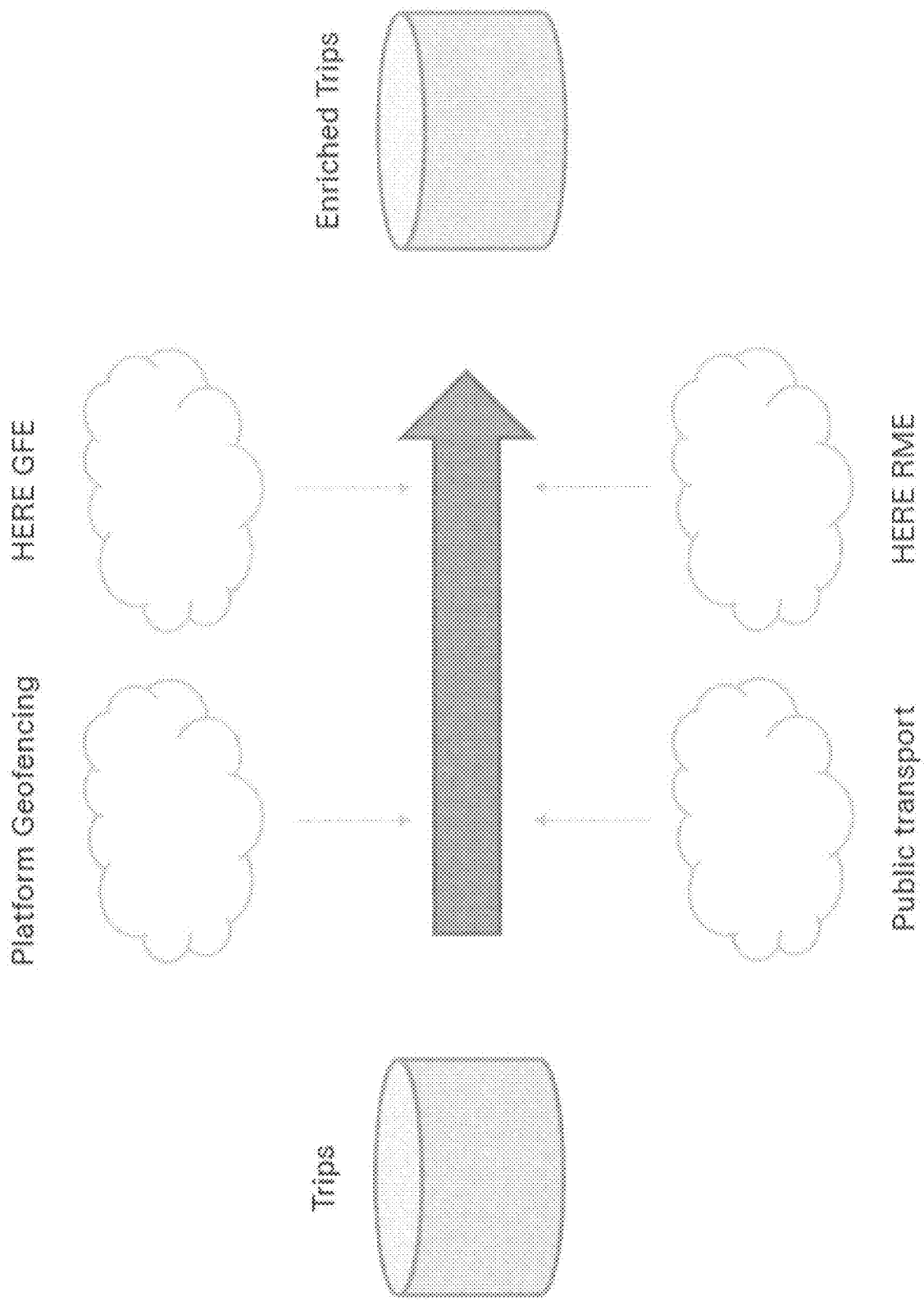

FIG. 60 shows a block diagram illustrating schematic an exemplary trip enrichment process.

Figure 61:
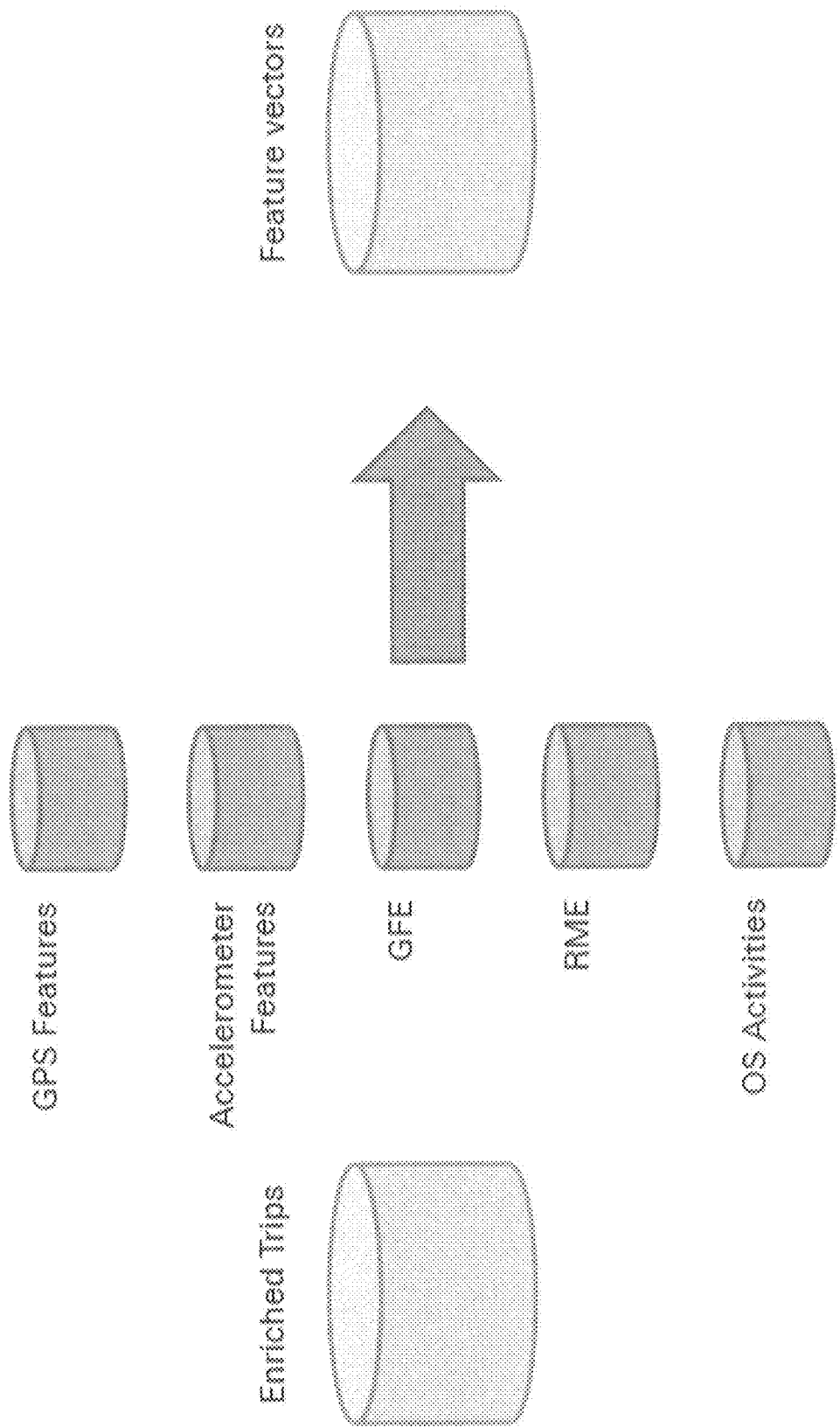

FIG. 61 shows a block diagram illustrating schematic exemplary feature extraction modules.

Figure 62:
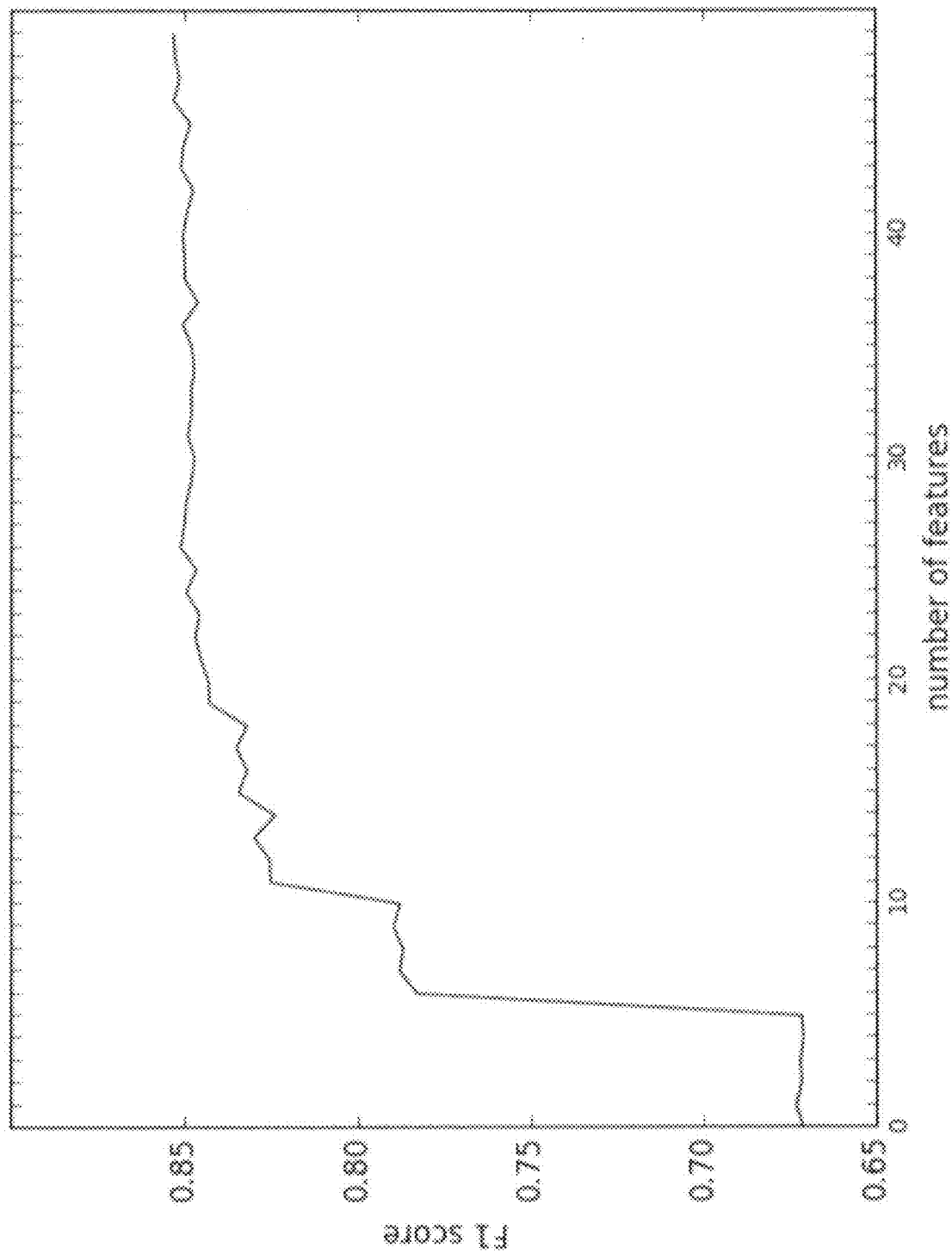

FIG. 62 shows a diagram illustrating schematic an exemplary recursive feature elimination used for the transport mode recognition TMR of the system 1.

Figure 63:
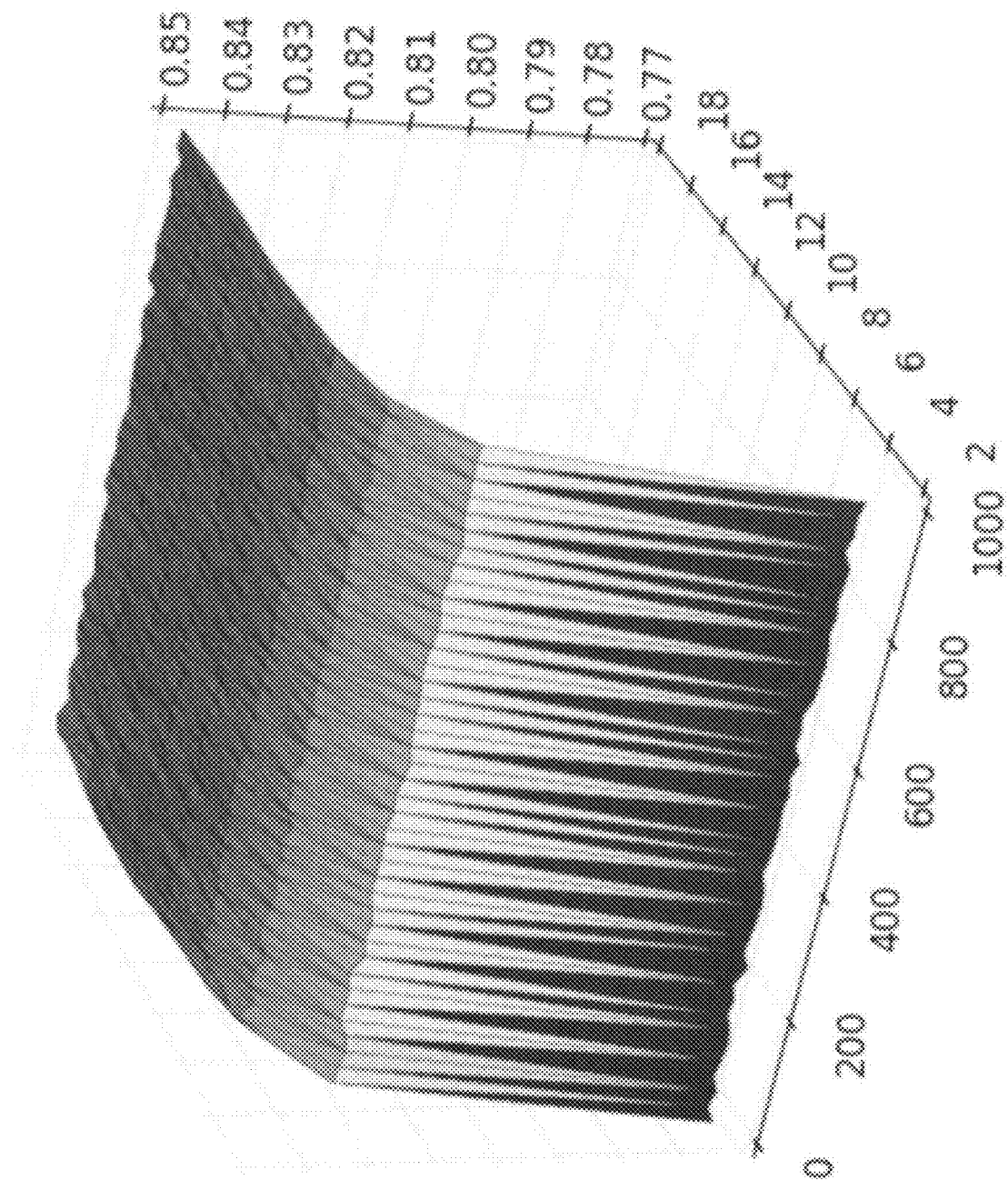

FIG. 63 shows a diagram illustrating schematic an exemplary Grid exploration of the number of trees and tree depth parameters.

Figure 64:
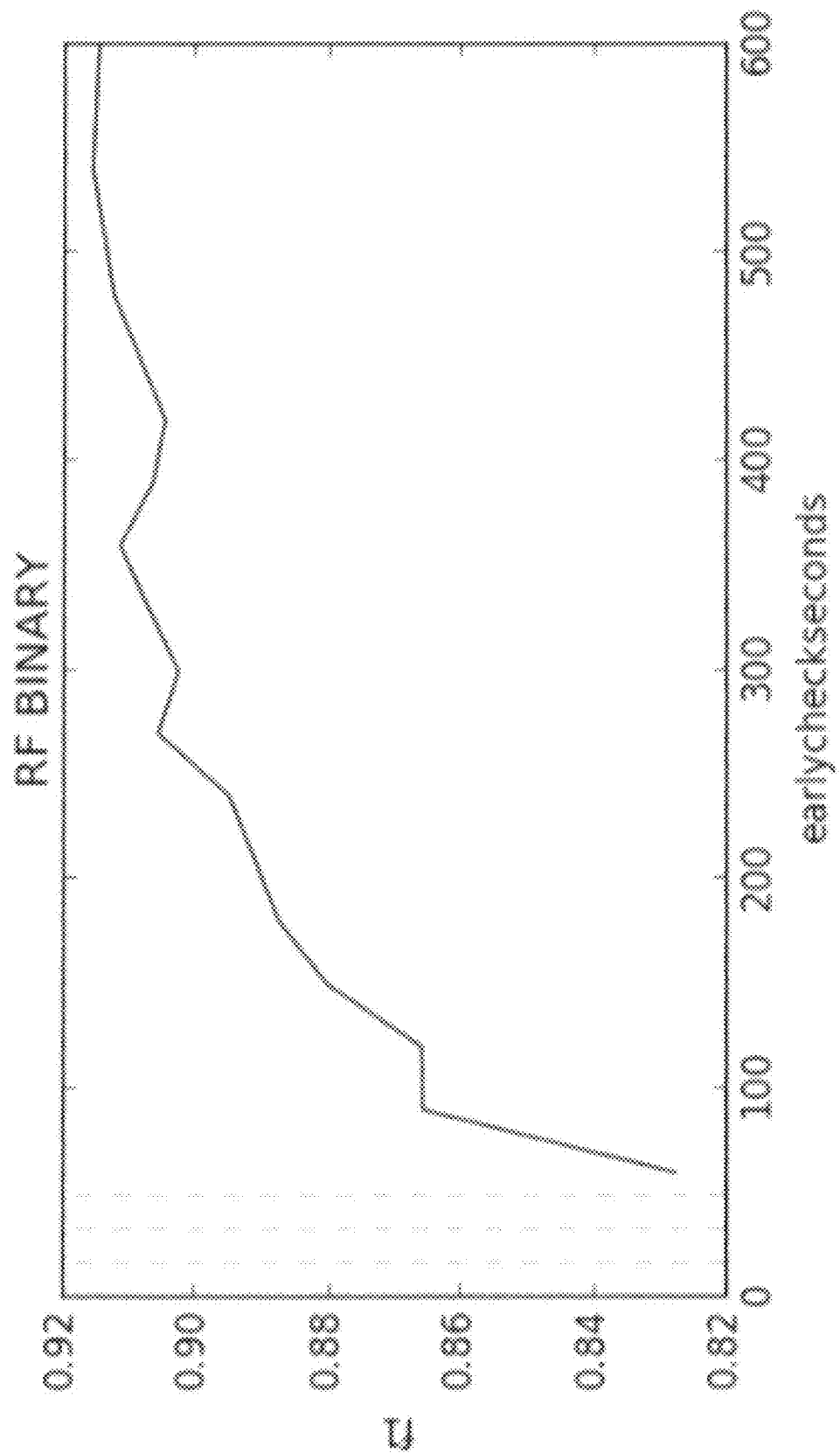

FIG. 64 shows a diagram illustrating schematic an exemplary early TMR detection for car/nocar classifier, F1 score.

Figure 65:
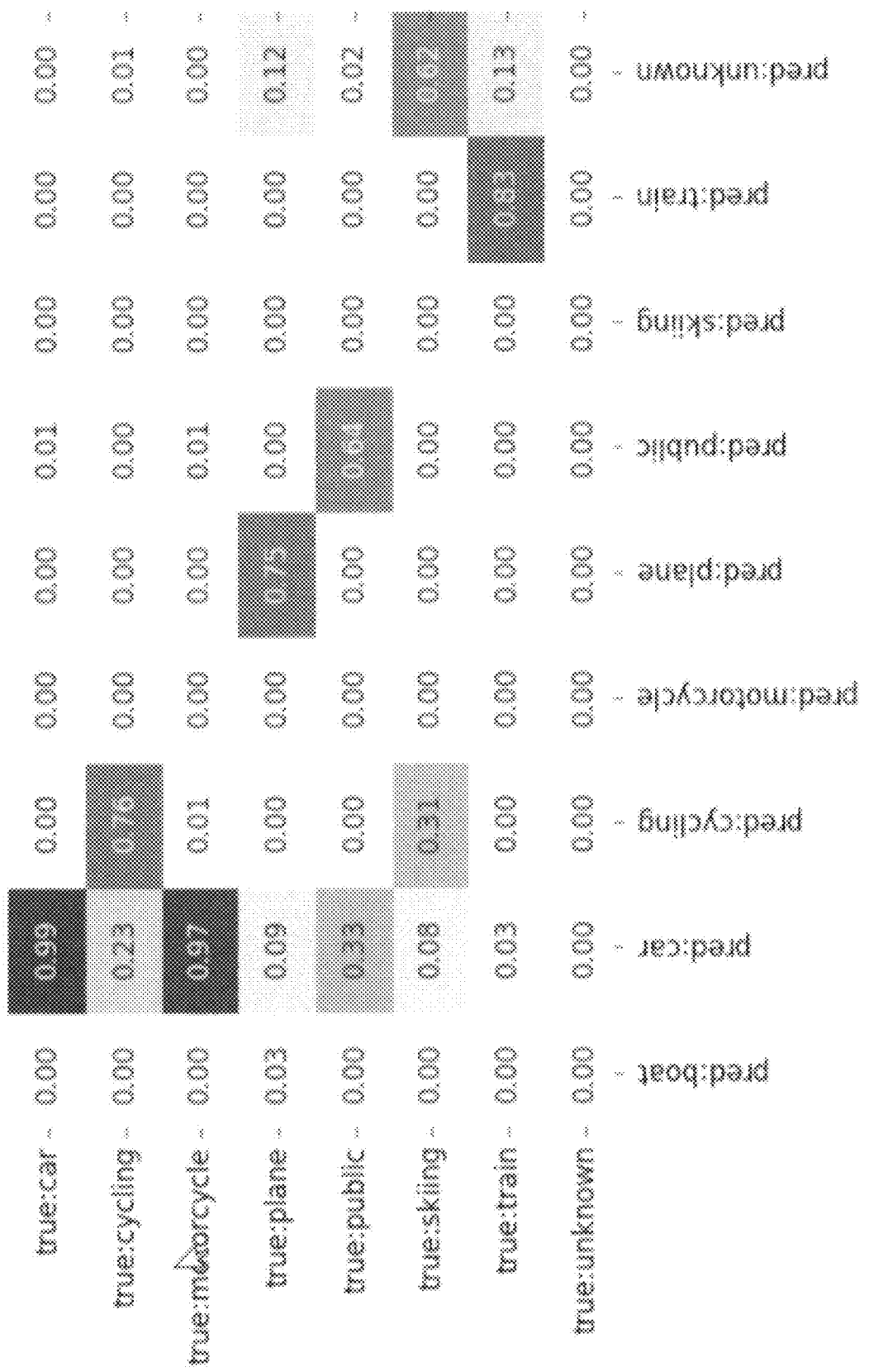
Figure 66:
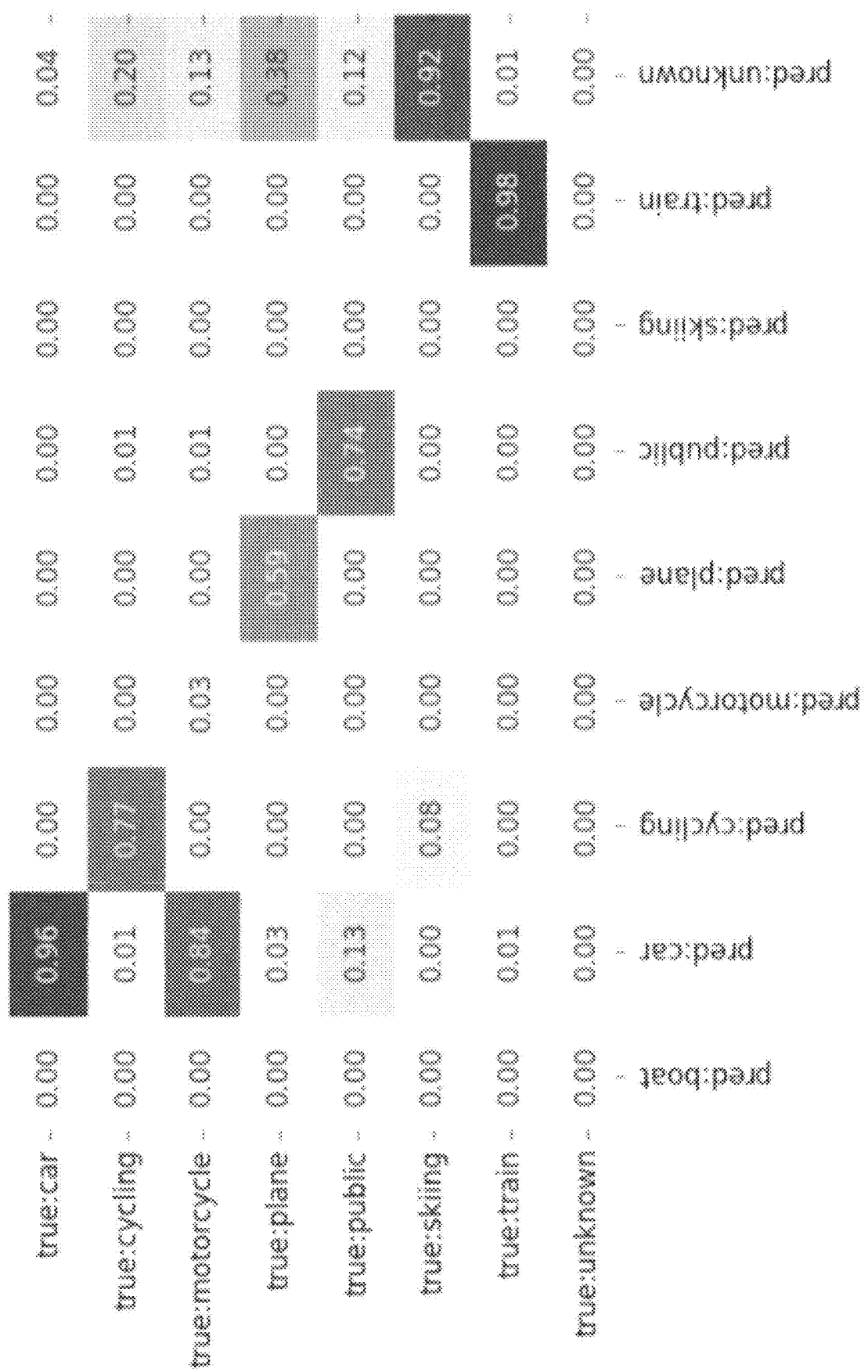

FIG. 65 and FIG. 66 show respectively the performances of the current TMR service and the proposed solution, where FIG. 65 shows the distributions of true labels, performance of the deployed solution (baseline), and FIG. 66 shows the distributions of true labels, proposed solution.

Figure 67:
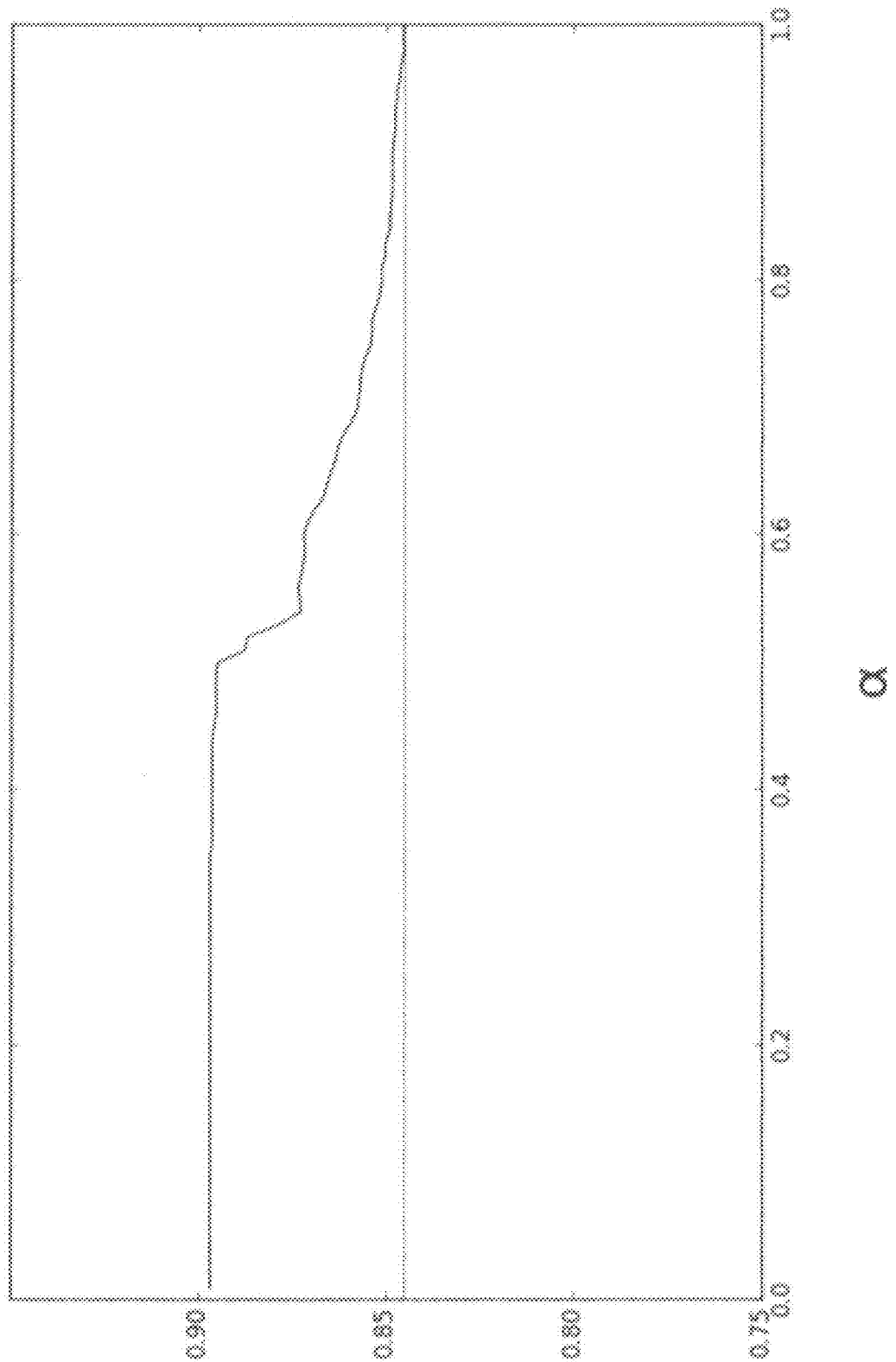

FIG. 67 shows a diagram illustrating schematic an exemplary F1 score varying TMR label weight (probability mass assigned to the automatic label).

FIG. 68 shows a diagram illustrating schematic an exemplary the design of an index value used for the generation of the familiarity and familiarity score, so that it orders the users with the following order, given the clusters dimensions (x-axis: cluster number, y-axis: cluster dimension).

Figure 69:
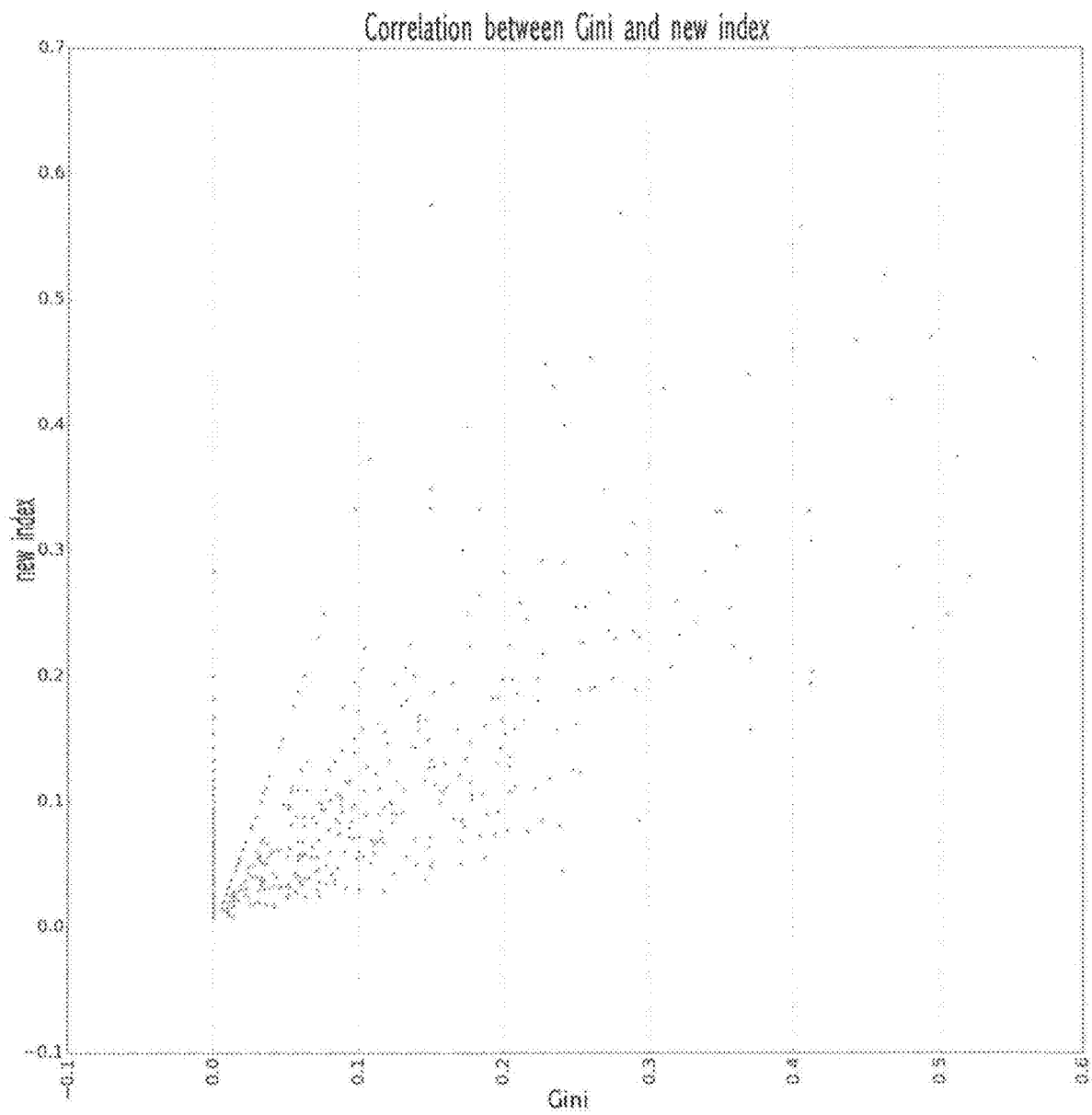

FIG. 69 shows a diagram illustrating schematic the correlation between the Gini index and the index (denoted as "new index"), used in the proposed embodiment variant.

Figure 70:

FIG. 70 shows a diagram illustrating schematic an exemplary user going from the same point A to the same point B, but passing through different links. This behavior causes low aggregation in Link familiarity embodiment variant and high aggregation in Start Stop embodiment variant.

Figure 71:
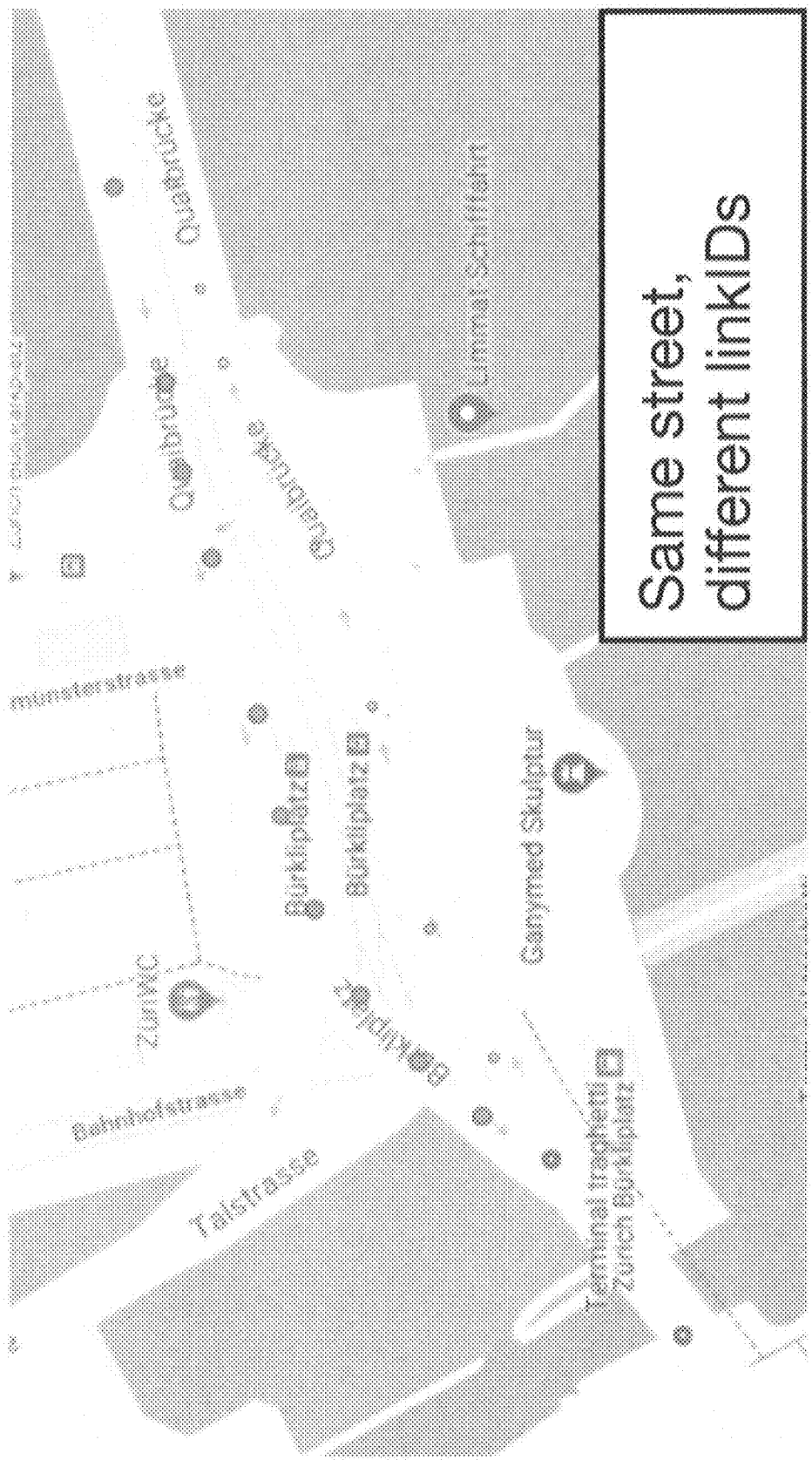

FIG. 71 shows a diagram illustrating schematic exemplary cases in which the user travels the same streets but the way the geocoding measuring (e.g. HERE) gives the links causes a wrong behavior in the link method. Typically happens that big streets have two different linkIDs for the two direction of the street, or two streets are too near and HERE spots the user in the wrong one.

Figure 72:
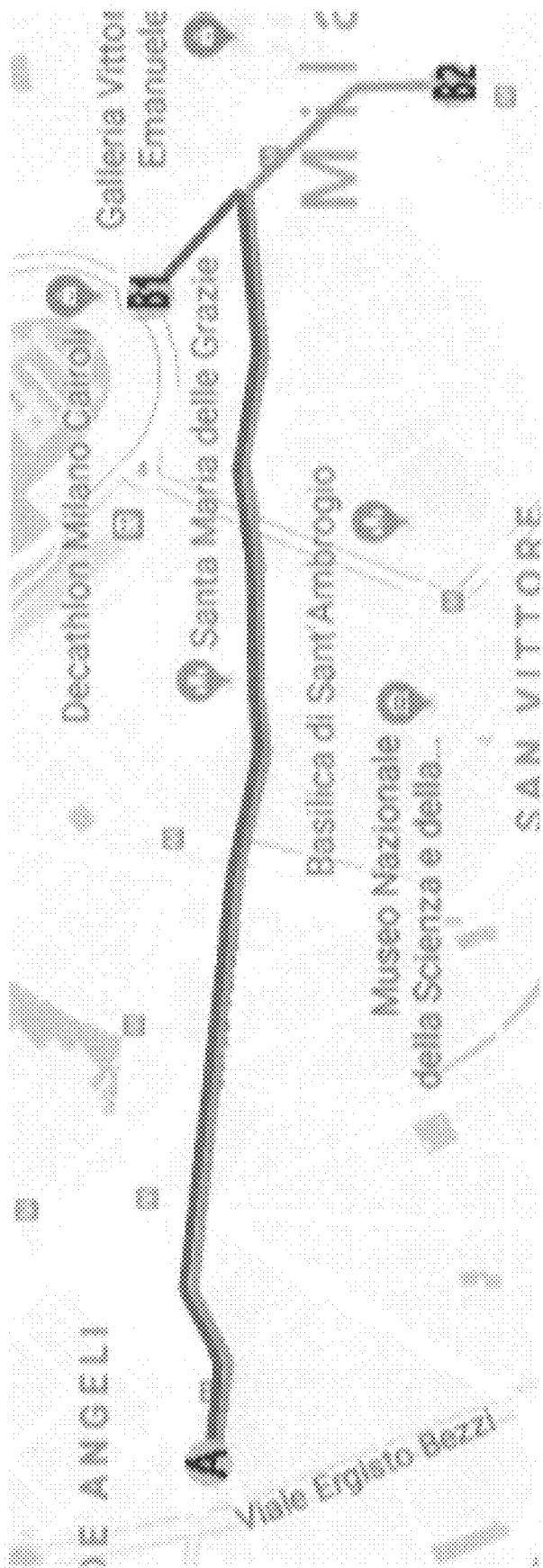

FIG. 72 shows a diagram illustrating schematic an exemplary occurrence of the second case when the user goes once from point A to point B1 (session S1), and once from A to B2 (session S2), as shown in FIG. 71. If S1 and S2 have enough links in common (the user travels the same path but ends up in different places) the two trips are clustered together in the Link method but not in the Start Stop method (in the cases in which the stop points are not enough near).

Figure 73:
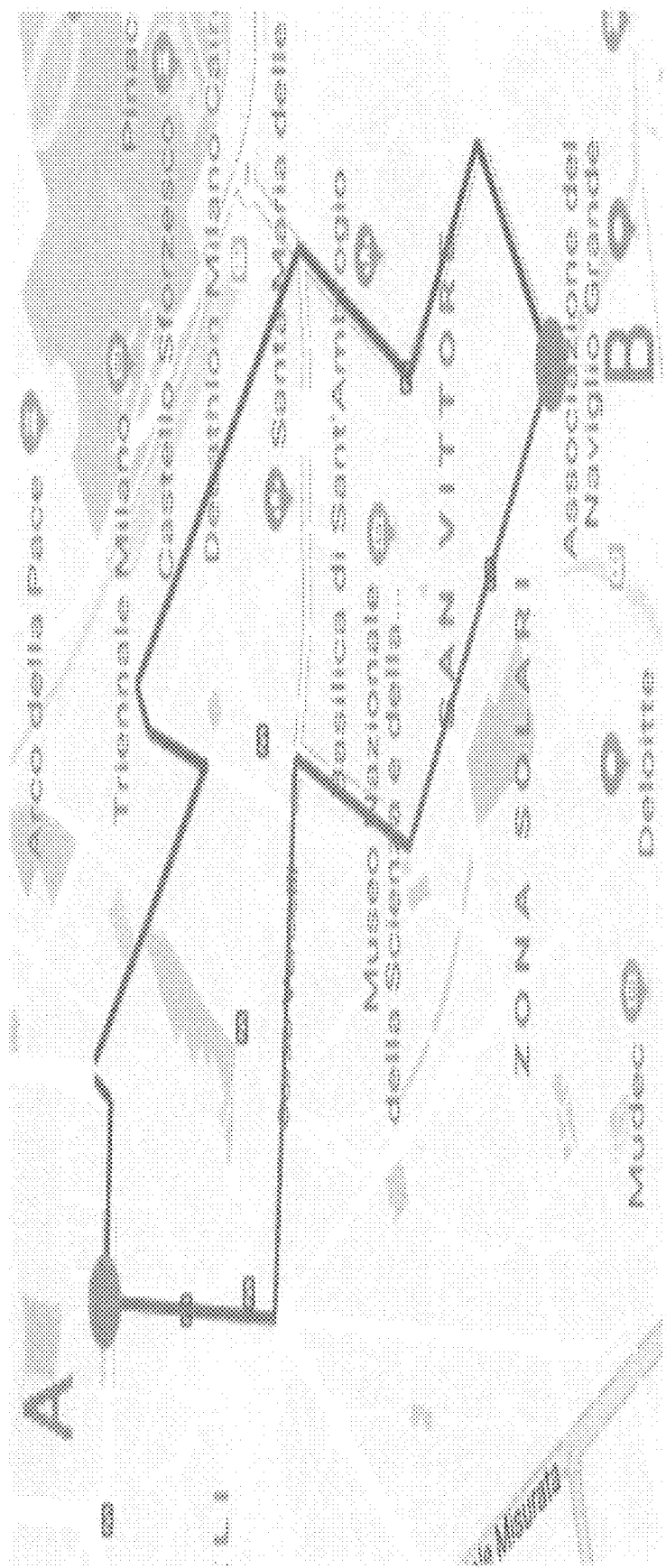

FIG. 73 shows a diagram illustrating schematic an exemplary embodiment variant of the Bag of Links (BOL), which does not generate clusters, so a direct comparison on how the trips are agglomerated cannot be performed. However, a good inspection on this method can be done considering the get_familiarity process, respect to the other get_familiarity of the other embodiment variants. The case in which the BOL embodiment variant becomes useful is when the user does a new trip using only link that has already travelled in each of the previous sessions, but without covering the 80 percent of the shortest of these sessions. In this case the start and stop points are far away so the get_familiarity start stop will return 0, also the number of links in common are not enough to cover the 80 percent of links so also the get_familiarity of the link methods will return a low score. This new method instead will give a maximum scores of 1 (see FIG. 73).

Figure 74:
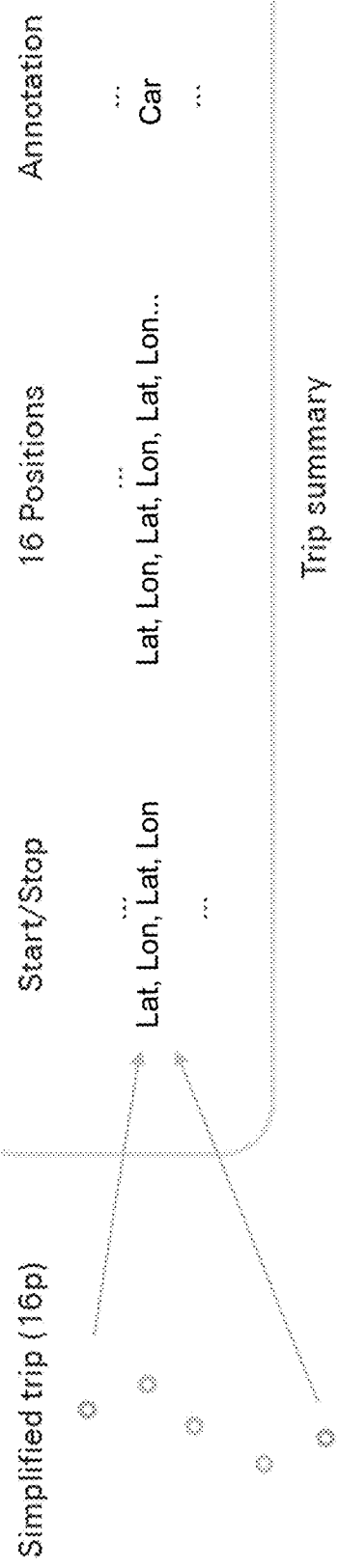

FIG. 74 shows a diagram illustrating schematic an exemplary measuring of a trip using an appropriate trip summary. When a TMR 113 request is received live, the system 1 respectively the TMR 113 checks if a user already annotated or corrected a similar trip. Consequently, the system 1 must be able to efficiently retrieve historical annotated trip data and define a trajectory similarity measure. Since the TMR 113 live request contains a representation of the trip with 19 points, in the present embodiment variant, it makes sense to store this representation for each annotated trip, partitioned by a user identifier. This can e.g. be done in a database or a filesystem (e.g. one row per trip). The user annotation preferably can e.g. be stored together with the trip summary. This trip summary can be built/updated in batch using, for example, Databricks (e.g. nightly). The embodiment variant can imply information availability within 24/48 h from user annotation. Existing facilities and other approaches can be considered as well.

Figure 75:
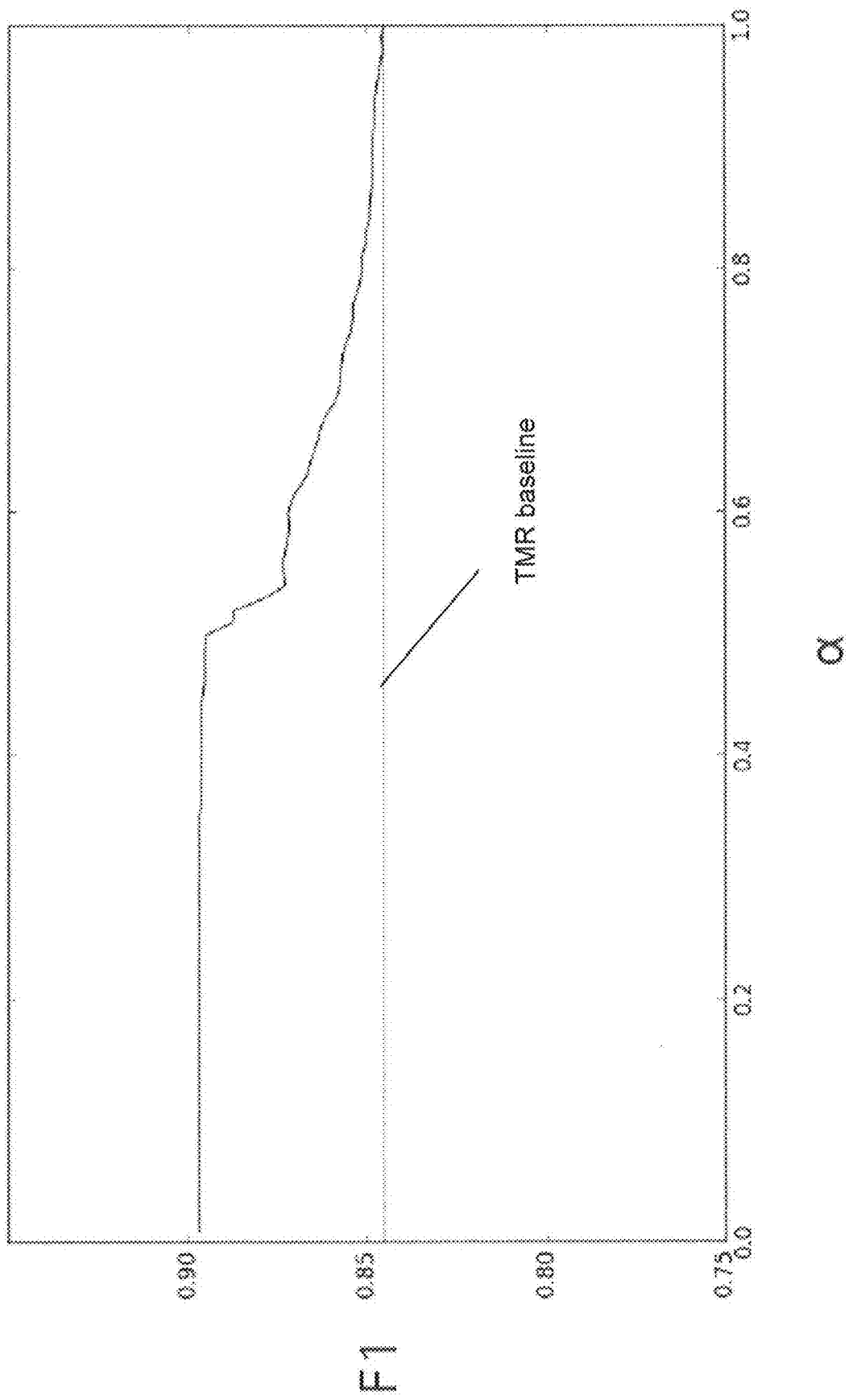

FIG. 75 shows a diagram with a TMR baseline (given by the straight line) illustrating schematic an exemplary weighting of the parameters and evaluating the performance under TMR 113. The multiclass probabilities can e.g. be weighted less than the annotation probability. This is in line with the fact, that, fi the user corrected a trip in the past and a similar trip was observed by the system 1, the user should be trusted. The proposed value for the weight is 0.4.

Figure 76:
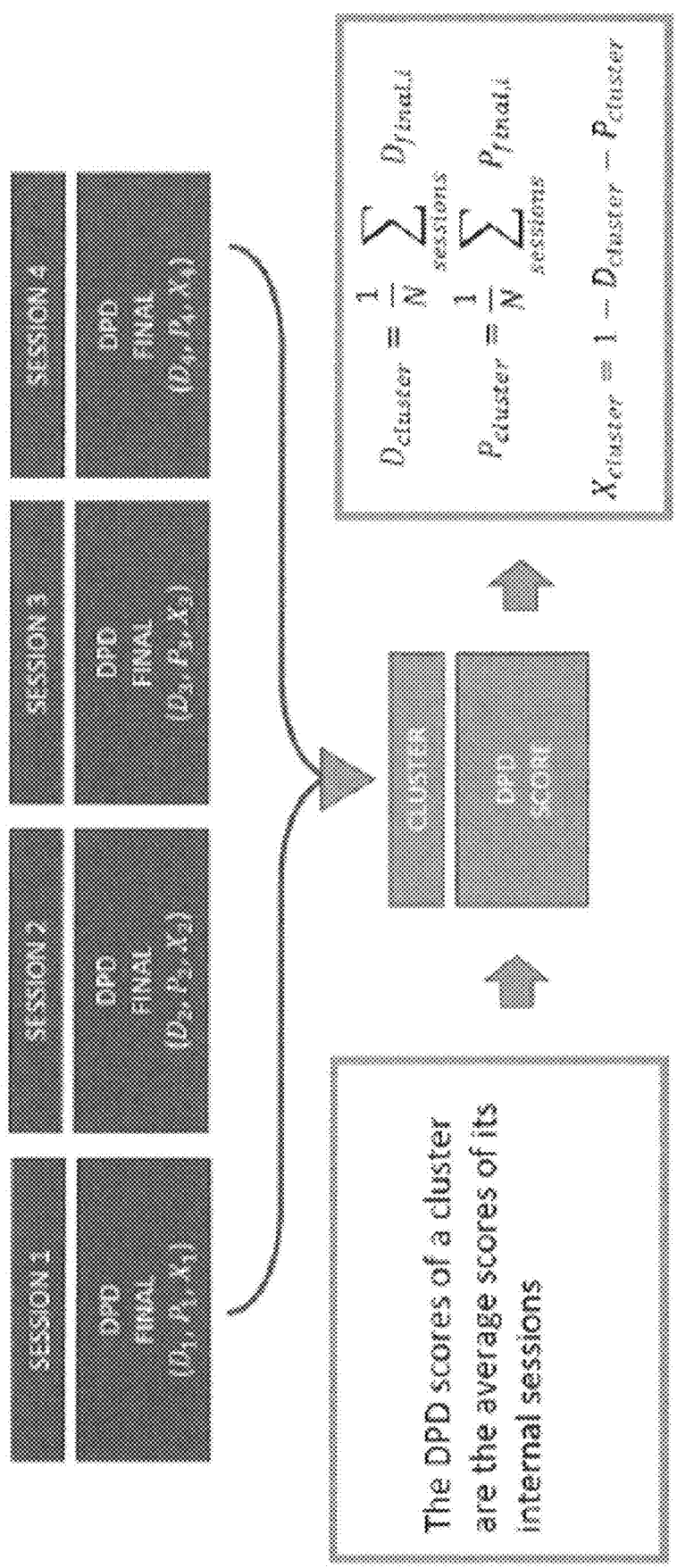

FIG. 76 shows a diagram illustrating an exemplary embodiment variant of the DPD 112, which can be used for the trip familiarity detection 115, and which can e.g. comprise the following technical steps performed by the system 1 and the trip familiarity detection and measuring 115, respectively: (1) Collect user history, (2) Cluster similar trips, (3) Define centroid trip, (4) New trips arrives: seek match with existing clusters, and (5) Check cluster DPD label. In FIG. 76, (i) N is the total number of sessions with DPD score in the cluster, (ii) $D_i \in [0,1]$ $P_i \in [0,1]$ and $X_i \in [0,1]$ are final confidence scores returned by DPD for each sessions (including enter/exit and BT connection), and (iii) cluster scores can be also generated from user annotations (Truth) or eventually from a combination of both sources.

Figure 77:
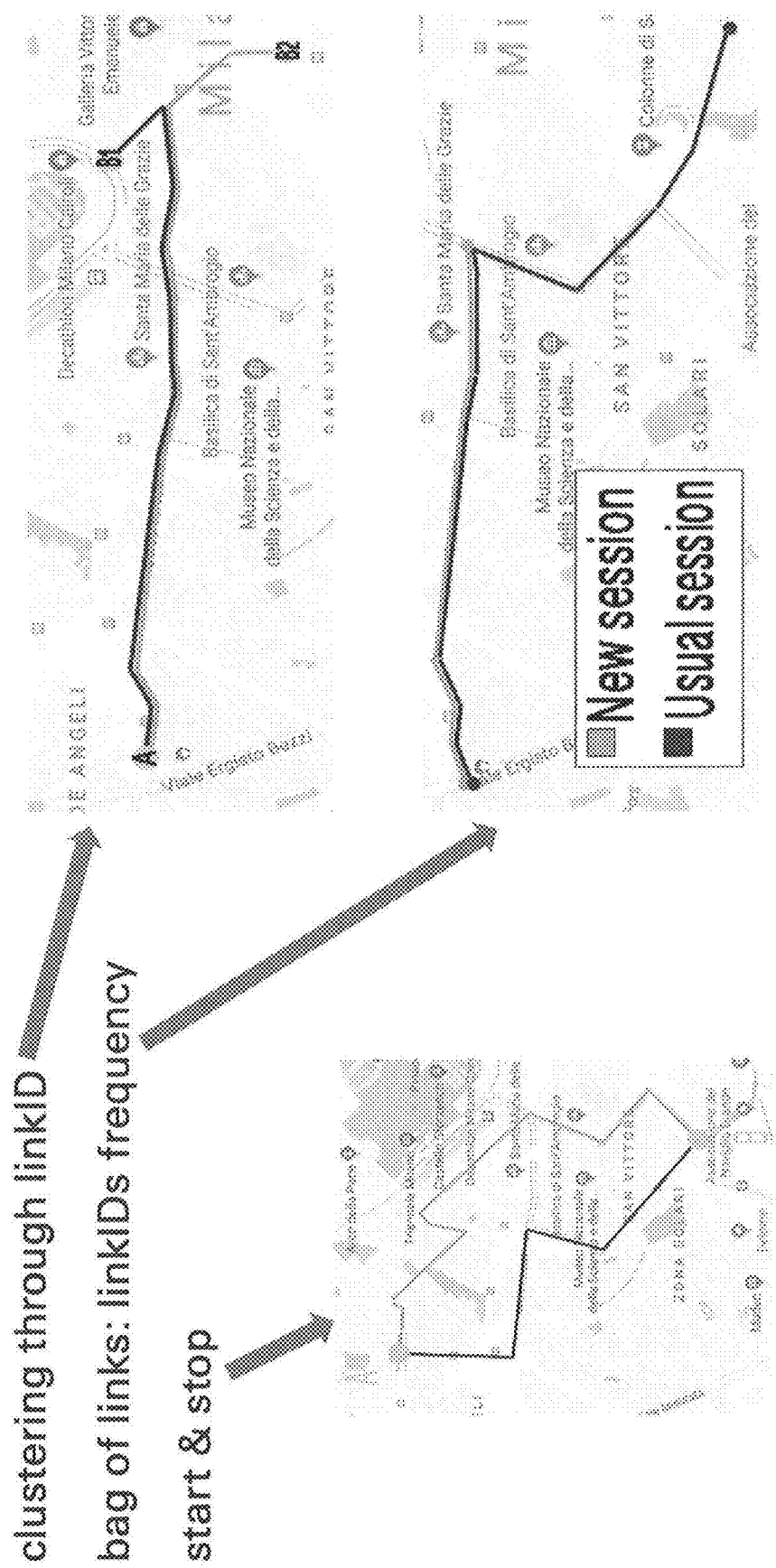

FIG. 77 shows a diagram illustrating the exemplary objective of the familiarity score to create a measure for scoring purposes on how much a user travel on familiar roads. This can e.g. require the three different methods, as illustrated by FIG. 77, i.e. (1) Clustering through linkID, (ii) bag of links: linkIDs frequency, and (iii) start & stop.

Figure 78:
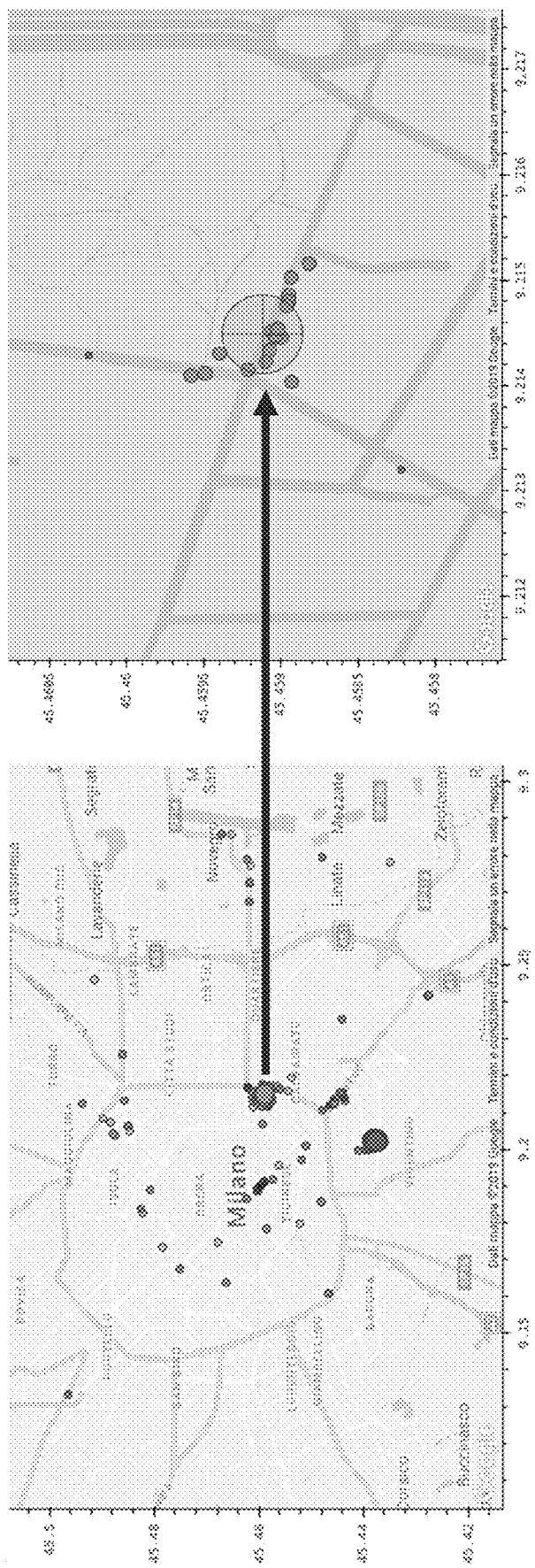

FIG. 78 shows a diagram illustrating an exemplary realization of the start&stop method, as a powerful approach.

Figure 79:
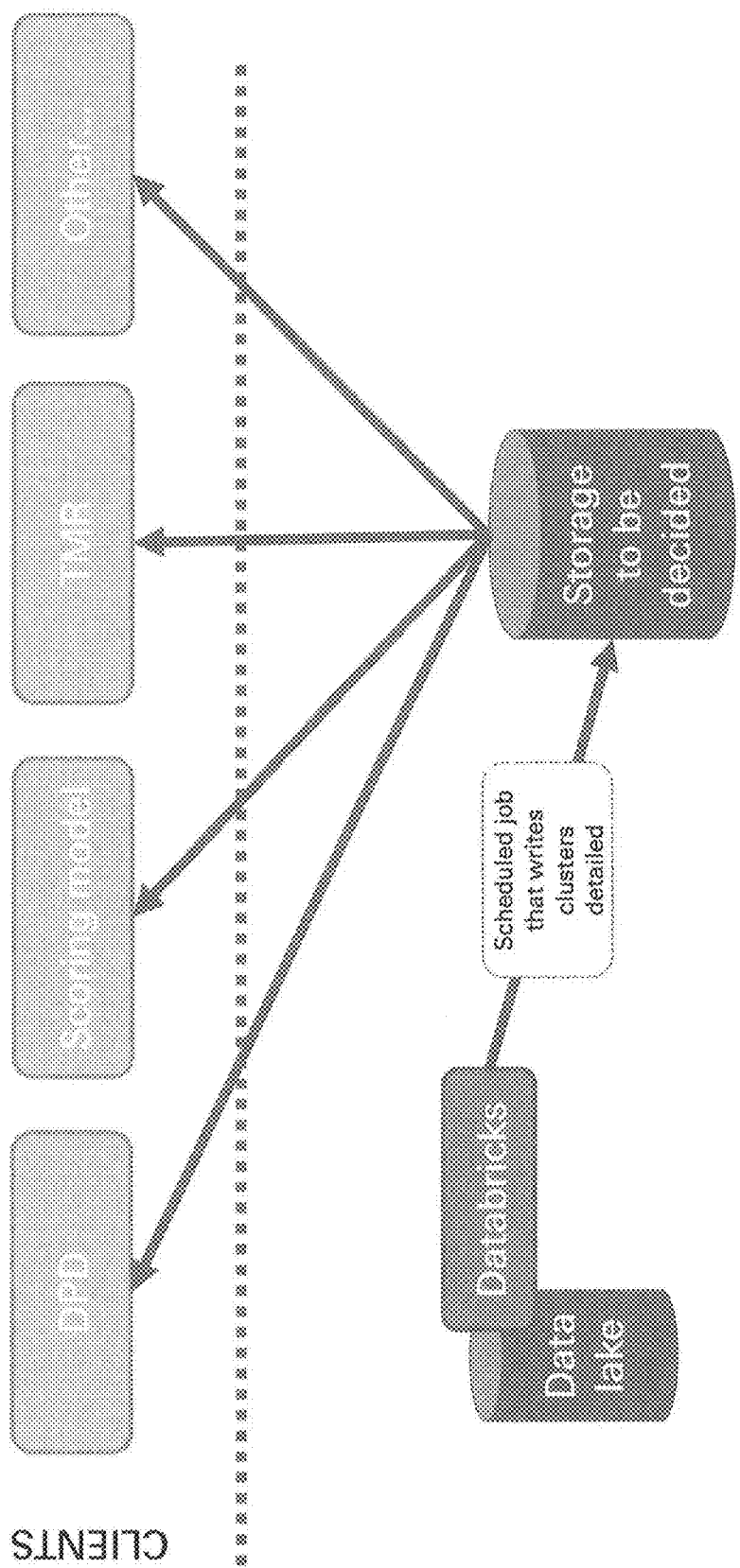

FIG. 79 shows an exemplary overview of a possible general architecture of the trip familiarity detection and measuring.

Figure 80:
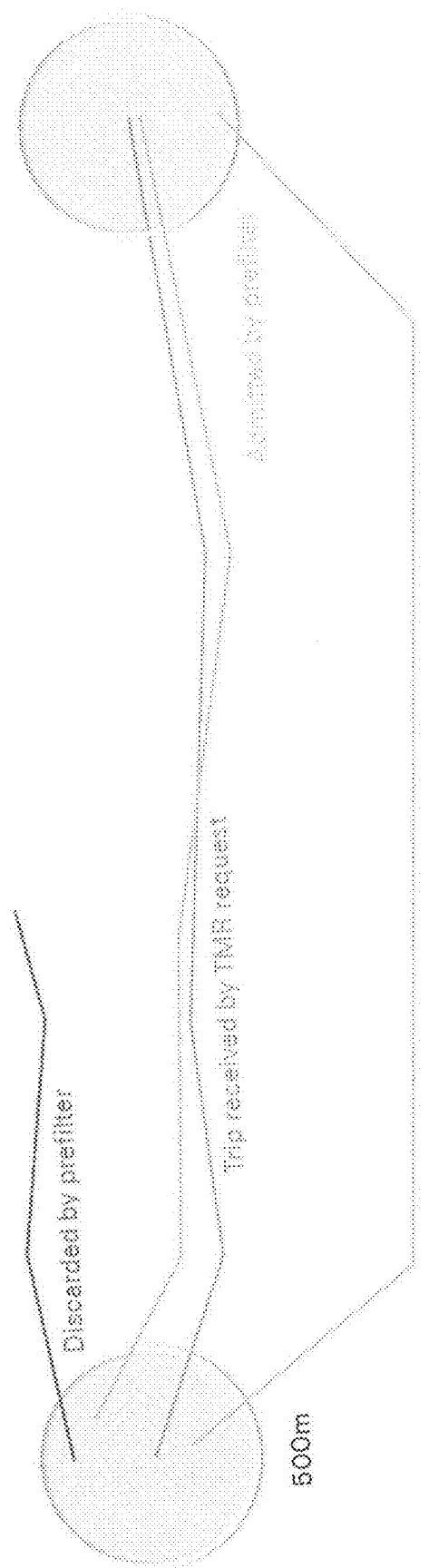

FIG. 80 shows a diagram illustrating an exemplary realization of an embodiment variant using a similarity prefilter technique, in particular for TMR 113, where the data processing is preferably performed only on a subset of likely candidates. A trip is considered a valid candidate of its start and end both lie within a certain radius from the start/end of the current trip (the one that is evaluating in a TMR live request). The radius can e.g. be set to 500 meters for this example, based on empirical observation. Since user annotations can be in limited number (in normal operating conditions) and using the proposed similarity prefilter, the trajectory similarity is actually generated against a small subset of trips, which is illustrated in FIG. 80.

DETAILED DESCRIPTION OF THE PREFERRED EMBODIMENTS

Figure 1:
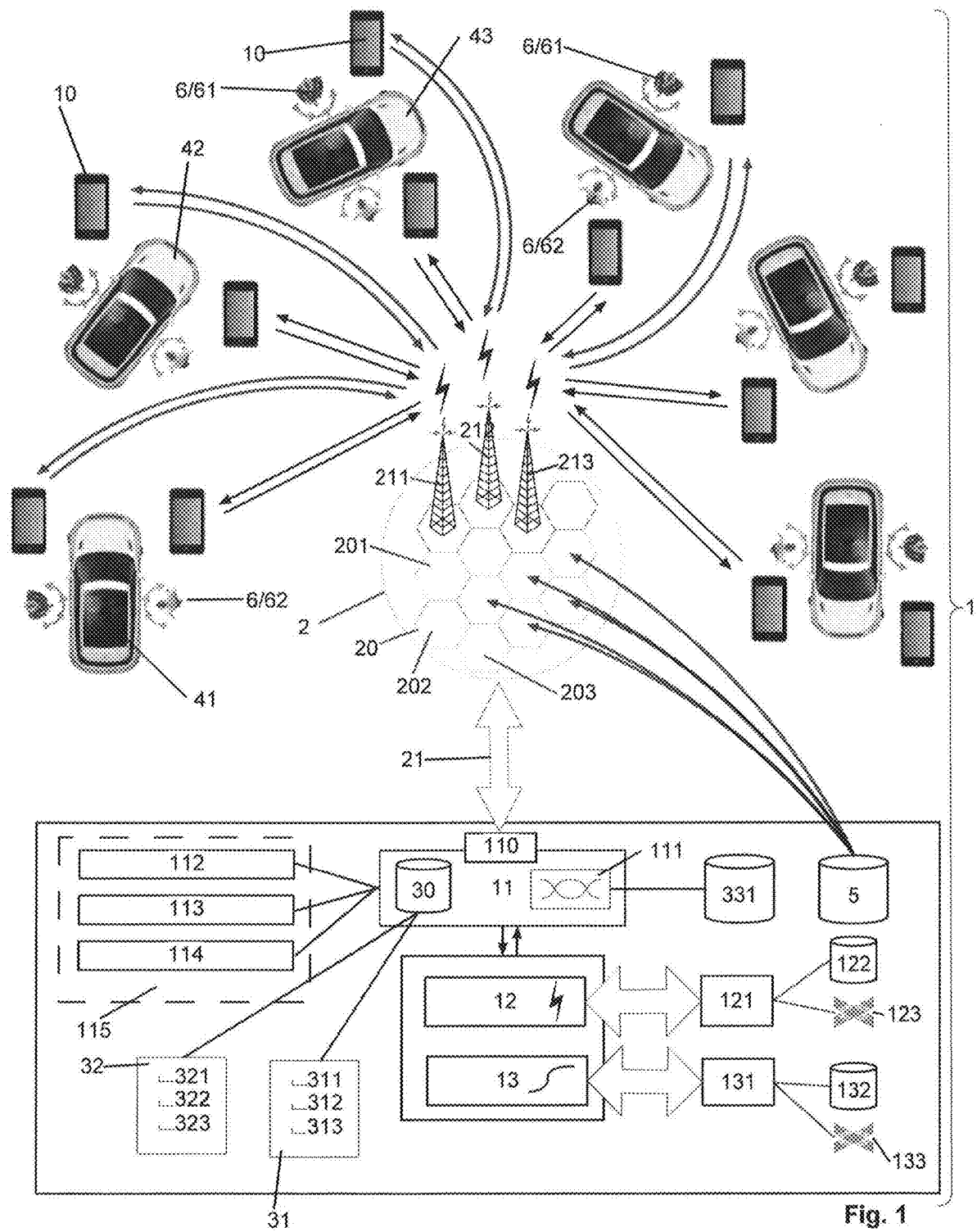
FIGS. 1 and 2 show a block diagram schematically illustrating an exemplary system for identifying and/or classifying an occupant of a vehicle 41, 42, 43, . . . based on sensory data measured by a plurality of sensors 102 of a cellular mobile device 10 of the occupant 6/61/62. The plurality of sensors 102 at least comprise an accelerometer 1025 and a gyroscope 1026. The mobile device 10 comprise one or more wireless connections 105, wherein by at least one of the wireless connection, the cellular mobile device 10 acts as a wireless node 221, . . . , 225 within a cellular data transmission network 2 by means of antenna connections of the cellular mobile device to the cellular data transmission network 2. The plurality of sensors 102 are accessible by and/or linked to a monitoring mobile node application 101 of the mobile device 10, wherein the monitoring mobile node application 101 captures usage-based and/or user-based telematics data of the cellular mobile device 10 and/or the user 6/61/62 of the cellular mobile device 10.
Figure 2:
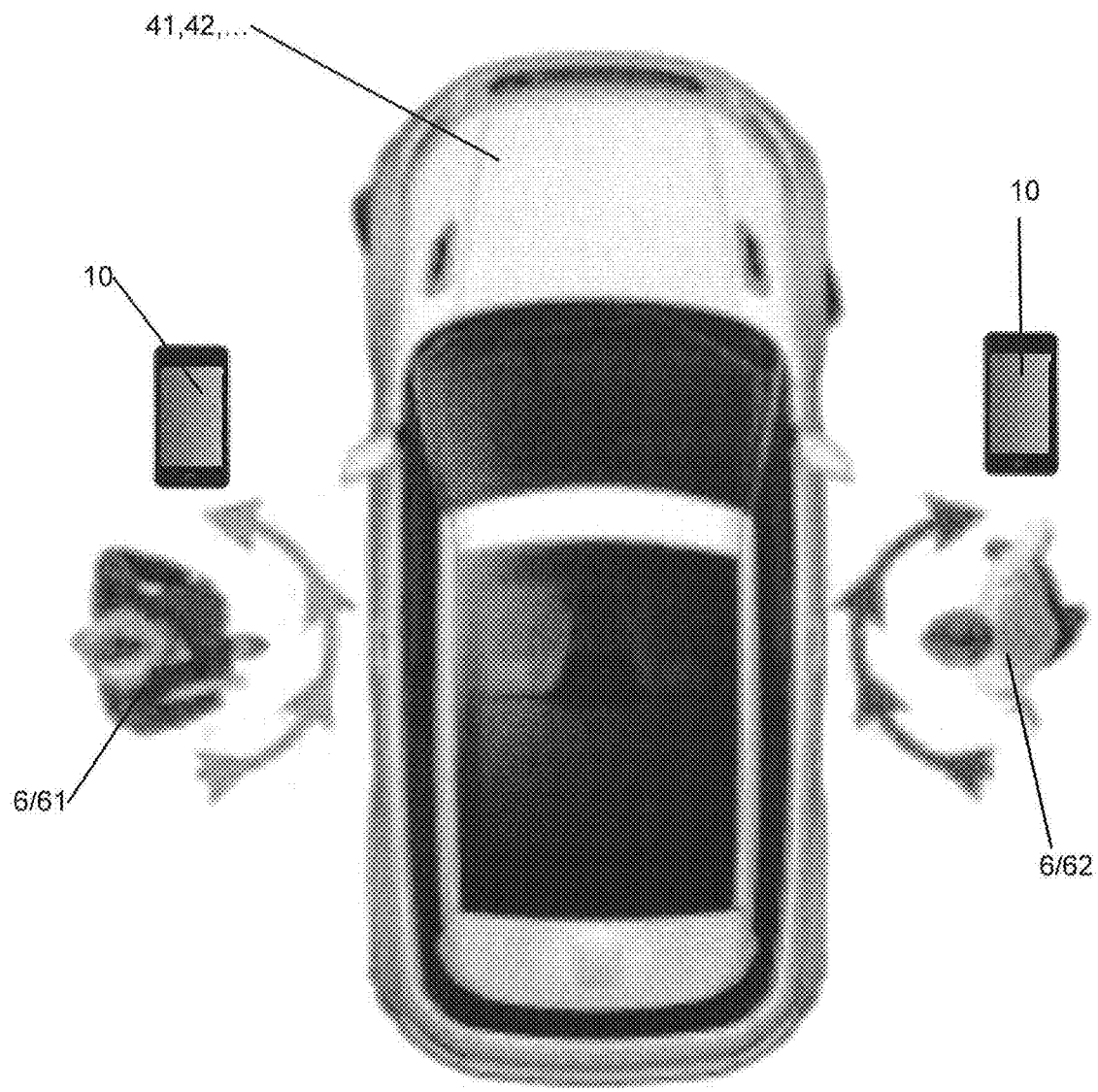

FIGS. 1 and 2 schematically illustrates an architecture for a possible implementation of an embodiment of the system and method for identifying and/or classifying an occupant 6/61/62 of a vehicle 41, 42, . . . based on sensory data measured by a plurality of sensors of a cellular mobile device 10 of the occupant 6/61/62 as user 6/61/62 of the mobile device 10, in particularly providing a system and method for detecting the user rotation direction while entering (and exiting) the car, using the information obtained from the gyroscope sensor (yaw) through a machine learning algorithm. As an embodiment variant, the present system 1 can e.g. be realized as a modular system 1 providing a broad monitoring and detection capability, e.g. to technically provide familiarity detection of trips. Thus, the system 1 can e.g. realized as part of an inventive, more complex and composite modular monitoring and detection system 1 with interactive modules, at least comprising Driver Passenger Detection (DPD) 112 and/or Transport Mode Recognition (TMR) 113 and/or trip familiarity score measuring 114 and/or trip familiarity measuring and detection 115, allowing a broad monitoring of user actions related to the use of his/her mobile phone. DPD 112 stands for Driver Passenger Detection or Driver Passenger Dilemma which refers the technical problem of detecting whether the user is the driver or a passenger. TMR 113 stands for Transport Mode Recognition which means recognizing the transport mode using mobile phone 10 data. Different embodiment variants are disclosed herein using/not-using a Random Forest machine learning 111 to take a decision, wherein the latter uses a set of rules starting from similar features as discussed for the Random Forest machine learning 111. Trip Familiarity means finding similar trips given a set of trips from the same user. This information can be used in different ways e.g. finding daily commute, improve DPD 112 and TMR 113 recognition and for risk scoring purposes. Around three variants are disclosed to evaluate trips, since familiarity, inter alia, depending on the use case.

As a further even more integrated embodiment variant, the system 1 can e.g. comprise one or more automated first-tier risk-transfer systems 12 (automated primary insurance systems) and one or more automated second-tier risk-transfer systems 13 (automated reinsurance systems). The automated first-tier risk-transfer systems 12 can comprise at least one electronic first-tier resource-pooling system 121 and the automated second-tier risk-transfer systems 13 can e.g. comprise at least one electronic second-tier resource-pooling system 131. Resource-pooling systems 121/131 are systems for automated, electronically steered pooling of resources from assigned risk exposed occupants/drivers/passengers 6/61/62, thereby transferring a defined risk associated with the risk exposed occupants/drivers/passengers 6/61/62 to the automated first-tier and/or second-tier systems 12/13, wherein the operation of the transferred risk is defined by risk-transfer parameters 122/132, e.g. predefined by means of predefined parameters given by risk-transfer policies, and wherein in case of triggering the occurrence of the defined risk at a occupants/drivers/passengers 6/61/62, an occurring and detected loss of the concerned risk exposed occupants/drivers/passengers 6/61/62 is distinctively covered by the automated resource-pooling systems 121/131 by triggering the specific transfer of resources from the resource-pooling system 121/131 to the concerned risk exposed occupants/drivers/passengers 6/61/62, e.g. through appropriate signaling based on generated payment transfer parameters 123/133. The operation of such a system 1 will be described in detail below. The risk-transfer parameters 122/132 can e.g. comprise parameters defining physical measuring parameters to detect the occurrence of a risk event at the risk exposed occupants/drivers/passengers 6/61/62, by means of the system 1 and/or time- or amount related threshold values. The risk exposed occupants/drivers/passengers 6/61/62 can be any type of person/occupant of a vehicle 41,42,43, . . . associated with a vehicle risk, i.e. a driver 61 or passenger 62. A vehicle risk is related to the probability for the occurrence of a vehicle risk event in relation to risk-exposed occupants/drivers/passengers 6/61/62. The automated system 1 can e.g. include at least a processor and associated memory modules. The operation of the system 1 is controlled, monitored and steered by the electronic control device 11, in particular generating appropriate signaling and steering the activation and interworking of the various components of the automated system 1. The automated system 1 can also include one or more display units and operating elements, such as a keyboard, and/or graphic pointing devices, such as a computer mouse. The system 1 is a technical device inter alia comprising electronic means used in the field of computer and data processing technology, telematic technology and automated risk transfer or insurance technology. The invention seeks to technically capture, manage and automate complex related operations of monitoring devices.

Driver Passenger Detection (DPD) 112

For identifying and/or classifying an occupant of a vehicle 41, 42, 43, . . . based on sensory data measured by a plurality of sensors 102 of a cellular mobile device 10 of the occupant 6/61/62, the plurality of sensors 102 at least comprise an accelerometer 1025 and a gyroscope 1026. The mobile device 10 further comprises one or more wireless connections 105, wherein by at least one of the wireless connection, the cellular mobile device 10 acts as a wireless node 221, . . . , 225 within a cellular data transmission network 2 by means of antenna connections of the cellular mobile device to the cellular data transmission network 2, and the plurality of sensors 102 being connected to a monitoring mobile node application 101 of the mobile device 10. The one or more wireless connections 105 or wired connections of the mobile telecommunication apparatus 10 can for example comprise Bluetooth as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities and/or 3G and/or 4G and/or GPS and/or Bluetooth LE (Low Energy) and/or BT based on the Wi-Fi 802.11 standard, and/or a contactless or contact smart card, and/or a SD card (Secure Digital Memory Card) or another interchangeable non-volatile memory card. For providing the wireless connection 105, the mobile telecommunication apparatus 10 can for example act as a wireless node within a corresponding data transmission network by means of antenna connections of the mobile telecommunications apparatuses 10, in particular, as mentioned, mobile telecommunication networks such as 3G, 4G, 5G LTE (Long-Term Evolution) networks or mobile WiMAX or other GSM/ EDGE- and UMTS/HSPA-based network technologies etc., and more particularly with appropriate identification means as SIM (Subscriber Identity Module) etc.

The monitoring mobile node application 101 captures usage-based and/or user-based telematics data of the cellular mobile device 10 and/or the user 6/61/62 of the cellular mobile device 10. The mobile telecommunications apparatuses 10 and the monitoring cellular mobile node application 101 can e.g. be connected to an on-board diagnostic system 431, . . . , 435 and/or an in-car interactive device 441, . . . , 445, wherein the mobile telecommunications apparatuses 10 capture usage-based 31 and/or user-based 32 automotive data 3 of the motor vehicle 41, 42, 43, . . . and/or user. The mobile telecommunications apparatuses 10 can for example provide the one or more wireless connections 1024 by means of radio data systems (RDS) modules 10241 and/or positioning system 10242 including a satellite receiving module and/or a mobile cellular phone module 10243 including a digital radio service module and/or a language unit 10244 in communication with the radio data system 10241 or the positioning system 10242 or the cellular telephone module 10243. The satellite receiving module 10242 can for example comprise a Global Positioning System (GPS) circuit and/or the digital radio service module comprises at least a Global System for Mobile Communications (GSM) unit. The plurality of interfaces of the mobile telecommunications apparatuses 10 for connection with at least one of a motor vehicle's data transmission bus can for example comprise at least on interface for connection with a motor vehicle's Controller Area Network (CAN) bus, e.g. in connection with an on-board diagnostics (OBD) port, or another connection for example for battery installed devices, or also OEM (Original Equipment Manufacturer) installed systems obtaining information access to on-board sensors or entertainment systems (such as Apple Carplay etc.) providing the necessary vehicle sensor information.

As mentioned, a data link 21 is set by means of the wireless connection 105 of the mobile telecommunication apparatus 10 over the mobile telecommunication network 2 between the mobile telematics application 101 as client and an intelligent central automotive circuit 11, wherein the mobile telecommunication apparatus 10 acts as wireless node 221, . . . , 225 within said mobile telecommunication network 2, and wherein the operating parameters 40121 and the environmental parameters 40111 are measured and collected in dataflow pathway 103 as automotive telematics data 3 during operation of the motor vehicle 41, 42, 43, . . . via the mobile telecommunication apparatus 10 by means of a mobile telematics application 101 and transmitted to the central circuit 11. The intelligent central circuit 11 comprises a sensory-data-driven core aggregator 110 with a plurality of dynamically applied sensory data-based triggers 1012 triggering, capturing, and monitoring said sensory parameters in the dataflow pathway 103 by means of a mobile telematics application 101 of the mobile telecommunication apparatus 10. The mobile telecommunication apparatus 10 can for example comprise at least a GPS module (Global Positioning System) and/or geological compass module based on a 3-axis teslameter and a 3-axis accelerometer, and/or or gyrosensor or gyrometer, and/or a MEMS accelerometer sensor comprising a cantilever beam with the seismic mass as a proof mass measuring the proper or g-force acceleration, and/or a MEMS magnetometer or a magnetoresistive permalloy sensor or another three-axis magnetometers.

The mobile device 10 measures gravitational acceleration movement sensory data by means of the accelerometer based on measuring parameters obtained from the accelerometer. Vehicle 41,42, . . . entering or exiting movement patterns of the user are detected from the acceleration movement sensory data at least comprising pattern for base axis and degree of rotation associated with a vehicle entrance or exit of the user 6/61/62. The detected vehicle entering or exiting movement patterns of the user 10 trigger as input features the recognition of a vehicle entering or exiting movement of the user by performing a decision-tree classification on the input features to rule out whether the user entered or exited from a left or right side of the vehicle. It is to be noted that the system 1 can also be realized by using other classification algorithms or structures e.g. boosted tree or neural network etc.

The present invention allows to select (as few as possible) characteristic input features to reduce the number of model parameters to be used. The inventive DPD (Driver Passenger Detection) method and system comprise at least the following three main steps: 1. Detect the exact moment when the user is entering/exiting the car by analyzing the acceleration. 2. Use the gyroscope data to select various features such as the verse and the degree of the rotation associated to the entrance/exit. 3. Perform a decision-tree classification on the input features to rule out whether the user entered (exited) from the left/right side of the car. The system provides a detection of the exact moment when a person is entering/ exiting the car. It is to be mentioned that without this information, any other analysis of the Gyroscope sensor will be useless to the DPD problem due to the many rotations that a user can perform in a huge variety of movements. The detection step is accomplished by collecting information both on the variance of the acceleration in the up/down (Earth reference system) directions and on the presence (or not) of some particular discontinuities in the acceleration signals in the smartphone reference system (not rotated).

Thus, the gravitational acceleration movements are correlated with the orientation of the mobile device building a smartphone reference system. For detecting of the exact moment when a use is entering or exiting the vehicle, acceleration in the up/down directions related to an earth reference system are detected from the acceleration movement sensory data and by measuring or not measuring the variance of discontinuities in the acceleration signals in the smartphone reference system.

The acceleration movement sensory data are triggered for a small timely gap (G) associable with a time window just before opening a door of the vehicle immediately before entering the vehicle or a downwards movement done while a sitting movement (S). Upon detecting a movement pattern (M) as suitable for the sitting movement (S), the acceleration movement sensory data are triggered for rotations with an overlap with the sitting movement (S), and a decision tree is performed to classify the user as driver or passenger depending on the counterclockwise/clockwise direction of rotation. Thus, the invention detects either the small pause (or gap (G)) just before opening the car door and thus right before entering the vehicle or the downwards movement done while sitting. If a suitable candidate for the sitting movement (S) is detected, the strategy looks at rotations with an overlap with this movement, and then performs a decision tree to classify Driver/Passenger depending on the counterclockwise/clockwise direction of rotation. Any detected movement pattern (M) is classified as sitting movement (S) or other movement (O).

For separating the movement pattern (M) from the timely gaps (G) the variance of the acceleration in the up/down direction (var($a_z$)) is processed by a threshold-filter, wherein the acceleration in the up/down direction ($a_z$) corresponds to the signal rotated in the earth reference system. The acceleration in the variance of the up/down direction (var($a_z$)) at a certain time t is generated over a fixed time window centered around t, wherein the variance of the up/down direction (var($a_z$)) depends on the length (w) of the time window. Since many typical human movements (like walking) have a low-frequency component around 1 Hz (or less), a time widow of at least 1 s (or more) is needed in order to properly sample a full oscillation. For this reason, to generate var($a_z$) w=1 s can be used, i.e. the length (w) of the time window is set to 1 s or more to ensure proper sampling of a full oscillation.

Three general rules can be used for the DPD identification to classify a certain movement (M) as a sitting movement: (1) The acceleration movement sensory data are triggered for movement pattern (M), wherein a movement pattern (M) is recognized as a sitting movement (S), if its time-dependent duration is measured close to that of a predefined or captured average sitting movement. This means that for example a 10 s movement will have lower score (thus not a sitting) than a 1 s movement (thus probably a sitting); (2) The acceleration movement sensory data are triggered for movement pattern (M), wherein a movement pattern (M) is recognized as a sitting movement (5), if it is further measured to be definably close to a rotation in the x-y plane compatible with an entrance or exiting. This means that if a movement overlaps a rotation (see next session for definition) will have a higher score because it is a valid DPD candidate; and (3) The acceleration movement sensory data are triggered for movement pattern (M), wherein a movement pattern (M) is recognized as a sitting movement (S), if it is further measure to be definable near to a discontinuity in the acceleration components in the smartphone reference system. A strong discontinuity can be present during the sitting action, for example if the phone is inside trouser pockets or inside a bag. Furthermore, rules can be added based on the specific type of discontinuity. For example, this enables to give different scores to a phone-in-the-pocket with respect to a phone-on-the-mount-holder. I.e. in this embodiment variant, additional rule-based classifications are added based on the specific type of discontinuity.

Obviously wrong movements or gaps can be saved by the system since they are very useful to the final decision stage. These movements or gaps can be called "barriers", and they can be of 2 types: (i) "M" is "W" (walking) if its duration is longer than maxSduration (for example 7 seconds), and (ii) "G" is "R" (rest) it its duration is longer than minRestgap (for example 20 seconds). In both cases (i) and (ii) the threshold cannot be larger than the available buffer of data, otherwise they will be useless (since it is impossible to find a 20 second gaps in a 5 second window). The Knowledge of "W" and "R" can be useful to the final stage, to restrict the number of valid DPD candidates to investigate. For example, a valid sitting "S" found AFTER a walking "W" in an EXIT context must be discharged, while the opposite is true in an ENTER context.

Upon detecting movement patterns (M) best matching a sitting movement (S), the gyroscope movement sensory data corresponding to the acceleration movement sensory data are determined, wherein the integral of rotations in the x-y plane in the earth reference system are detected which are sufficiently close to a sitting movement (S). A counterclockwise rotation is associated with an entrance or exit of a person from the left side of the car, which means driver or passenger dependent on the driving-side of a specific country. The counterclockwise rotation can be measured to be at least 40°. A clockwise rotation is associated with an entrance or exit of a person from the right side of the car, which means driver or passenger dependent on the driving-side of a specific country. The clockwise rotation can be measured to be at least 40°. As a variant, the method further can comprise the steps of classifying the orientations of the mobile device as driver orientations and passenger orientations, determining, a first time duration that the mobile device is oriented in the driver orientations and a second time duration that the mobile device is oriented in the passenger orientations; performing a comparison of the first time duration to the second time duration; and classifying a user of the mobile device as a driver or a passenger based on the comparison.

Figure 3:
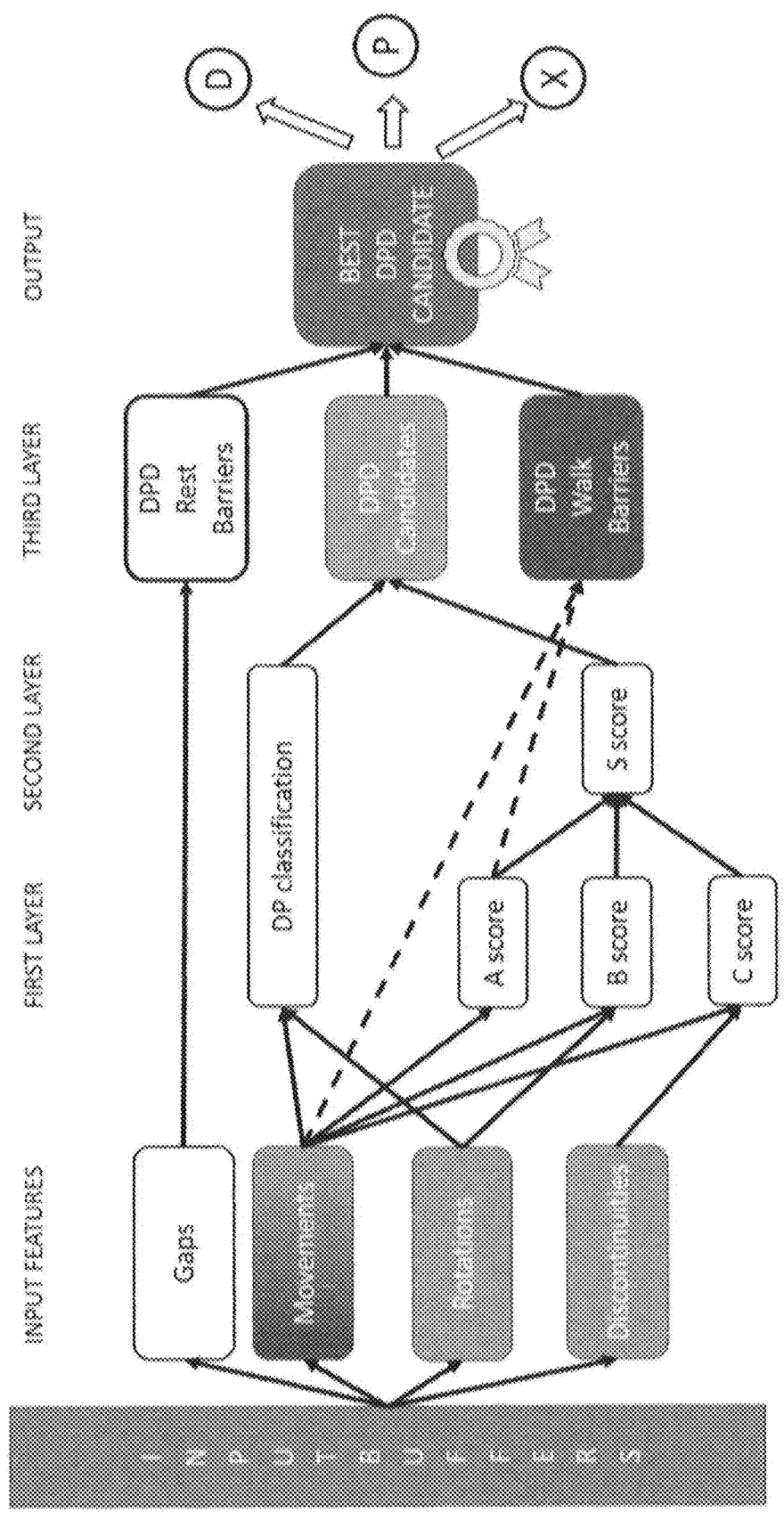
FIG. 3 shows another block diagram schematically illustrating an exemplary DPD (Driver Passenger Detection) signal processing, at least comprising the three steps: 1. Detect the exact moment when the user is entering/exiting the car by analyzing the acceleration; 2. Use the gyroscope data to select various features such as the verse and the degree of the rotation associated to the entrance/exit; and 3. Perform a decision-tree classification on the input features to rule out whether the user entered (exited) from the left/right side of the car.

Once all the scored and classified DPD candidates can be assessed, the inventive system performs a final choice to decide which is the best candidate and eventually throw a DP event (see FIG. 3). To this scope the system: (1) Knows if it is looking at the entrance (start, beginning of a car trip) or vice versa; (2) Provides a list of scored and classified movements (DPDcandidates); and (3) (Optionally) provides a list of DPD barriers. After having filter out DPD candidates not coherent with the barriers, the system will throw the classification of the candidate having the highest score (e.g. not less than 0.7).

Figure 4:
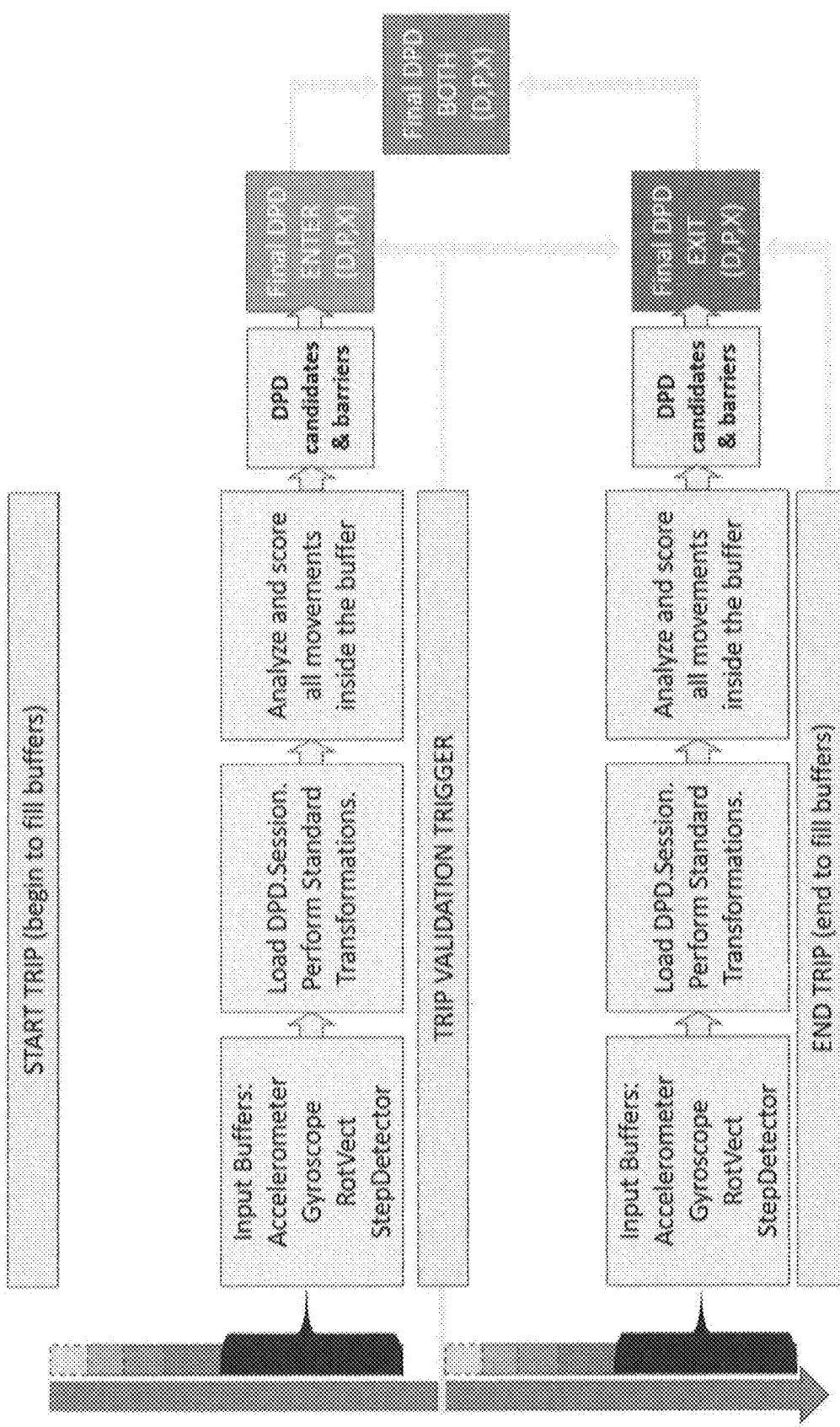
FIG. 4 shows block diagram schematically illustrating an exemplary general measuring parameter processing pipeline, i.e. the general data workflow. Starting from a certain start-trip (waking) trigger, a sliding buffer of input data (e.g.

FIG. 4 illustrates the general pipeline of the invention. Starting from a certain start-trip (waking) trigger, a sliding buffer of input data (e.g. 80 seconds, but longer buffer size may be used) is stored until the trip is validated (6400 byte/sec at 100 Hz). If the trip-validation trigger confirms that a trip has started, all the current buffer will be saved as StartBuffer. The same logic will apply to the EndBuffer, which is the last available buffer before the end-trip trigger. The inventive system takes as argument the StartBuffer, the EndBuffer or (preferably) both. This algorithm will load the necessary sensors, apply some standard transformations on the input and finally search and classify each possible movement (DPD candidate) inside the current buffer. Finally, the best DPD entrance candidate, together with the best exit candidate and the best overall will be sent and stored to the database as "DPD events". Input sensors of the system are 1. Gyroscope (time-stamp,x,y,z), 2. Accelerometer(time-stamp,x,y,z), 3. RotationVector(time-stamp,x,y,z, w), 4. (opfional)StepDetector(timestamp). While the inputs of the DPD identification are (aside from time): 1. Gyroscope z component in the Earth Reference, 2. Accelerometer x,y,z in the device reference system, 3. Accelerometer z component in the Earth Reference, 4. (optional) the StepDetector, 5. All the parameters of the model. The parameters needed by the DPD algorithm can e.g. be given in a dictionary form, as illustrated in FIG. 5. The accuracy of the DPD system depends on these parameters and their values can e.g. be set and updated by any future training procedure. Current values are obtained after a small grid exploration, and correspond to a F1 score for Driver detection of 0.84 (with Precision=0.88 and Recall=0.81). The results can be further improved after an extensive training stage.

For example, as DPD classes and notations, the following three main classes may be used in DPD data processing structure, for example Buffer, Window and Session. For the "Buffer" main class, each sensor can be collected into a "Buffer" class, which is a simple wrapper of input data, containing some additional information as e.g. (i) tag (str) =could be either "enter" or "exit" and represents the corresponding action, (ii) name (str)=the name of the sensor; (iii) data(dict)=contains the input data in the form "columnname":np.array( ) e.g. data["timestamp"]=np.array ([1552475873725, 1552475874679, 1552475875681, . . . ]).

For the "Window" main class, "Window" is a simple multi-use class containing minimum info about a certain time slice, plus some additional information as e.g. (i) tag(str)=could be either "enter" or "exit" and represents the corresponding action, (ii) idx(list)=a list containing the start and stop index, (iii) ts(list)=a list containing the start and stop timestamps in seconds t (list)=a list containing the start and stop time in seconds, (iv) mainclassification(str)=(for example "M" for a movement, "G" for a gap), (v) finalclassification (str)=the final classification of the DPD algorithm for this window (e.g. "S" for a sitting movement), (vi) finalconfidence(double)=the final confidence of the DPD algorithm for this window, (vii) classifications(list)=a list containing all the partial classifications and confidences given by the different scoring functions, (viii) integral (double)=contains the integral of a certain curve in this window (or just its sign if it is the only thing needed). For the "Window" main class, see FIG. 6. Here, three scenarios in which windows are used, are anticipated where more details about the nature of the signals follow below (see "Transformation" below), the three scenarios being "Rotation Window", "Acceleration Window", and "Discontinuity Window". In the example pictures 7 and 9, windows are delimited by dashed vertical lines.

(A) A "Rotation Window" is a window related to the gyroscope signal. In the context of the inventive Driver Passenger Detection (DPD), a "rotation" is a coherent movement in the xy plan (Earth coordinates system) around the z axis (up/down direction). A rotation is not the window delimited by two intersections of the gyroscope signal with the zero axis. Instead, it is a window inside which the gyroscope signal does not change much its sign (also cf. FIG. 8). The concept can be better shown by looking at the underlying picture, where normally three rotations are expected to be found. Here, in FIG. 7, the first two red areas (light grey) are joined together since they have the same sign and are not separated by a big-enough blue area (dark grey). Here the size of the "ribbon" has been exaggerated for clarity.

(B) An "Acceleration Window" is a window related to the accelerometer signal. It has been built using a threshold on the variance of the acceleration in the z direction (Earth Coordinate System). A window is built every time the acceleration variance crosses the threshold lines (see FIG. 9). These windows can be either movements "M" or gaps "G", and every movement can be a DPD candidate "S" (Sitting) or not (cf. FIG. 10).

(C) An "Discontinuity Window" is a window related to the (not rotated) accelerometer signal. It is built around a discontinuity in one (or more) of the accelerations signals in the smartphone reference system. For example, when the component of the gravity force switches from an axis to another (from X to Y in the D1 windows in FIG. 11). It is built using a sliding window and its size depends on thresholds. Its pattern is also saved for later classification. (i.e. D1 has a pattern X(positive)→Y(positive), while D2 has a pattern Y(positive)→X(negative)) (cf. FIG. 12).

FIG. 13 shows a plot how these windows described above look like with real data (showing the gyroscope Z component, the accelerometer Z component (normalized and rotated), and the accelerometer components (not rotated)).

Different transformations can be used to prepare the inputs to the DPD a rotation classificatory. Examples for such transformations are (i) a uniform sampling transformation, (ii) a rotation transformation, (iii) a time-in-seconds transformation, (iv) an acceleration normalization and gravity subtraction transformation, (v) an initialize stats transformation, and (vi) an add utility columns transformation.

The uniform sampling transformation needed for later analyses is a resampling of all buffers data. This is necessary both because inputs may not be perfectly sampled, and because different smartphones may have different sampling rates. In this phase, every signal can e.g. be converted to 100 Hz by a linear interpolation (see FIG. 14). The rotation transformation is a rotation of the Gyroscope and Accelerometer signals to the Earth reference system (cf. FIG. 15). This can be achieved by using the quaternion rotation vector to build a rotation matrix and then applying this rotation matrix to the input vectors. Actually, only the z component of both Gyroscope and of the Accelerometer is needed. All three components of the Accelerometer can be saved before not rotated, which will be used later to detect discontinuities. The time-in-seconds transformation allows adding a time-in-second column to all of the buffers. Seconds can be measured since the most left timestamp present in the session. This may be computationally demanding but may avoid numerous technical problems. It may be also advantageous to collect data using elapsed seconds only, including the starting timestamps in the metadata of a session (cf. FIG. 16).

The Acceleration Normalization and Gravity subtraction transformations allow to standardize signals coming from different operating systems of the mobile phones, as e.g. the iOS (measured in g units) to that of Android devices (measured in $m/s^2$). This procedure does not need to rely on the internal information of the smartphone model, but it may simply check if the mean absolute value of the acceleration (which contain the gravity acceleration) is compatible with $m/s^2$.

The Acceleration Normalization is technically necessary if the same thresholds is to be used for both the signals. Gravity subtraction acts on the ROTATED signal and subtract g=9.81 ($m/s^2$) from the acceleration z component. An example of an implementation of the Acceleration Normalization process is given in FIG. 17.

The Initialize Stats transformation is a process of DPD-.Session class and it initializes some parameters of the current session. In particular, it finds the minimum timestamp and the max timestamp among all the buffer, and also makes a subdivision if the session has both the enter and the exit buffers. Also, it may save the last step and the first step timestamps if the step detector buffer is present.

The Add Utility Columns transformations add new columns to buffers, which will be recursively used in later calculations. These are either smoothing windows (for both the rotated Gyroscope z component and the not-rotated Accelerometer x, y, z) or variance windows (for the rotated Accelerometer z component). The functional parameter requirements can be given by (i) add_column_smooth (session, "enter", target="Gyroscope", axis="z", window=50), (ii) add_column_smooth (session, "enter", target="Accelerometer", axis="x_nn", window=100), (iii) add_column_smooth (session, "enter", target="Accelerometer", axis="y_nn", window=100), (iv) add_column_smooth (session, "enter", target="Accelerometer", axis="z_nn", window=100), (v)

add_variance_column (session, "enter", target="Accelerometer", axis="z", window=50).

A Transformation Pipeline (cf. FIG. 18) can be implemented as a defined process. The Transformation Pipeline automatically performs all standard transformations in the correct order as e.g.: 1. Uniform sampling; 2. Time in seconds; 3. Initialize Stats, 4. Acceleration Normalization (must be done before rotation), 5. Rotation, 6. Subtract g from the acceleration z component (must be done after rotation), 7. Add Utility Columns.

As a further transformation, a windows detection and scoring transformation can be implemented. This pipeline can be mainly a wrapper of the 'Score_movement' function, whose goal is to find the best DPD candidate found in the current session. Its task are: 1) Find all Rotations present in the gyroscope buffer; 2) Find all Discontinuities in the not-rotated accelerometer buffer; 3) Find and separate Movements from Gaps using the rotated accelerometer variance along the z component; 4) Score every Movement found; 5) Score every gap found; 6) Save some results for plotting (optional); 7) Apply DPD_barriers filter on found DPD_candidates; 8) Select the best among the remaining DPD_candidates; 9) Save the best candidate in Session.DPD_candidates (cf. FIG. 19).

Again another transformation is the Score Movement transformation which is a wrap function for the following pipeline: 1. find the $C_{score}$ of w, and collect all discontinuities overlapping with w; 2. (optional) split the movement in 2, if the movement is long but it has a "good" discontinuity; 3. Save the movement to DPD_barrier as "W" if it is too long; 4. find the $A_{score}$ of w; 5. find the $B_{scpre}$ of w; 6. calculate the final $S_{score}$ (weighted mean of all scores); 7. (optional) check if w is a mount holder action; 8. Find all nearby rotations; 9. Get the DPD classification and confidence; 10. Save the movement in DPD_candidates. The technical descriptions can be given in the code according to FIG. 20.

In addition, transformations $A_{score}$, $B_{score}$, $C_{score}$, Discontinuity Type Score, Final S score, Check if M is a mount holder action, DP Classification, and DPD_barriers filter decision can e.g. be implemented as:

$A_{score}$: If $\Delta_t$ is the duration (in seconds) of the movement, it's a score is simply given by (cf. FIG. 21):

$$A_{score} = e^{\left(-\frac{(\Delta_t - m_A)^2}{2\sigma_A^2}\right)}$$

where $m_A$ and $\sigma_A$ are parameters.

$B_{score}$: If $d_R$ is the distance (in seconds) of the movement window from the closest big rotation (i.e. a rotation of an angle greater than) 30°, the B score is given by (cf. FIG. 22):

$$B_{score} = \frac{1 - Sig(d_R, m_B, \sigma_B))^2}{1 - q}$$

where $$Sig(x, m, \sigma) = \frac{1}{1 + e^{\frac{x-m}{\sigma}}},$$

q is just a normalization factor q=Sig(0,m, σ) and $m_B$ and $\sigma_B$ are parameters. The distance between two windows A, B is zero if the two windows overlaps and is otherwise given by:

$$dist(A, B) = \min(|A \cdot t_0 - B \cdot t_0|, |A \cdot t_1 - B \cdot t_1|, |A \cdot t_0 - B \cdot t_1|, |A \cdot t_1 - B \cdot t_0|)$$

$C_{score}$: Since many discontinuities D can be found near a movement, this transformation first generates a score for each D and then select the best among them. If $d_{D_i}$ is the distance (in seconds) of the movement window from the i-th Discontinuity $D_i$, the $C_I$ score is given by (cf. FIG. 23 (cf. FIG. 21)):

$$C_i = type(D_i) * e^{\left(-\frac{(d_{D_i})^2}{2\sigma_C^2}\right)}$$

Where type $(D_i)$ is a score function which gives a score to the type of discontinuity (see below). Finally, the cscore is given by:

$$C_{score} = \max_i(C_i)$$

Discontinuity Type Score: This transformation assigns a score different from 0.7 only if the current discontinuity pattern is found among the given parameters for the data processing and analysis, respectively. In this case the score is fixed by the parameter provided. The goal of this score is to reward and weight patterns which are more likely to happen during a sitting movement, at the same time penalizing those which are not compatible (cf. FIG. 24).

Final $S_{score}$: This transformation generates a weighted means of A,B and C scores (cf. FIG. 25):

$$S_{score} = \frac{1}{\sum k\_i} \sum_{i=A,B,C} k_i * i_{score}$$

where weights $k_i$ are input parameters.

Check if M is a mount holder action: This check is optional and it is governed by the parameter detect_mount_holder (bool). An entrance (exit) movement is classified as a mount holder action H if it has a discontinuity which ends (begin) with the smartphone fix in a vertical position (i.e. when the gravity component is directed along the positive Y axis in the phone reference system). (cf. FIG. 26)

DP Classification: This transformation returns the DP classification of a movement using the gyroscope data by looking at various features such as the verse and the degree of the rotation associated to the entrance/exit. (cf. FIG. 27)

DPD_barriers filter decision: This transformation checks if some DPD_candidates are wrong using the DPD_barriers and not their score (see FIG. 31). To better illustrate the idea, the example picture of FIG. 28 illustrates an entrance buffer. Supposed is that 3 possible DPD_candidates (C1, C2 and C3) and 2 barriers, a walking "W" and a rest "R" are found. This decision discharges the first candidate because it is not compatible with a sitting-in-car action. After this filter has been applied, the transformations return the candidate that has the best score among the leftovers. If no rest barriers are present, the output will be "X" since probably the system is not looking at a car entrance/exiting (see FIG. 29). If no walking are present, the output will still be the best candidates among (see FIG. 30).

From the information contained in the "Connection Events" field, the system 1 can check if a Bluetooth (BT) connection took place in the current session. To take this information into account, the final DPD classifier will combine Bluetooth Events, together with enter and exit candidates, to classify the session.

The final DPD classifier can e.g. combine features coming from BT connections and from DPD_Candidates to score the current session. From the detected labels l and their confidence levels c, a DP score can be assigned to the entrance/exit as follow (cf. FIG. 34):

$$D_{enter} = \begin{cases} c_{enter}, & \text{if } l_{enter} = \text{"D"} \\ 0, & \text{otherwise} \end{cases}$$

$$P_{enter} = \begin{cases} c_{enter}, & \text{if } l_{enter} = \text{"P"} \\ 0, & \text{otherwise} \end{cases}$$

$$D_{exit} = \begin{cases} c_{exit}, & \text{if } l_{enter} = \text{"D"} \\ 0, & \text{otherwise} \end{cases}$$

$$D_{exit} = \begin{cases} c_{exit}, & \text{if } l_{enter} = \text{"P"} \\ 0, & \text{otherwise.} \end{cases}$$

With this notation, the final score of the session is built as a weighted average of single scores:

$$D_{final} = \frac{1}{W} \sum_{enter,exit,BT} w_i D_i$$

$$P_{final} = \frac{1}{W} \sum_{enter,exit,BT} w_i P_i$$

$$X_{final} = 1 - D_{final} - P_{final}$$

The three weight factors $w_i$, together with the two BT scores $D_{BT}$ and $P_{BT}$ correspond to the input parameters DPD_enter weight, DPD_exit_weight, BT_weight, BT_D_score, BT_P_score, that will be fixed by a training stage. Bluetooth weight can e.g. be automatically set to 0 if no BT connection took place during the session. A simple example of how scores are assigned to sessions is shown in FIG. 32, while the overall decision schema is reassumed in FIG. 33. As can be exemplary seen in FIG. 35, from later training it can be found that, without BT data, enter and exit have the same influence on the final accuracy, i.e. $w_{enter} = w_{exit}$.

Assigning the class from DPD scores can e.g. be realized as follows: FIG. 36 illustrates how the difference P-D of final scores is distributed among all the sessions collected from an example time period as e.g. January 2019 to June 2019. On the x axis, there is the difference between the final passenger score P and the final driver score D. This composite feature is called λ where $\lambda = (P_{final} - D_{final})$ with $-1 \leq \lambda \leq 1$. Negative values of λ correspond to left side entrance/exit, while positive values correspond to the opposite side. λ ranges from −1 (Higher Driver score) to +1 (Higher Passenger score) and its absolute value corresponds to the accuracy of the detection. Groups of data are clustered (separated) because the minimum acceptable confidence score for each single detection was fixed to 0.7 in this example. The two outermost groups of data represent sessions where the entrance detection was equal to the exit one (for example Driver was detected both in the entrance and exit buffer). The middle groups represent sessions where only one detection took place. This could be due to the complete lack of one of the two buffers, to the bad quality of one of the two buffers, or to the failing of the algorithm detection. Finally, the central group represents sessions where the entrance detection was opposite to the exit one (for example Driver was detected in the entrance and Passenger in the exit buffer). Since in our strategy D and P scores refers to the type of rotation done while entering the car, it appears that driver rotation distribution is well peaked in the counter clock region (P−D<0), while passenger distribution is more uniformly spread. The ability of clustering drivers to the left part of this plot is the proof of the goodness of the algorithm, while problems related to Passengers detections may be due to the chosen strategy or to the lack of enough passenger data. Finally, as illustrated in FIG. 37, thresholds can be introduced to ignore bad quality DPD results thus improving the accuracy of remaining ones. The logic governing the connection between these threshold and the final assigned class can simply be: If $\lambda < t_D$, the session is classified as Driver by the system 1, if $\lambda < t_P$, the session can be classified as Passenger by the system 1 and Else no class is assigned and DPD event is not thrown.

For the training results, the training of DPD algorithm structure can be done through grid exploration e.g. using the notebook "Training". As explained above, the overall final accuracy can be selected using $t_P$ and $t_D$ thresholds on account of reducing the number of events detected by the system 1. The parameters selected for describing performances are: (i) The driver precision, recall and F1 score, (ii) The passenger precision, recall and F1 score, and (iii) The mean F1 score between drivers and passengers. In the example of FIG. 38, with $t_P = -t_D = 0.46$, this results in a driver F1 score of 0.86, a passenger F1 score of 0.58, a mean F1 score of 0.72 and 43% of events detected. Furthermore, FIG. 39 shows how it is possible to reach a mean F1 score of 0.82 by increasing thresholds and reducing the number of events detected.

In the inventive system 1, a DPD integration with Familiarity can e.g. be used. The technical concept of Familiarity aims to cluster similar trips by the system 1 which are done many times by a certain user, driver or passenger. In the example used here, single trips are described by means of "Links" implementing geocoding techniques, here exemplarily provided by the "Here" services. "HERE" technologies provide mapping and location data and related services to individuals and industries, in particular, it provides various automotive technologies, as "Here Auto" providing mapping and navigation technology or "Here MapCare" providing "Here maps data" to the car systems. Basically, trips that share more than 80% of their links are considered similar and cluster of similar trips are created as a collection of the most frequent links. In the following it is shown how the integration of this information can be useful to the DPD classification, i.e. if similar trips share also the same Driver or Passenger characterization. The integration strategy of DPD with Familiarity consists in two main stages as it is illustrated in FIG. 40: (A) First, DPD results from each session will be stored in a table. This way, during later clustering processes, a DPD score can be assigned to clusters; (B) Secondly, when a new session is recorded, its own DPD result will be combined with that of its belonging cluster (if any). These separate input features will be used by the DPD+F classifier (server-side) to re-score the session before saving its result.

(A) Assign DPD score to Cluster: By definition, a cluster is an ensemble of similar sessions. Some (or all) of the i-sessions forming a cluster will have a Driver and a Passenger final score $D_{final,i}$ and $D_{final,i}$ if a DPD event was detected by the used algorithm structure. The DPD score of the cluster will be simply given e.g. by the average of all DPD scores of its belonging internal sessions:

$$D_{cluster} = \frac{1}{N} \sum_{sessions} D_{final,i}$$

$$P_{cluster} = \frac{1}{N} \sum_{session} P_{final,i}$$

where N is the total number of sessions with DPD score in the cluster. This schema is exemplarily shown in FIG. 41, where (i) N is the total number of sessions with DPD score in the cluster, (ii) $D_i \in [0, 1]$, $P_i \in [0, 1]$, and $X_i \in [0, 1]$, are the final confidence scores returned by DPD for each sessions (including enter/exit and BT connection), and (iii) cluster scores can be generated from user annotations (Truth) or eventually from a combination of both sources. Also, it is possible to build a DPD cluster scores using the true label (Driver or Passenger) coming from user annotations of each session. The technical strategy used to create DPD clusters is enclosed in the DPD+F library notebook, as illustrated by FIG. 42.

(B) DPD+F classifier: As schematically shown in FIG. 43, the final DPD+F classifier can e.g. use a total of 5 input features coming from the session and from its belonging cluster, with (i) the final class will be decided by a DPD+F Decision Tree. Given the low number of data, the algorithm rules must be simple to technically avoid overfilling; (ii) 5 independent input features (if a matching cluster is found, otherwise DPD+F=DPD): $D_{cluster}$, $P_{cluster}$, $D_i$, $P_i$, and N; (iii) N is the total number of sessions with DPD score in the cluster; and (iv) other features such as BT presence are not used in this example. The classifier takes as input a single composite feature $\lambda_{p,d}$, whose form is a natural derivation of the $\lambda$ feature used in the final DPD decision:

$$\lambda_{p,d} = \frac{P_i + pNP_{cluster}}{1 + pN} - \frac{D_i + pND_{cluster}}{1 + pN}$$

where $D_i \in [0, 1]$, $P_i \in [0,1]$ are final confidence scores returned by DPD for each sessions (including enter/exit and BT connection), $D_{cluster} \in [0, 1]$, $P_{cluster} \in [0, 1]$ are Cluster scores described above, N is the total number of sessions with DPD score in the cluster and finally p and d are weight parameters that fix the relative importance of the cluster passenger and driver score respectively. FIG. 44 shows an exemplary processing code illustrating the final DPD decision where $D_i \in [0, 1]$, $P_i \in [0, 1]$ are final confidence scores returned by DPD for each sessions. Again, negative values of $\lambda_{p,d}$ correspond to left side entrance/exit, while positive values correspond to the opposite side. $\lambda_{p,d}$ ranges from $-1$ (Higher Driver score) to $+1$ (Higher Passenger score) and its absolute value corresponds to the accuracy of the detection. The best value of p and d can be found by computing their influence over the final accuracy. An example of this is shown in FIG. 45. Here, colors represent the average F1 score obtained by cross validation (higher scores in red). The values that maximize the final performances are p=0.15 and d=0.29 in this example (Sessions collected from exemplary sessions from 1 Apr. 2019 to June 2019). The fact that cluster driver scores has double the importance over the final accuracy can be linked to the fact that the greater number of clusters collected are of driver kind. FIG. 46 illustrates how $\lambda_{p,d}$=P-D distribution is affected by the inclusion of the Familiarity. Finally, as shown in FIG. 48, thresholds can be introduced in the same way as they were introduced in the final DPD classification, to ignore bad quality DPD results thus improving the accuracy of remaining ones. If $\lambda_{p,d} < t'_D$, the session can be classified by the system 1 as Driver, if $\lambda_{p,d} < t'_P$, the session can be classified by the system 1 as Passenger and Else no class is assigned and DPD event is not thrown (cf. FIG. 47). As expected, increasing thresholds values can higher the overall accuracy at expense of the number of DPD events raised, exactly as discussed above. This is shown in FIG. 49, representing a grid exploration over $t'_D$ and $t'_P$. The best average F1 score was obtained in this example with $t'_P$=0.47 and $t'_D$=−0.805 and the number of events detected was 30% of the total. Furthermore, FIG. 50 shows that with familiarity it is possible to reach the same accuracy of the single DPD algorithm but with a much greater number of detected events.

To train and validate the final DPD+F classifier, a schema can be used as shown in FIG. 51. Sessions are separated into two groups. Clusters are created using sessions belonging to the first group, while remaining sessions represent the actual dataset. Connection between sessions in the dataset and clusters is given in terms of familiarity. The all-in-one method structure "Fill_DPD_Familiarity_Train_Table" contained in DPD+F notebook, creates and fills in the dataset. The argument "use_truth" specifies if cluster scores must be generated using true labels coming from user annotations instead of DPD results given by the algorithm structure (cf. FIG. 52). An example of how the dataset table can look like is shown in FIG. 53. For the example, 2 notebooks were prepared for training and testing DPD+F classifier using cluster scores given by DPD results using a given user annotations. Finally, a schematic overview about notebooks and tables used is given in FIG. 54.

One of the advantages of the present invention is its easy adaptability and suitability for its use in modular systems, e.g. to technically provide familiarity detection of trips. Thus, the present Driver Passenger Detection (DPD) system can e.g. realized as part of an inventive, more complex and composite modular monitoring and detection system 1 with interactive Driver Passenger Detection (DPD) 112, Transport Mode Recognition (TMR) 113 and trip familiarity detection and/or score 114, allowing a broad monitoring of user actions related to the use of his/her mobile phone.

Transport Mode Recognition (TMR) 113

The architecture of the Transport Mode Recognition system part is very flexible and can be performed on a variety of environments, as e.g. the Databricks environment. The example of the Databricks environment has e.g. the advantages: (1) Having a shared codebase for quick prototyping and testing; (2) Enabling the reuse of the output code directly in the solution deploy; and (3) Get advantage of native Spark parallelism in order to perform multiple experiments and test different approaches. Other environments may have different advantages. Databricks is a technical environment growing out of the AMPLab project at University of California, Berkeley that was involved in making Apache Spark, an open-source distributed computing framework built atop Scala. Databricks provides inter alia a web-based platform for working with Spark, that provides automated cluster management and (Python-style (Interactive Python) notebooks, i.e. providing a command shell for interactive computing in multiple programming languages, in particular the Python programming language, offering introspection, rich media, shell syntax, tab completion, and history.

For the present invention, the analytics pipeline architecture was shaped to reflect, the flow of the live solution. The used pipeline can be separated in the following logical components: (1) Extract data from TMR campaign and loT Platform (positions, sensors, annotations debug data), and enrich it with GIS services (HERE); (2) Extract descriptors/features from valid trip data; and (3) Learn a TMR classification model in a supervised learning setup. These three steps are the object of the following description. The final output of the last step is a classification model structure that can be consumed by a production service. This structure is a standard scikit-learn object that can be deployed e.g. in any Python enabled architecture. FIG. 55 shows a block diagram illustrating schematic an exemplary overview of the architecture of the Transport Mode Recognition system part of system 1, comprising (i) data extraction, data extraction and filtering, (iii) Position sampling, (iv) Candidate stops, (v) Data enrichment, (vi) Feature description, in particular GPS features, Accelerometer features, Feature based on operating system activities, Public transport features, RME features, and GFE features, (vii) Machine learning, (viii) Hardcoded filtering rules, and (ix) Early detection.

For the data extraction, trip data have to be merged from different tables. As a trip identifier, start/stop boundaries can e.g. be used, for example such ones uploaded as debug data by an appropriate debug module or application. This data is e.g. be uploaded to a container and be copied to corresponding tables stored in a data repository. In principle, one could use any trip boundary information. For example, JSON (JavaScript Object Notation) trip boundaries can be used in order to ensure consistency with the debug application logic, but this is not a constraint. Moreover, additional data can be extracted from the JSON which may not contained in the tables in a first time period, most notably the OS Activity and TMR library labels. Since an embodiment variant may use only the OS Activity labels among the two, and these labels can be uploaded in the normal application data flow, the debug JSON data is not a requirement for the inventive solution (cf. FIG. 56).

For the data extraction and filtering, the trip boundaries can be merged with the following exemplary data sources: (1) analyticsmodel_np0.positions for the GPS locations, (2) analyticsmodel_np0.userannotations for the ground truth provided by Coloride users, (3) OS Activities contained in the JSON, (4) (optional) analyticsmodel_np0.accelerometers, and (5) (optional) analyticsmodel_np0.deviceevents. Of these trips, data are filtered out by the system 1 based on the following conditions: (1) At least one minute long, (2) At least 30 GPS positions, and (3) Exactly one user annotation. As a preprocessing step, the system 1 can remove duplicated GPS locations by timestamp, GPS locations that have negative speed and GPS locations that have accuracy>50 m. Motivation for the latter choice is illustrated by FIG. 57, which shows the performance variation of the TMR classifier when varying the minimum accuracy threshold. Since the performance variation is not strong, compliance can be kept with the previously used threshold.

For the position sampling, in order to perform the TMR live call the system 1 needs to perform data processing on a subset of data points, since an arbitrary amount of data cannot be sent in a remote synchronous call. Based on the analysis of the performance over the number of sampled GPS locations, the points to be sampled can e.g. be set to 16 points equally spaced over the GPS locations array. Other sampling strategies could also be used, however, in the present example did not show a significant performance gain. Also, though more points could be sampled, there is up-to-now no evidence suggesting that sampling more than 16 points may be beneficial. 16 points can e.g. be chosen because it is the HERE Geofencing API limit for a batch call (cf. FIGS. 58a and 58b).

Candidate stop extraction can e.g. be performed by the system 1 identically to the current TMR implementation. Given the set of GPS locations, candidate stops are identified as sequences of points that fulfill these conditions: (i) Speed<=3 m/s, and (ii) Sequences are longer than 5 seconds. The data analysis is performed after applying a moving average with window length 9 over the array of speeds. This means that every sample is replaced by the system 1 by the average of the sample itself and the 4 samples before and after. For each of these candidate sequences, the system 1 generates the average latitude and average longitude, obtaining a candidate stop position for each sequence/stop (cf. FIG. 59).

For the data enrichment, trip data is then enriched by the system 1 with e.g. external APIs (Application Programming Interface), most notably HERE services and an appropriate proximity search. A depiction of the enrichment can be seen in FIG. 60. Apart for baseline data, the performed enrichments can e.g. comprise: (1) Route matching, in order to understand if the trip was performed on a road. In the experimental setup the service used is HERE Route Match Extension (RME). Alternative services or a normalized data source can be used, (2) Query of Geographic Information System (GIS) geometries near the trip, performed using a HERE GFE API/layers. This step is basically a generalization of the GFE approach used in a possible TMR solution (same source, more general features), and (3) Public transport suggestions, in this case HERE Routing API. In the analytics data processing pipeline of the system 1, data can e.g. be written on filesystem after this stage. This can happen for the overall data, which can be slow, or incrementally on a monthly basis. This is performed since the enrichment step is the "slow" one.

For the features description, the system 1 generates a number of features based on all available or historic trip data (e.g. see feature extraction illustrated in FIG. 61). The computed feature list is a superset of the used features. Below, the features actually used are described in the TMR solution, so generated features that are not described are typically mostly out of scope. The implementation of such extractions is mostly contained in the second step of the TMR analytics pipeline. In the production solution, if the constraint is a live TMR call, some of the features must be generated locally on the used phone 10 and sent together with the TMR API call. Alternatively, if TMR can be performed asynchronously, these features can also be generated as soon as trip data lands on the IoT platform of the system 1.

Regarding the GPS features, over the array of GPS speeds, the following features can e.g. be generated: (1) Average, (2) Standard deviation, and (3) Percentiles from 0 to 100, with step 10 (so percentile 0, 10, 20 . . . ). In the exemplary Databricks implementation, the percentile NumPy function can e.g. be used, with the interpolation parameter set to "nearest", whereas the known NumPy function provides a large number of predefined mathematical operations including standard trigonometric functions, functions for arithmetic operations, handling complex numbers, etc.

Over the array of GPS altitudes, the following feature can e.g. be generated: Standard deviation. Further, GPS acceleration can be implemented as the ratio between the following two arrays: (1) Speed difference between a GPS sample and the preceding sample, and (2) Time difference (in ms) between a GPS sample and the preceding sample. Finally, over the resulting array of GPS accelerations, the following feature can be generated: Standard deviation. A measure of direction variance of the trip can also be generated, following of the pipeline implementation. Zero values from the bearing array can e.g. be removed.

Regarding the accelerometer features: If two or more accelerometer samples have the same timestamps, select the last one w.r.t. to array order. The acceleration norm array can then be generated and, the average of this array can be removed from all the same array. From the norm array, some statistics can be extracted comprising: (i) The percentiles from 0 to 100, with step 10, (ii) The interquartile range, which is the difference between the 75th and the 25th percentile.

Regarding the feature based on operating system activities: Two features using the operating system activities can be selected, with the following rationales: (1) ForwardIntegral can be chosen because of the event-wise behavior of the activity labels, and since it's generally the most informative feature, and (ii) CountAsMostProb can be chosen for simplicity. An activity event, as used herein, is an object with a unique timestamp and a map of labels with probabilities (if a label is absent is considered to have zero probability). The two features are generated for each possible label. Labels can e.g. be normalized to the Android names: 'Automotive', 'Cycling', 'OnFoot', 'Running', 'Stationary', 'Unknown', 'Walking', 'Tilting' for feature vector naming compliance between the two operating systems. To perform a forward integral calculation, it can be assumed that a label probability is valid until the next event. Each label probability can be multiplied by the milliseconds elapsed until the next event, or until the end of the trip for the last received activity event. This must be done for each label of the possible label list. The system 1 sums the results of these multiplications for each label, and divide each sum by the difference between trip end time and the first activity event time, both in milliseconds. If a label is never returned, the corresponding feature should be set to zero. So, if there are no activities at all for a trip, all the features should be set to zero. Further, the system 1 performs a count as most probable calculation, where for each possible label the number of events is counted in which the label was the most probable one, and divide by the total number of events (or the number of unique timestamps). In case of a 50/50 draw, the most probable can be selected in any way.

Regarding the public transport features, public transport algorithm inputs and outputs are used to generate some additional features: (1) CandidateStopsCount: the number of candidate stops of the trip (trajectory stops), (2) CandidateStopsCountNormalized: the number of candidate stops of the trip (trajectory stops) divided by the cumulated sum of haversine distances between the 16 sampled GPS points, ordered increasingly by time, in meters, (3) PublicRoutingNumStops: the number of suggested stops for the best matching API suggestion, (4) PublicRoutingDistRatio: the cumulated haversine distance of the suggestion stops, in order of traversal, divided by the cumulated haversine distance of the 16 sampled GPS points (see point 2), (5) PublicRoutingCandidateDistRatio: the cumulated haversine distance of the candidate stops, divided by the cumulated haversine distance of the 16 sampled GPS points (see point 2), and (6) The percentiles from 0 to 100, with step 10, of the minimum distances from the suggestion stops to the candidate stops (this is the standard public stop algorithm). These features are calculated for all the suggestions, but the ones selected are the ones regarding the suggestion with minimum distance between suggestion stops and candidate stops.

Regarding the RME features: RME features are generated in order to estimate, based on 16 GPS points, if the trip was not performed on a road. Two statistical descriptors are generated over the trace points confidences: (1) The average of the confidences using e.g. an implemented RMESampledTracePointsConfMean routine, and (2) the variance of confidences, using e.g. an implemented RMESampledTracePointsConfVariance routine.

Regarding the GFE features: Using the geometries returned by the GFE API (e.g. the HERE GFE API), the system 1 can generalize the features used by the Proximity Search. Basically, given the enrichment for the 16 points, the system 1 generates the percentage of points having geometries within 10, 20, 30 . . . 100 meters. This possibly includes points within a geometry, having distance<0. These distributions are computed for: (1) GFERoadOnlyXX generating percentage of points seeing only roads within a XX radius (XX from 10 to 100, with step 10), (2) GFERailOnlyXX generating percentage of points seeing only rail tracks within a XX radius (see point 1), (3) GFERailRoadXX generating percentage of points seeing or roads or rail tracks within a XX radius (see point 1), and (4) GFEAirport0 generating percentage of points within an airport (negative geometry distance). The exhaustive way of mapping geometries to originating points is to do a separate call for each of the 16 sampled GPS points. However, this can be expensive in terms of resources. A batch call with all the 16 points together can e.g. be performed, and then the geometries mapped back to the originating points by minimizing the haversine distance between the points and the nearestLat/nearestLon attributes for each geometry (for differences and details, see the batch version variant in the first step of the TMR pipeline—where GFE_API_Call should be replaced above in step1, and GFEFeats should be replaced in step2). It is to be noted that the second approach is less expensive but it's also less exact, so the overall performance can be slightly lower.

After the feature generation phase, the trip representation is serialized to the filesystem. For selecting the above described features from the larger generated features pool, a cross-validated Recursive Feature Elimination (see figure) can be used in order to get an estimate of the optimal feature set, averaging results over multiple experiments in a leave-k-users-out setup. Feature importance can be assessed for each classification setup (see below).

For the machine learning, in order to maximize classifier performances and fulfill the technical requirements, a two-stage classifier can e.g. be built. The first classification stage is a specialized "car"/"nocar" detection. This step maximizes performances over the transportation mode of main interest. Trips that are classified as "car" in the first step are permanently marked as "car". Trips that are not classified as car are then fed to a multiclass classifier that tries to assign the correct transport mode over the available classes. If the multiclass predicts "car" when the first step did not, we mark the trip as "unknown". This is motivated by precision measure evaluation. The classifier can e.g. be trained, leveraging TMR NPO pilot data, over the following transport modes: car, train, public transport, bicycle, motorcycle, skiing, plane. The exemplarily chosen classification algorithm is Random Forest. Other algorithms are also imaginable. Motivation for this choice can e.g. stem from the need of controlling overfitting in the model, having probability estimates in the prediction. Moreover, this algorithm has the advantage of providing a good method for estimating feature importance. For tuning the algorithm parameters a grid exploration was performed after the feature selection phase (see FIG. 63). An exemplary configuration is: (1) 250 trees with maximum depth 8 for the binary classifier, and (2) 250 trees with maximum depth 10 for the multiclass classifier. After a successful training, models and results can e.g. be serialized for consumption, e.g. by a live service.

Further, hardcoded filtering rules can be applied. Based on the technical requirements, some custom logic can be added after the two-step automatic classifier in order to limit unwanted mistakes. The applied rules can e.g. be implemented as follows: (1) If PublicRoutingNumStops<3 or CandidateStopsCount<3 or PublicRoutingDistRatio<0.6 and the predicted TMR label is public (bus or tram), change the prediction to "unknown". This rule is meant to limit the public transport false positives (car trips predicted as bus trips), (2) If RMESampledTracePointsConfMean<0.25 and the predicted TMR label is not plane or train or bicycle, mark the trip as "unknown". This rule is meant to remove off-road trips from car candidates, and (3) If SpeedQuantile90>320, mark the trip as "plane".

In addition to the full track classification approach described above, an early classification can e.g. be performed when the classifier is highly certain that a trip should not be classified as 'car'. This embodiment variant uses the very same features and approach of the full track mode, but features are calculated only on the beginning of the trip. With an appropriate amount of data, an early filtering for train and bicycle trips can be implemented, with the assumption of performing the early decision for different classes at the same time, similarly to the production setup. The proposed time for the early classification, 300 seconds, can e.g. be based on empirical study of the response to the time window in term of F1-score (see FIG. 64). The exemplary production setup showed good performances at 180 seconds:

|  | Precision | Recall | To car |
|---|---|---|---|
| Train | 97% | 78% | 3% |
| Bicycle | 93% | 71% | 18% |

The exemplarily used classifier performed even better with an early detection at 300 seconds:

|  | Precision | Recall | To car |
|---|---|---|---|
| Train | 98% | 93% | 1% |
| Bicycle | 97% | 65% | 5% |

In general, a higher precision can be overserved, but mixed results in recall (very convenient for train, less performing for bicycle). The ability to filter out non-car trips from car predictions seems to be always better.

The overall solution leads technically to an improved performance (see below). Performance is evaluated in a leave-k-users-out cross-validated setup, in order to get a realistic performance projection. 3695 annotated trips, collected with Coloride NPO (TMR tenant), have been fed as a training for the classifiers, with the following label counts:

| Car | 2190 |
|---|---|
| Tram | 462 |
| Train | 285 |
| Motorcycle | 219 |
| Cycling | 204 |
| Bus | 160 |
| Plane | 32 |
| Skiing | 13 |

Passenger trips can e.g. be reassigned as "car" trips for TMR purposes. FIG. 65 and FIG. 66 show respectively the performances of the current TMR service and the proposed solution. Reading both the tables (FIG. 65/66), in general the two effect the system 1 looks for are: (1) High values on the diagonal, which are better since they represent for each class the percentage of trips that are labeled correctly by the classifier, and (2) Lower values on the "car" column are better (outside the diagonal) since they represent for each class the percentage of trips that are mistaken as car trips. Comparing the two tables, the following can be noted: (1) 96% of the car trips are labeled as cars, which is a recall value. This is slightly less performative than an alternative solution, which defaults to car and has a higher car coverage. The latter value is indeed high, but is provided at expense of the precision, which is 82% on the baseline, while it raises to 89% for car in the current solution. (2) A new unknown class is introduced to catch the trips for which a label cannot be decided with sufficient evidence, (3) The combination of machine learning and custom logic, both of which are rooted in the past experiences on TMR from different teams, accordingly to point 1 contributes to lower the number of car false positives, namely non-car trips that are labeled as cars. This is evident in all the considered classes: −22% cycling trips classified as car (from 23% to 1%), −10% public transport trips (from 33% to 13%), −2% train, −6% plane, −8% skiing. The resulting precision effect, as already observed, is that the car prediction is cleaner, (4) At the same time, the accuracy over the single non-car classes is generally higher: +16% train trips correctly classified (98% correct), +10% public transport, +1% cycling. Plane trips are an exception (−16% recall) but keep in mind that these trips are marked as "unknown" instead of car, (5) Motorcycle trips proved to be virtually indistinguishable from car using the available signals. Almost all of the motorcycle trips are regularly marked as car trips, (6) Most of skiing trips (92%) are now classified as "unknown". This is not ideal but far from dangerous, since they are never classified as car trips.

Further, it is possible a make similarity add-on at the inventive system 1. Thus, in addition to the supervised learning approach for TMR, a trip similarity strategy can be applied in order to further raise TMR performances. The additional approach is leveraging user annotations over previous similar trips, if any, and use this information to correct TMR labels, if needed. This feature can be easily integrated in a production API, where the requirement is to have the 16-points representation of annotated trips available to the API, partitioned by user. The service can e.g. receive a new 16-points representation of a trip, together with TMR probability output, and matches this trip with similar annotated trips, if they exist. Similarity is calculated using a Euclidean pseudo-distance between trajectories. If one or more matches are found, a simple weighting algorithm modifies the TMR probabilities based on the annotation evidence. The new most probable class is then chosen as the TMR label. FIG. 67 show an exemplary F1 score varying TMR label weight (probability mass assigned to the automatic label).

The example's number of similar annotated trips to consider is two, or one if only one exists. With this parameter, the performance gain can be shown by the following table with F1 performance gain for significant classes, #annotations=2:

| F1 | Before | After |
|---|---|---|
| Car | 0.91 | 0.94 |
| Train | 0.98 | 0.98 |
| Public | 0.84 | 0.88 |
| Cycling | 0.88 | 0.85 |
| Motorcycling | 0.00 | 0.51 |

Trip Familiarity Score Measuring 114

According to the present invention, there are different embodiment variants to technically assign to users and to sessions a score of how much them follow habits (i.e. familiarity score measuring 114). The first two embodiment variants use a clustering method and then evaluate the familiarity from the dimensions of the clusters (and the familiarity of sessions from the dimension of the clusters in which them are assigned).

Below, the used variants of clustering method and the scoring method are described:

In a fist embodiment variant, which uses a set of links of each session (herein denoted as link version), the clusters are created using jacquard similarity between the link of the sessions. Jaccard Similarity (coefficient) measures similarities between sets. It is defined as the measured size of the intersection divided by the size of the union of two sets. In particular, the similarity between two sessions are calculated in this way:

$$Sim(S_1, S_2) = \frac{|L_{S1} \cap L_{S2}|}{|L_{S1} \cup L_{S2}|}$$

where $L_{Sx}$ is the set of links of the session x. The agglomeration is done starting from one cluster for each session, and by agglomerating clusters that have a similarity of at least 0.8. The similarity between clusters with more than one session in it is done by considering the maximum similarity between all the possible combinations of sessions.

In a second embodiment variant, using start and stop points of each session (herein denoted as Start and Stop version), the start and stop points of each the sessions are used for clustering. The distances between two sessions are generated in the following way:

$$D(S_1, S_2) = \text{hav}(P_{A1}, P_{A2}) + \text{hav}(P_{B1}, P_{B2})$$

where $P_{Xn}$ is the start(A) or end(B) point of the session n, and hav( ) is the Haversine distance between two points. The Haversine distance measures the great-circle distance between two points on a sphere given their longitudes and latitudes. The agglomeration can e.g. be done starting with a cluster for each session, considering as centroid of the cluster the couple start and end points of the session. The next step is done by agglomerating the clusters with a distance of 300 meters or less, iteratively. Every time two clusters are joined the centroid of the cluster are recalculated with a simple average of latitude and longitude of both A and B points of the centroids. Then another agglomeration is done like the previous but considering the centroids distance with the points matched in reverse way (start-points matched with end-points).

For the scoring generation of user familiarity and after the clustering, the Gini coefficient can be used on the dimensions of the clusters to assign to each user a familiarity score. The Gini coefficient measures the inequality among values of a frequency distribution (here the familiarity of trips). A Gini coefficient of zero expresses perfect equality, where all values are the same (for example, where all measured points of the trip match). A Gini coefficient of one (or 100%) expresses maximal inequality among values (e.g., for a large number of trips where only one trip has different measure points and all other trips have complete match, the Gini coefficient will be nearly one). Note that for larger sets of trips, values close to one are unlikely.

The following relation gives a possible index, which can be used for the generation of the familiarity and familiarity score, respectively:

$$Fam_2(U) = \sum_i |C_i|(\lambda)^i$$

where $|C_i|$ is the percentage of user session in the i-th cluster, taking the clusters in dimension order, decreasing. $\lambda$ is a parameter between 0 and 1 that indicates how clusters are considered in the proposed scoring. This value defines the weight given to each cluster in the final score, depending on the position of the cluster in the ordering. For example, if the value is set to 0.5, the first cluster will count 1, the second 0.5, the third 0.25 and so on. If the value is set to 1, each clusters is considered in the same way, if the value is set to 0, just the first cluster is considered. In an embodiment variant, this value is stetted to 0.5. The main idea of this index is to design a value that orders the users with the following order, given the clusters dimensions (x-axis: cluster number, y-axis: cluster dimension), as illustrated in FIG. 68.

For comparison between the Gini index and the index used in this embodiment variant, the used index is generated to adjust the fact that the first and the last two cases of the ordering wanted score 0 in the Gini index, that is an acceptable value just for the last one case. In FIG. 69 the correlation between the Gini index and the used index is shown. As it can be seen, there is a set of value that scored 0 in Gini but they assume a significative value in this new index. Further, it can be seen that the correlation between this two indexes seems to show some kind of regularity in the couple of values. The graph shows that there is some groups of points placed on the same line. This means that further exploration can lead to some kind of clustering algorithm, that uses a combination of this two indexes.

In any case, no general correlation can be overserved between the two indexes because they have two different concepts behind. Gini defines some kind of variance of the cluster dimensions, the new index defines a measure on how the sessions is distribute into the clusters, focusing on the main clusters. Both can be considered as measures of the user Familiarity. Finally, to score for the session familiarity, the familiarity score for a session is measured as the relative dimension of the cluster in which the session is placed, generated as the division between the session in cluster and the total sessions of the user.

A third embodiment variant of Familiarity (denoted herein as "Bag of Links" embodiment variant (BOL)) starts from a scores of familiarity for each link to calculate familiarity of sessions and users. A score of familiarity for each link of each user is generated as the percentage of sessions of the user in which the link appears. The session familiarity is generated as the average of the links scores in the session, the user familiarity is generated as the average of the scores of the links travelled by the user.

To compare the three proposed embodiment variants, the following can be observed: In the first two embodiment variants the familiarity depends on the way the sessions are clustered. After an inspection on the results, the cases in which the two methods give different results are the following. The user goes from the same point A to the same point B, but passing through different links (see FIG. 70). This behavior causes low aggregation in Link familiarity variant and high aggregation in Start Stop variant. In the dataset it has been spotted some cases in which the user travels the same streets but the way the geocoding measuring (e.g. HERE) gives the links causes a wrong behavior in the Link embodiment variant. Typically, it can happen that big streets have two different linkIDs for the two direction of the street, or two streets are too near and the geocoding measuring (e.g. HERE) spots the user in the wrong one. (see FIG. 71)

A second case happens when the user goes once from point A to point B1 (session S1), and once from A to B2 (session S2), as shown in FIG. 71. If S1 and S2 have enough links in common (the user travels the same path but ends up in different places) the two trips are clustered together in the Link method but not in the Start Stop method (in the cases in which the stop points are not enough near). (see FIG. 72)

The Bag of Links (BOL) embodiment variant does not generate clusters so a direct comparison on how the trips are agglomerated cannot be performed. However, a good inspection on this method can be done considering the get_familiarity process, respect to the other get_familiarity of the other embodiment variants. The case in which the BOL embodiment variant becomes useful is when the user does a new trip using only link that has already travelled in each of the previous sessions, but without covering the 80 percent of the shortest of these sessions. In this case the start and stop points are far away so the get_familiarity start stop will return 0, also the number of links in common are not enough to cover the 80 percent of links so also the get_familiarity of the link methods will return a low score. This new method instead will give a maximum scores of 1 (see FIG. 73).

To realize the different embodiment variants, different libraries can e.g. be used to generate the familiarity and relative examples of usage. Each libraries can require a specific input and retrieve the same output composed of three different dataframes. Exemplary dataframes my comprise the following composition: (i) familiarity_user: UserID: User_ID, SessionSize[ ]: Array containing the dimensions of clusters of that user, Familiarity: Index calculated with Gini index, Familiarity_v_2: Index calculated with the new index (described above); (ii) familiarity_session: UserID: User_ID, SessionID: Session_ID, familiarity_sess: Session familiarity, it is the relative dimension of the cluster in which the session is placed (session in cluster/total sessions of the user), and (iii) clusters: UserID: User_ID, Cluster: Generated identifier of the cluster, Sessions[ ]: Sessions in the cluster, Centroid: Centroid calculated in different ways, depending on the case. Each library can provide a function called get_familiarity (as already mentioned above), that takes as input a dataframe containing the clusters previous calculated and a data frame containing a set of new sessions (each session must have the same shape of the data fame used to generate the cluster data frame). This function returns a score of familiarity for each session in the input set. This function does not update the clusters and simply assigns each new session to an existing cluster and return a slightly modified session-familiarity of that cluster (return the session familiarity of the sessions contained in that cluster, calculated as if the new session were contained in it). The function returns −1 if the session comes from a new user.

In a Familiarity Link Library, e.g. of databricks, a familiarity function can be implemented having as input one row for each session and the following fields: (i) UserID: Identifier for the user, (ii) StartTimeUTC: Start time of the session, used as a session ID, (iii) LinkIDs[ ]: Set of links traveled by the user in the session. The absolute value of the LinkID can e.g. be taken in order to consider just the link and not the travelled direction. Further, in an Familiarity Link Deployable, e.g. of databricks, an example of the usage of the previous library Familiarity Link Library can be provided. The environment can be selected on the widget and the function saves the three results dataframes on the three variables familiarity_user, familiarity_session and clusters. This databricks can be deployed on the described environments.

In a Familiarity Start Stop Library, a function can e.g. be provided which needs in input a data frame with the following composition: (i) UserID: User ID; (ii) StartTimeUTC: Start time of the session, used as a session ID; (iii) Coordinates{'lat_a': StartLatitude, 'long_a': Start Longitude, 'lat_b': EndLatitude, 'long_b': EndLongitude}: a structure containing the information of starting and ending points of the session. As an example library of the Familiarity Start Stop Library a Familiarity Start Stop Deployable can e.g. be provided, e.g. as another databricks. This is an example of the usage of the previous library. The environment can be selected on the widget and the function saves the three results dataframes on the three variables familiarity_user, familiarity_session and clusters. This databricks can e.g. be deployed on the described environments.

Further by e.g. a Familiarity Bag of Links, the output data frames can be different from the previous cases. The three tables can have the following shape: (1) Familiarity_user: (i) UserID: identify the user, and (ii) UserFamiliarity: familiarity of user, calculated as described above; (2) Familiarity_session: (i) UserID: identify the user, (ii) SessionID: identify the session, and (iii) SessionFamiliarity: familiarity of session, calculated as described above; (3) Scores: (i) UserID: identify the user, (ii) LinkID: identify the link, and (iii) scores: score of the link, calculated as described above. The scores table substitutes the cluster table. When it is desired to generate the familiarity of a set of new sessions, the get_familiarity of this library can be used but passing the scores data frames, instead of the cluster one. The functions of this library can e.g. be implemented to need the input with the following shape df: (i) UserID: identify the user, (ii) StartTimeUTC: starting time of the session, used as SessionID, and (iii) Links[ ]: array containing the absolute values of linkID of links traveled by the user in the correspondent session. A Familiarity Bag of Links Deployable can be provided as an example of the usage of the previous library. The environment can be selected on the widget and the function saves the three results dataframes on the three variables familiarity_user, familiarity_session and score. This databricks can be deployed on the describbed environments.

Trip Familiarity Detection 115

As an embodiment variant, a trip familiarity detection and measuring 115 can be realized as an integrated detection engine based on the above described Driver Passenger Detection (DPD) 112, Transport Mode Recognition (TMR) 113 and trip familiarity score measuring 114. I.e. the trip familiarity detection can be realized using TMR 113 measuring similarity with annotated trips, DPD 112 measuring familiarity through the above described LinkID v1, and the Familiarity Score measuring 114 using (i) the familiarity through the described LinkID v2, (ii) start & stop, and (iii) bag of links. A total of 5 different exemplary familiarity clustering data processing and algorithms are disclosed herein. However, other processes are imaginable based on the disclosed techniques.

First, the disclosed TMR 113 is used providing the inventive technical strategy and data considerations. When a TMR 113 request is received live, the system 1 respectively the TMR 113 checks if a user already annotated or corrected a similar trip. Consequently, the system 1 must be able to efficiently retrieve historical annotated trip data and define a trajectory similarity measure. Since the TMR 113 live request contains a representation of the trip with 19 points, in the present embodiment variant, it makes sense to store this representation for each annotated trip, partitioned by a user identifier. This can e.g. be done in a database or a filesystem (e.g. one row per trip). The user annotation preferably can e.g. be stored together with the trip summary. This trip summary can be built/updated in batch using, for example, Databricks (e.g. nightly). The embodiment variant can imply information availability within 24/48 h from user annotation. Existing facilities and other approaches can be considered as well (cf. FIG. 74). For weighting the parameters and evaluating the performance under TMR 113, the multiclass probabilities can e.g. be weighted less than the annotation probability. This is in line with the fact, that, fi the user corrected a trip in the past and a similar trip was observed by the system 1, the user should be trusted. The proposed value for the weight is 0.4. FIG. 75 show an exemplary graph, with a TMR baseline.

An exemplary embodiment variant of the DPD 112, which can be used for the trip familiarity detection 115, and which can e.g. comprise the following technical steps performed by the system 1 and the trip familiarity detection and measuring 115, respectively: (1) Collect user history, (2) Cluster similar trips, (3) Define centroid trip, (4) New trips arrives: seek match with existing clusters, and (5) Check cluster DPD label. This is illustrated by FIG. 76, where N is the total number of sessions with DPD score in the cluster, where $D_i \in [0, 1]$ $P_i \in [0,1]$ and $X_i \in [0, 1]$ are final confidence scores returned by DPD for each sessions (including enter/exit and BT connection), and where cluster scores can be also generated from user annotations (Truth) or eventually from a combination of both sources.

The objective of the familiarity score is to create a measure for scoring purposes on how much a user travel on familiar roads. This can e.g. require the three different methods, as illustrated by FIG. 77, i.e. (1) Clustering through linkID, (ii) bag of links: linkIDs frequency, and (iii) start & stop. The start&stop method, as illustrated in FIG. 78 is in this context a powerful approach.

DPD used in the context of familiarity detection 115 can comprise the following: (1) For each user: (i) collect trip history (~few weeks), (ii) cluster similar trips (hierarchical agglomerative clustering via Jaccard distance $$J(A, B) = \frac{|A \cap B|}{|A \cup B|}$$

where trips that share 80% of the geocoding measuring (e.g. HERE) links are defined similar), and (iii) assign DPD average label to the cluster (using both user annotations+ algorithm results); and (2) For new trip arriving: (i) seek match with existing clusters (Jaccard distance between new trip & the centroids), and (ii) check cluster DPD label.

FIG. 79 shows an exemplary overview of a possible general architecture of the trip familiarity detection and measuring 115. It has to be noted that to measure similarity between trajectories can be computationally challenging in regard to the performance and consumption of the system 1. Thus, as an embodiment variant, a similarity prefilter can be used in the system 1, in particular for TMR 113, where the data processing is only performed on a subset of likely candidates. A trip is considered a valid candidate of its start and end both lie within a certain radius from the start/end of the current trip (the one that is evaluating in a TMR live request). The radius can e.g. be set to 500 meters for this example, based on empirical observation. Since user annotations can be in limited number (in normal operating conditions) and using the proposed similarity prefilter, the trajectory similarity is actually generated against a small subset of trips, which is illustrated in FIG. 80.

As a further embodiment variant, e.g. to further improve the performance of the system 1, a Driver DNA measurement can e.g. be applied and performed by the system 1. One of the aims of the system 1 and e.g. a corresponding telematics app is to measure and to score the driver behavior through the recording of GPS, Accelerometer, Gyroscope and other integrated sensors present in personal mobile phone or black boxes. Different combination of driver and transport mode have different driving style, moreover each driver has a different driving style depending on external factors e.g. weather, road type, and on personal factors e.g. motivation of the trip, time constraints and trip familiarity. Given previous assumptions, the transport mode recognition 113 and driver passenger detection 112 can be improved based on an in depth recognition and/or analysis of a single person driving style in combination with his trip history by the system 1. Another aim of telematics app is the machine-based coaching of the driver to reduce his risk while improving his driving style. The analysis of the driving style for each user with a related risk estimation will allow to provide personalized feedbacks and programs to reduce the risk exposure of each driver after a minimum amount of trip history. As an embodiment variant, different assumption for designing features that can contribute to technically define a driving style, can be used as follows: (i) Correlation between accelerometer and GPS speed, (ii) Frequency of maneuvers and phone distraction events per kilometers, (iii) In depth analysis of speed distribution while turning taking into consideration curvature degrees, (iv) Analysis of speed distribution taking in consideration road sinuosity, speed limit and road class, and (v) Analysis and feature extraction from accelerometer and gyroscope distribution as a function of road class, sinuosity and shape. Using clustering algorithms together with the above feature extracted from an historical set of trips of a single user allows to define and measure the driver's driving style. For the Driver DNA, as defined above, the system 1 clusters the feature measuring and describing the driving style of a user and to correlate each cluster with the frequency of transport mode, driver or passenger trips present in the cluster. In the end for each cluster there will be a rank of possible transport mode and a most probable output of driver or passenger. This combination is what is called herein the measuring of a DriverDNA.

LIST OF REFERENCE SIGNS

1 Mobile identification and classification system
  10 Mobile telecommunications apparatus
    101 Mobile telematics application (cellular mobile node application)
    102 Integrated Sensors of the mobile node
      1020 MEMS magnetometer
      1021 Speakers
      1022 Microphones
      1023 Device alerts drivers
      1024 Wireless connections
        10241 Radio data systems (RDS) modules
        10242 Positioning system modules
        10243 Mobile cellular telephone interface
        10244 Language unit
        10245 Satellite receiving module
      1025 Accelerometer
      1026 Gyroscope
      1027 Cameras
      1028 Touchscreen
      1029 MEMS compass module
    103 Dataflow pathway
    105 Wireless connections
      1051 GPS
      1052 WLAN
      1053 Bluetooth
  11 Central circuit
    110 Telematics-driven aggregator
    111 Machine-learning module
    112 Driver Passenger Detection (DPD) system
    113 Transport Mode Recognition (TMR)
    114 Trip familiarity score measuring
    115 Trip familiarity measuring and detection
  12 First-tier automated risk-transfer system
    121 Electronic first-tier resource-pooling system
    122 First-tier risk-transfer parameters
    123 First-tier payment-transfer parameters
  13 Second-tier automated risk-transfer system
    131 Electronic second-tier resource-pooling system
    132 Second-tier risk-transfer parameters
    133 Second-tier payment-transfer parameters
2 Data transmission network
  20 Cellular network grid
    201, . . . , 203 Network cell/Basic service area
    211, . . . , 213 Base (transceiver) station
      2111, . . . , 2131 Cell Global Identity (CGI)
    221, . . . , 225 Mobile network nodes
  21 Uni- or bidirectional data link
3 Sensory data of the mobile device 10
  31 Usage-based sensory data
    311, . . . , 313 Usage-based automotive data of the vehicles 41, 42, . . .
  32 User-based sensory data
    321, . . . , 323 User-based automotive data of the vehicles 41, 42, . . .
41, 42, 43, . . . Motor vehicles
  401, . . . , 405 On-board sensors and measuring devices
  411, . . . ,415 OEM (Original Equipment Manufacturer) devices
  421, . . . , 425 Data transmission bus interface
  431, . . . , 435 On-board diagnostic system
  441, . . . , 445 In-car interactive device
  451, . . . ,455 Automotive telematics devices
5 Aggregated sensory data
6 Occupant/User of the mobile device
  61 Driver
  62 Passenger

The invention claimed is:

1. A method for identifying and/or classifying a user of a vehicle based on sensory data measured by a plurality of sensors of a mobile device of the user, the plurality of sensors at least comprising an accelerometer and a gyroscope, the mobile device comprising at least one wireless connection, wherein by the at least one wireless connection, the mobile device acts as a wireless node within a cellular data transmission network by antenna connections of the mobile device to the cellular data transmission network, the plurality of sensors being connected to a monitoring mobile node application of the mobile device, and wherein the monitoring mobile node application captures usage-based and/or user-based telematics data of the mobile device and/or the user of the mobile device, the method comprising:

measuring, by processing circuitry, gravitational acceleration movement sensory data based on measuring parameters obtained from the accelerometer and gyroscope movement sensory data based on measuring parameters obtained from the gyroscope;

detecting, by the processing circuitry, vehicle entering or exiting movement patterns of the user from the acceleration movement sensory data at least comprising an acceleration movement sensory data pattern for a base axis and a degree of rotation associated with a vehicle entering or exiting movement of the user;

triggering, by the processing circuitry using the detected vehicle entering or exiting movement patterns of the user as input features, recognition of a vehicle entering or exiting movement of the user by performing a decision-tree classification on the input features to determine whether the user entered or exited the vehicle from a left side or a right side of the vehicle, wherein the gyroscope movement sensory data are used to select at least verse and degree of the rotation associated with the vehicle entering or exiting movement; and detecting, by the processing circuitry, a moment in which the user is entering or exiting the vehicle by detecting an acceleration in an up or down direction related to an earth reference system from the acceleration movement sensory data and by measuring or not measuring a variance of discontinuities in acceleration signals in a smartphone reference system, the gravitational acceleration movements being correlated with an orientation of the mobile device building the smartphone reference system, wherein the acceleration movement sensory data are triggered for a timely gap associable with a time window just before opening a door of the vehicle immediately before entering the vehicle or a downwards movement performed during a sitting movement, upon detecting a movement pattern suitable for the sitting movement, the acceleration movement sensory data are triggered for rotations with an overlap with the sitting movement, and a decision tree is performed to classify the user as a driver or a passenger depending on a counterclockwise or clockwise direction of rotation, and for separating the movement pattern from timely gaps, a variance of the acceleration in the up or down direction is processed by a threshold filter, wherein the acceleration in the up or down direction corresponds to a signal rotated in the earth reference system.

2. The method for identifying and/or classifying the user of the vehicle according to claim 1, wherein any detected movement pattern is classified as the sitting movement or an other movement.

3. The method for identifying and/or classifying the user of the vehicle according to claim 1, wherein the acceleration in the variance of the up or down direction at a certain time is generated over a fixed time window centered around the certain time, wherein the variance of the up or down direction depends on a length of the time window.

4. The method for identifying and/or classifying the user of the vehicle according to claim 3, wherein the length of the time window is set to one second or more to ensure proper sampling of a full oscillation.

5. The method for identifying and/or classifying the user of the vehicle according to claim 4, wherein the acceleration movement sensory data are triggered for the movement pattern, wherein the movement pattern is recognized as the sitting movement, in response to a time-dependent duration of the movement pattern being measured relative to that of a predefined or captured average sitting movement.

6. The method for identifying and/or classifying the user of the vehicle according to claim 4, wherein the acceleration movement sensory data are triggered for the movement pattern, wherein the movement pattern is recognized as the sitting movement, in response to the movement pattern being measured relative to a rotation in an x-y plane compatible with an entrance or exiting.

7. The method for identifying and/or classifying the user of the vehicle according to claim 4, wherein the acceleration movement sensory data are triggered for the movement pattern, wherein the movement pattern is recognized as the sitting movement, in response to the movement pattern being measured to be definable near to a discontinuity in acceleration components in the smartphone reference system.

8. The method for identifying and/or classifying the user of the vehicle according to claim 7, wherein additional rule-based classifications are added based on a specific type of discontinuity.

9. The method for identifying and/or classifying the user of the vehicle according to claim 1, further comprising, upon detecting movement patterns best matching a sitting movement, determining gyroscope movement sensory data corresponding to the acceleration movement sensory data, wherein an integral of rotations in an x-y plane in the earth reference system are detected which are sufficiently close to the sitting movement.

10. The method for identifying and/or classifying the user of the vehicle according to claim 9, wherein a counterclockwise rotation is associated with an entrance or exit of the user from the left side of the vehicle.

11. The method for identifying and/or classifying the user of the vehicle according to claim 10, wherein the counterclockwise rotation is measured to be at least 40°.

12. The method for identifying and/or classifying the user of the vehicle according to claim 9, wherein a clockwise rotation is associated with an entrance or exit of the user from the right side of the vehicle.

13. The method for identifying and/or classifying the user of the vehicle according to claim 12, wherein the clockwise rotation is measured to be at least 40°.

14. The method for identifying and/or classifying the user of the vehicle according to claim 1, further comprising:
    classifying orientations of the mobile device as driver orientations and passenger orientations,
    determining, a first time duration that the mobile device is oriented in the driver orientations and a second time duration that the mobile device is oriented in the passenger orientations;
    performing a comparison of the first time duration to the second time duration; and
    classifying the user of the mobile device as a driver or a passenger based on the comparison.

* * * * *